United States Patent
Sista

(10) Patent No.: US 9,686,277 B2
(45) Date of Patent: Jun. 20, 2017

(54) UNIQUE IDENTIFICATION FOR AN INFORMATION HANDLING SYSTEM

(71) Applicant: InMobi Pte. Ltd., Singapore (SG)

(72) Inventor: Sreenivasa Prasad Sista, Bangalore (IN)

(73) Assignee: InMobi Pte. Ltd., Singapore (SG)

( * ) Notice: Subject to any disclaimer, the term of this patent is extended or adjusted under 35 U.S.C. 154(b) by 87 days.

(21) Appl. No.: 14/185,558

(22) Filed: Feb. 20, 2014

(65) Prior Publication Data

US 2014/0237568 A1 Aug. 21, 2014

Related U.S. Application Data

(60) Provisional application No. 61/767,610, filed on Feb. 21, 2013.

(51) Int. Cl.
| | | |
|---|---|---|
| *G06F 21/00* | (2013.01) | |
| *H04L 29/06* | (2006.01) | |
| *H04W 12/06* | (2009.01) | |
| *H04W 4/00* | (2009.01) | |

(52) U.S. Cl.
CPC ......... *H04L 63/0876* (2013.01); *H04W 12/06* (2013.01); *H04W 4/001* (2013.01)

(58) Field of Classification Search
None
See application file for complete search history.

(56) References Cited

U.S. PATENT DOCUMENTS

| | | | | |
|---|---|---|---|---|
| 6,772,331 B1 * | 8/2004 | Hind | ..................... | G06F 21/445 370/313 |
| 7,240,364 B1 * | 7/2007 | Branscomb | ....... | H04L 29/12113 726/5 |
| 8,321,913 B2 * | 11/2012 | Turnbull | ............. | H04L 63/0492 726/2 |

(Continued)

OTHER PUBLICATIONS

Abrougui, Kaouther; Boukerche, Azzedine; Werner Nelem Pazzi, Richard. Design and Evaluation of Context-Aware and Location-Based Service Discovery Protocols for Vehicular Networks. IEEE Transactions on Intelligent Transportation Systems. vol. 12, Issue: 3. Pub. Date: 2011. http://ieeexplore.ieee.org/stamp/stamp.jsp?arnumber=5951776.*

(Continued)

*Primary Examiner* — Jeremiah Avery

(57) ABSTRACT

A mobile information handling system (IHS) includes an application (app) that may include a unique-identification tool and a device capability determination tool. The unique-identification tool may generate a signature string that is unique to the mobile IHS. The device capability determination tool may determine the hardware capability of the mobile IHS, the network capability of the mobile IHS and the capability of a network between the mobile IHS and a server IHS, and generate a device determination therefrom. The app may transmit the signature string and the device determination to a server IHS. In response to the signature string and device determination that the server IHS receives, the server IHS may generate and transmit a corresponding response containing specific data to the mobile IHS. The app may output the specific data by displaying the specific data on a display of the mobile IHS.

67 Claims, 25 Drawing Sheets

(56) References Cited

U.S. PATENT DOCUMENTS

| | | | | |
|---|---|---|---|---|
| 8,649,768 B1* | 2/2014 | Gaddam | ............... | H04W 12/06 455/411 |
| 2002/0035607 A1* | 3/2002 | Checkoway | ......... | G06Q 10/107 709/206 |
| 2003/0134648 A1* | 7/2003 | Reed | ..................... | H04W 60/00 455/456.1 |
| 2007/0022469 A1* | 1/2007 | Cooper | .................... | H04K 1/00 726/3 |
| 2011/0219229 A1* | 9/2011 | Cholas | .................... | G06F 21/00 713/168 |
| 2011/0287748 A1* | 11/2011 | Angel | ............... | H04M 3/42221 455/414.1 |
| 2012/0084364 A1* | 4/2012 | Sivavakeesar | ...... | H04L 12/1818 709/205 |
| 2014/0162598 A1* | 6/2014 | Villa-Real | ............... | H04M 1/66 455/411 |

OTHER PUBLICATIONS

Lee, Choonhwa, et al. Konark: A System and Protocols for Device Independent, Peer-to-Peer Discovery and Delivery of Mobile Services. IEEE Transactions on Systems, Man, and Cybernetics—Part A: Systems and Humans. vol. 33, Issue: 6. Pub. Date: 2003. http://ieeexplore.ieee.org/stamp/stamp.jsp?arnumber=1255580.*

* cited by examiner

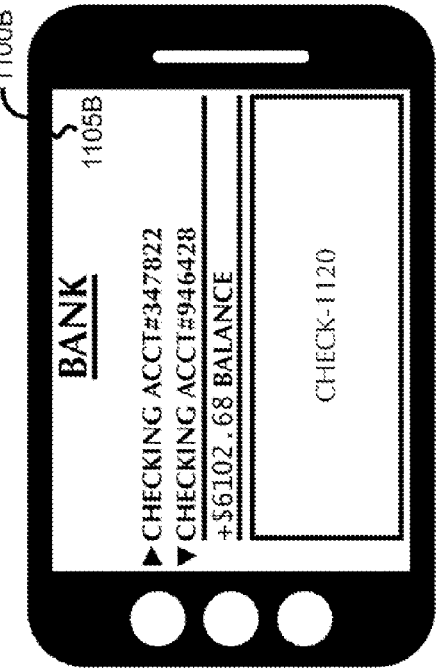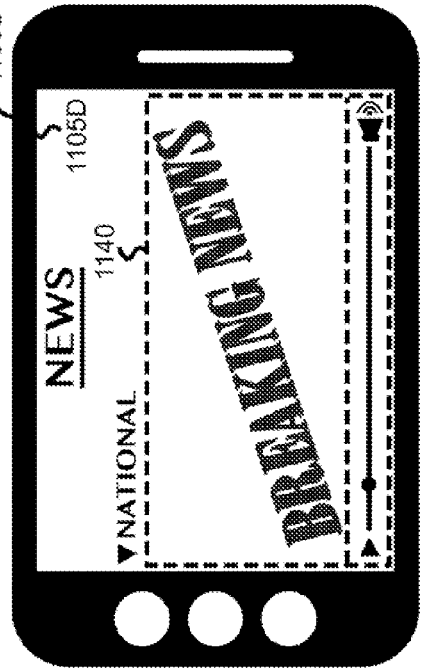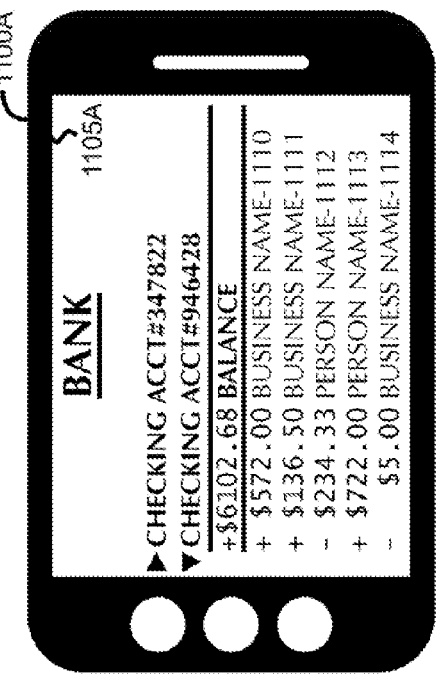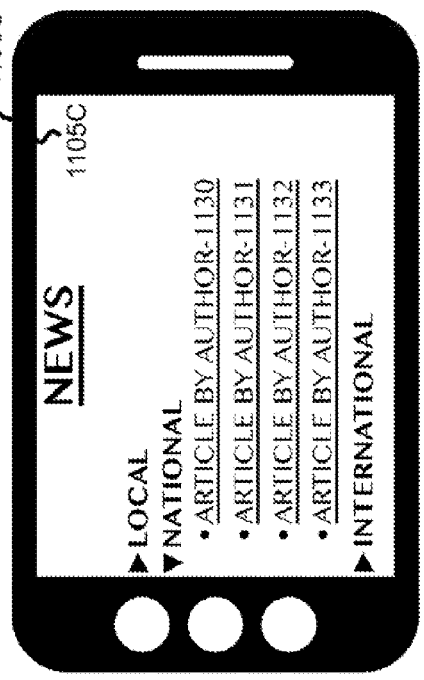

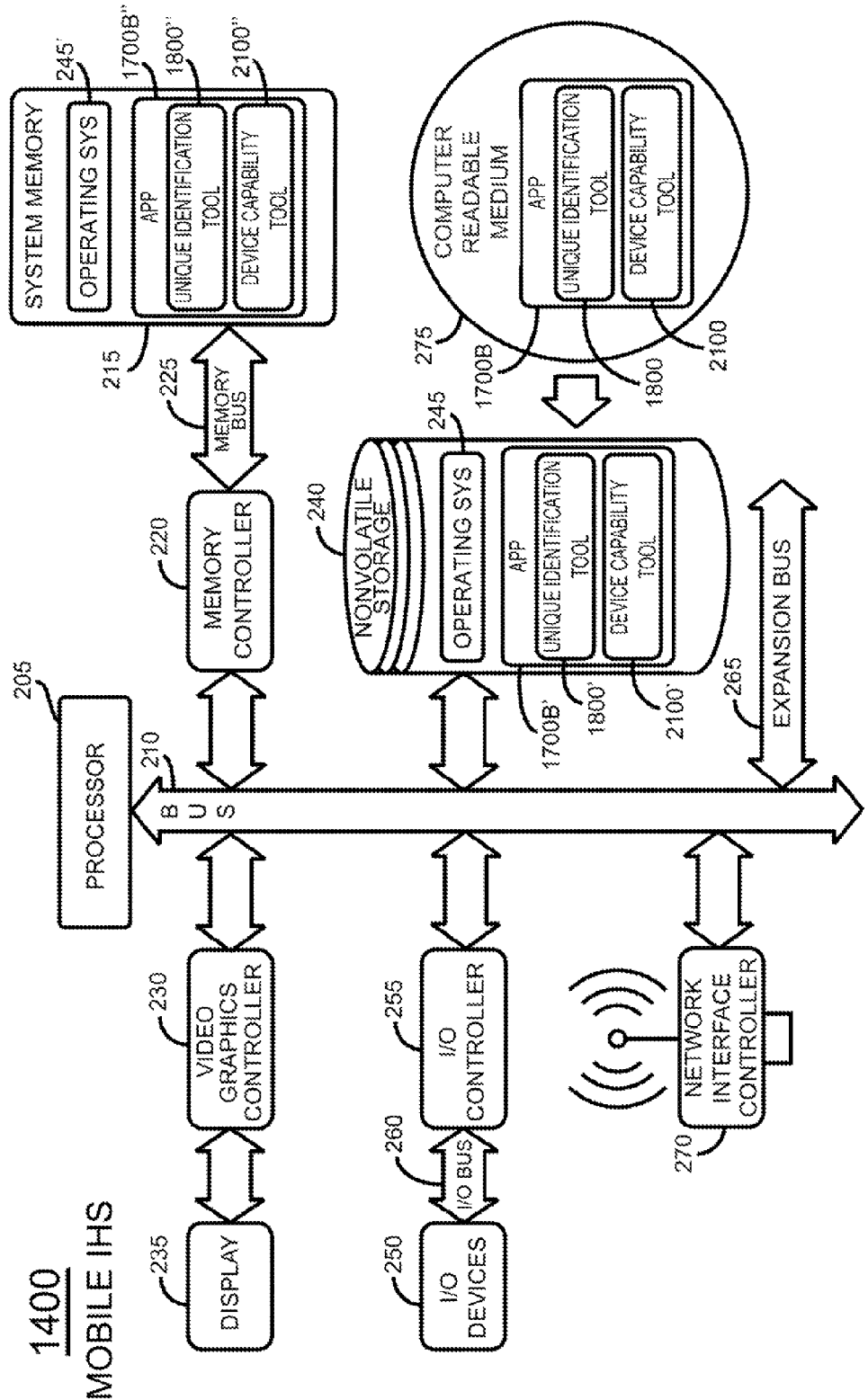

1500
SERVER IHS

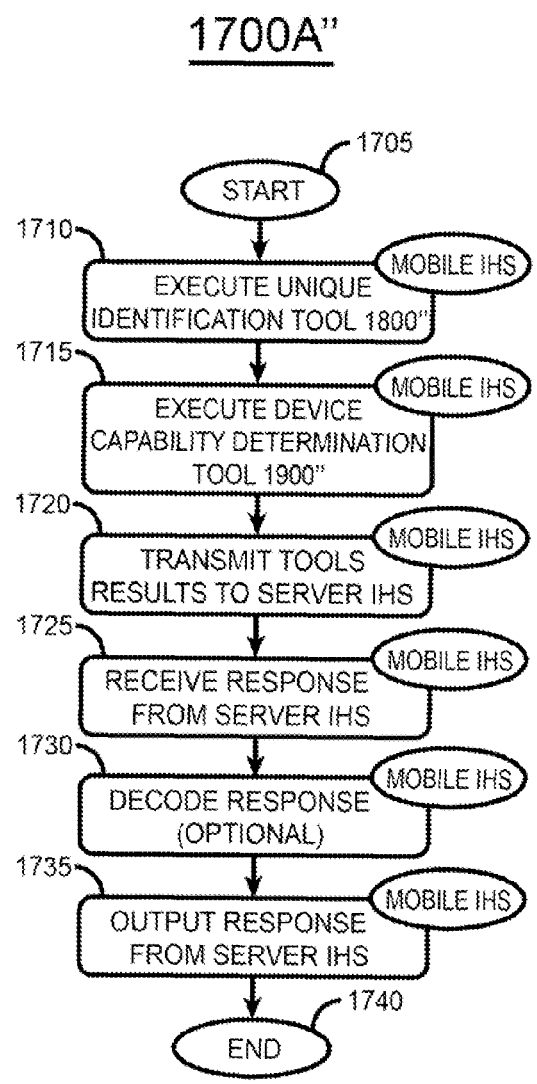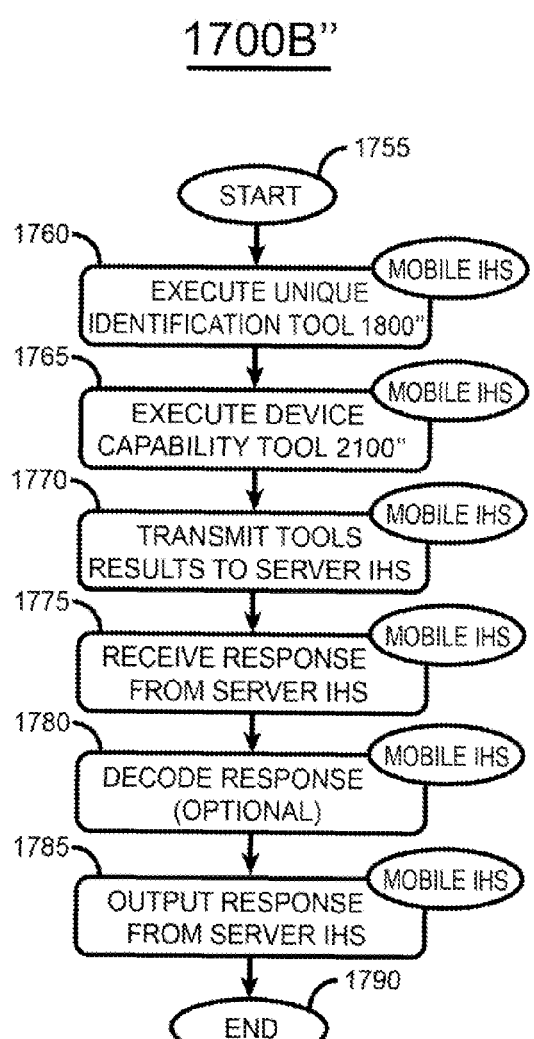

2200"

2100"

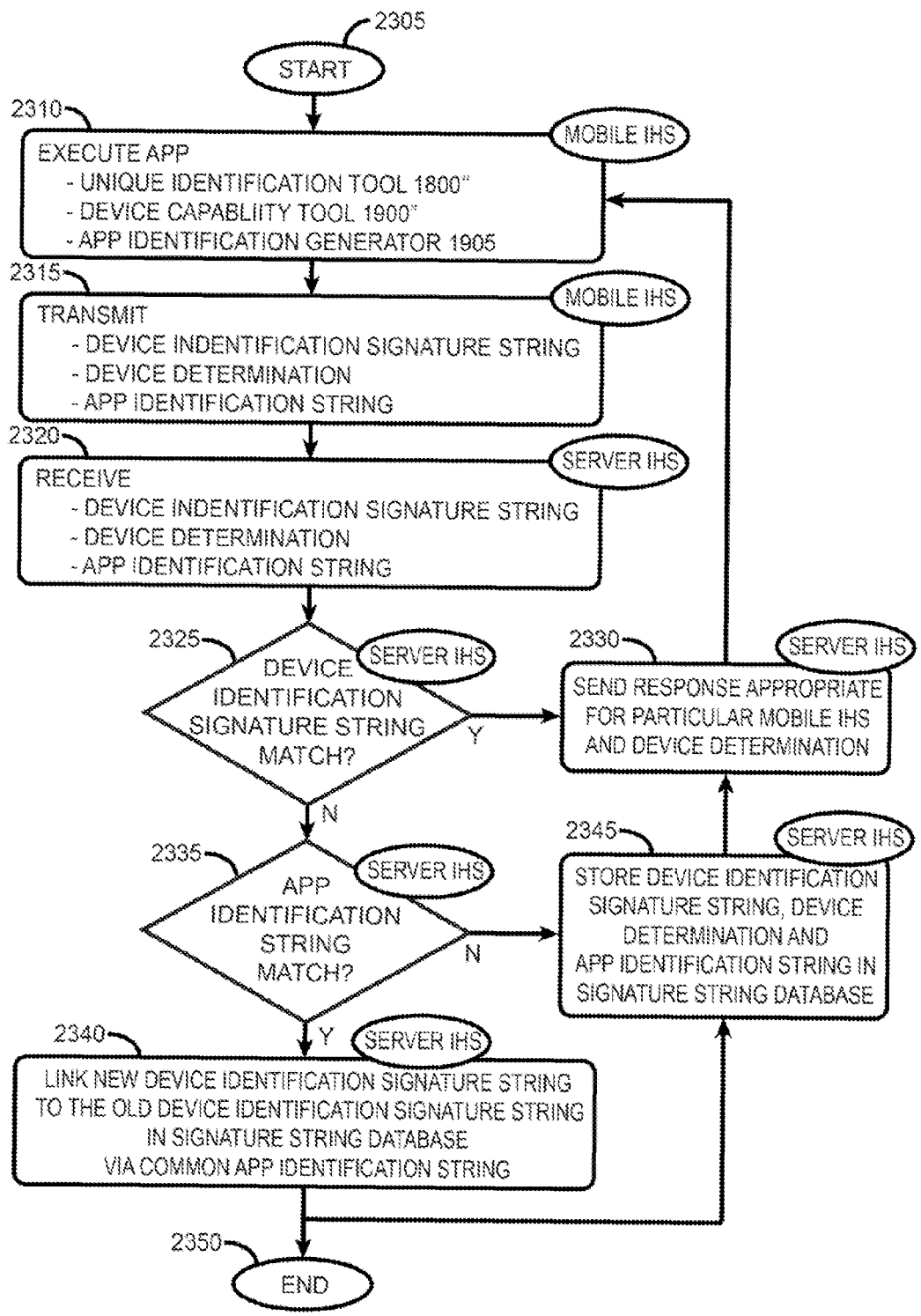

UNIQUE IDENTIFICATION FOR AN INFORMATION HANDLING SYSTEM

BACKGROUND

The disclosures herein relate generally to information handling systems (IHSs) in networked systems. More specifically, the disclosures relates to a mobile IHS that may generate an identifier that uniquely identifies the mobile IHS within the networked system. Mobile IHSs are difficult to remotely uniquely identify because many mobile IHS operating systems do not provide access to unique device identifiers available to applications on the mobile IHS. Moreover, many mobile IHS operating systems do not allow applications to store a unique identifier in the form of a "cookie", a type of persistent data available across applications.

BRIEF SUMMARY

In one embodiment, a method is disclosed that includes receiving, by a unique-identification tool, fixed persistent information related to a mobile information handling system (IHS). The method also includes receiving, by the unique-identification tool, changeable, persistent information related to the mobile information handling system (IHS). The method further includes generating, by the unique-identification tool, a device identifier related to the fixed persistent information and the changeable, persistent information to identify the mobile information handling system (IHS).

In another embodiment, a method is disclosed that includes receiving, by a mobile information processing tool in a server IHS, a device identifier and a device determination from a mobile IHS, the device identifier uniquely identifying the mobile IHS, the device determination indicating performance capabilities of the mobile IHS. The method also includes accessing, by the mobile information processing tool, a device identifier database to determine information associated with the device identifier. The method further includes generating, by the mobile information processing tool, a response that includes the information associated with the device identifier, the response exhibiting content that is compatible with the performance capabilities of the mobile IHS as indicated by the device determination.

In yet another embodiment, a method is disclosed that includes receiving, by a mobile information processing tool in a server IHS, a device identifier from a mobile IHS, to provide a received device identifier that uniquely identifies the mobile IHS. The method also includes receiving, by a device capability determination tool in the server IHS, device capability information from the mobile IHS, the device capability determination tool generating a device determination that indicates performance capabilities of the mobile IHS. The method further includes accessing, by the mobile information processing tool, a device identifier database to determine information associated with the received device identifier. The method still further includes generating, by the mobile information processing tool, a response that includes the information associated with the received device identifier, the response exhibiting content that is compatible with the performance capabilities of the mobile IHS as indicated by the device determination.

BRIEF DESCRIPTION OF THE DRAWINGS

The appended drawings illustrate only exemplary embodiments of the invention and therefore do not limit its scope because the inventive concepts lend themselves to other equally effective embodiments.

FIGS. 11A-11D show representative landscape-oriented smartphones that display representative output that the disclosed app may generate.

FIG. 14 is a block diagram of another embodiment of the disclosed mobile IHS including an app, a unique-identification tool and a device capability tool.

FIGS. 17A-17B are flowcharts that show process flow in different embodiments of the disclosed application.

FIG. 23 is a flowchart that shows process flow in one embodiment of the disclosed communication system.

DETAILED DESCRIPTION

The disclosed mobile information handling system (IHS) includes an application (app) that outputs information to a display. In one embodiment, the app may include a "unique-identification tool", a "device capability determination tool" and an "app identification generator". The usage of the term 'may' indicates that a particular entity has the capability to perform an identified function and does perform that function in at least one embodiment. The unique-identification tool may utilize device information and event information to generate a "device identification signature string" that provides a unique device identifier for the mobile IHS. The device capability determination tool may determine the hardware capability of the mobile IHS, the network capability of the mobile IHS and the network capability between the mobile IHS and a server IHS and generate a "device determination" therefrom. The app identification generator may generate an "app identification string" that provides an identifier for the app. In one embodiment, the app in the mobile IHS may transmit the device identification signature string and the device determination to a server IHS. Depending on the particular device identification signature string, device determination and the app identification string that the server IHS receives, the server IHS may transmit a corresponding appropriate "response" containing specific data to the mobile IHS. The app may display the specific data on the display of the mobile IHS.

Figure 1:
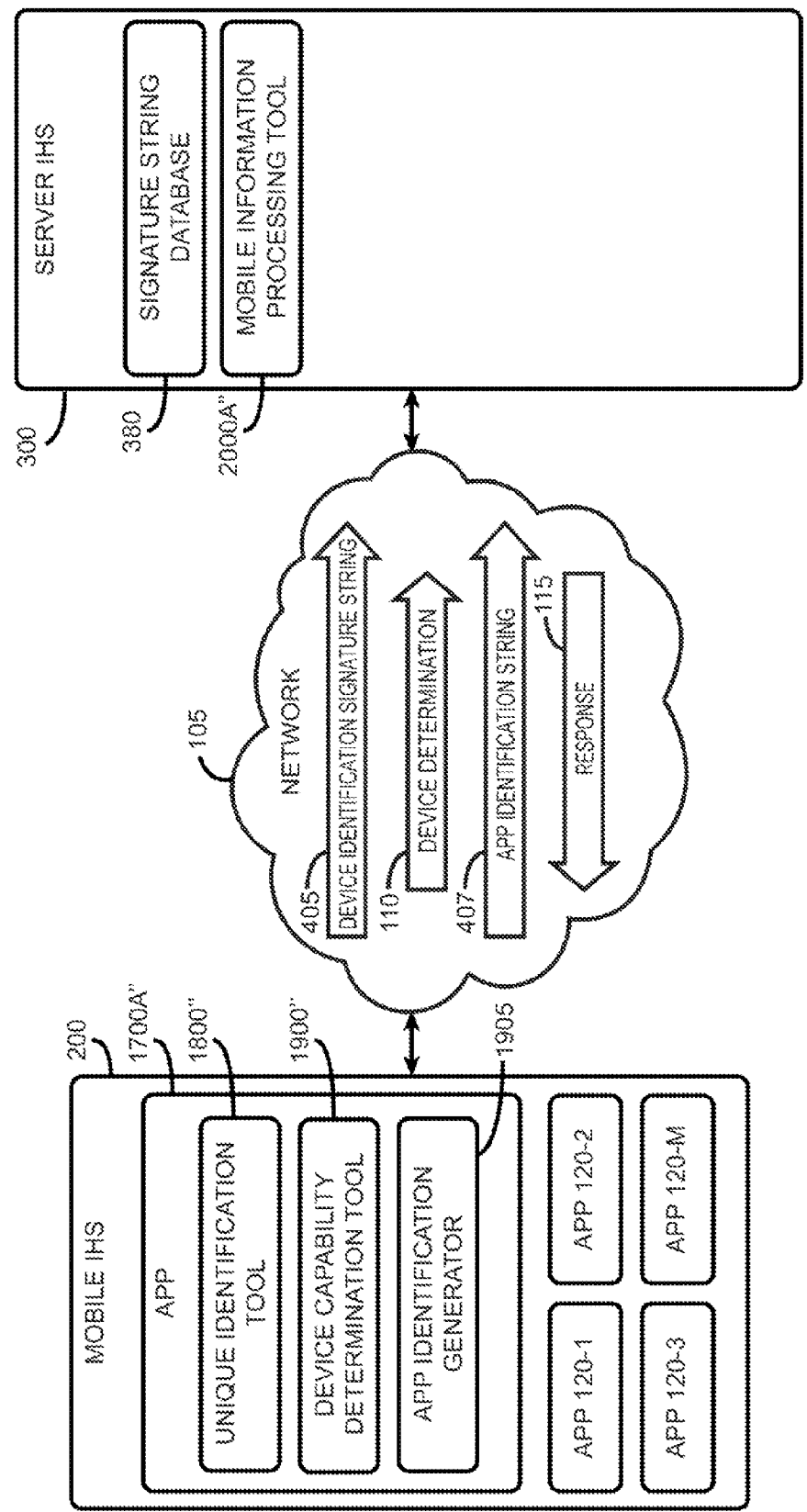
FIG. 1 is a block diagram of one embodiment of the disclosed communication system that includes a mobile information handling system (IHS) that couples via a network to a server IHS.

FIG. 1 is a block diagram of one embodiment of the disclosed communication system 100 that includes a mobile information handling system (IHS) 200 that couples via a network 105 to a server IHS 300. Mobile IHS 200 may transmit information to server IHS 300 via network 105. Server IHS 300 may transmit information to mobile IHS via network 105.

Figure 2:
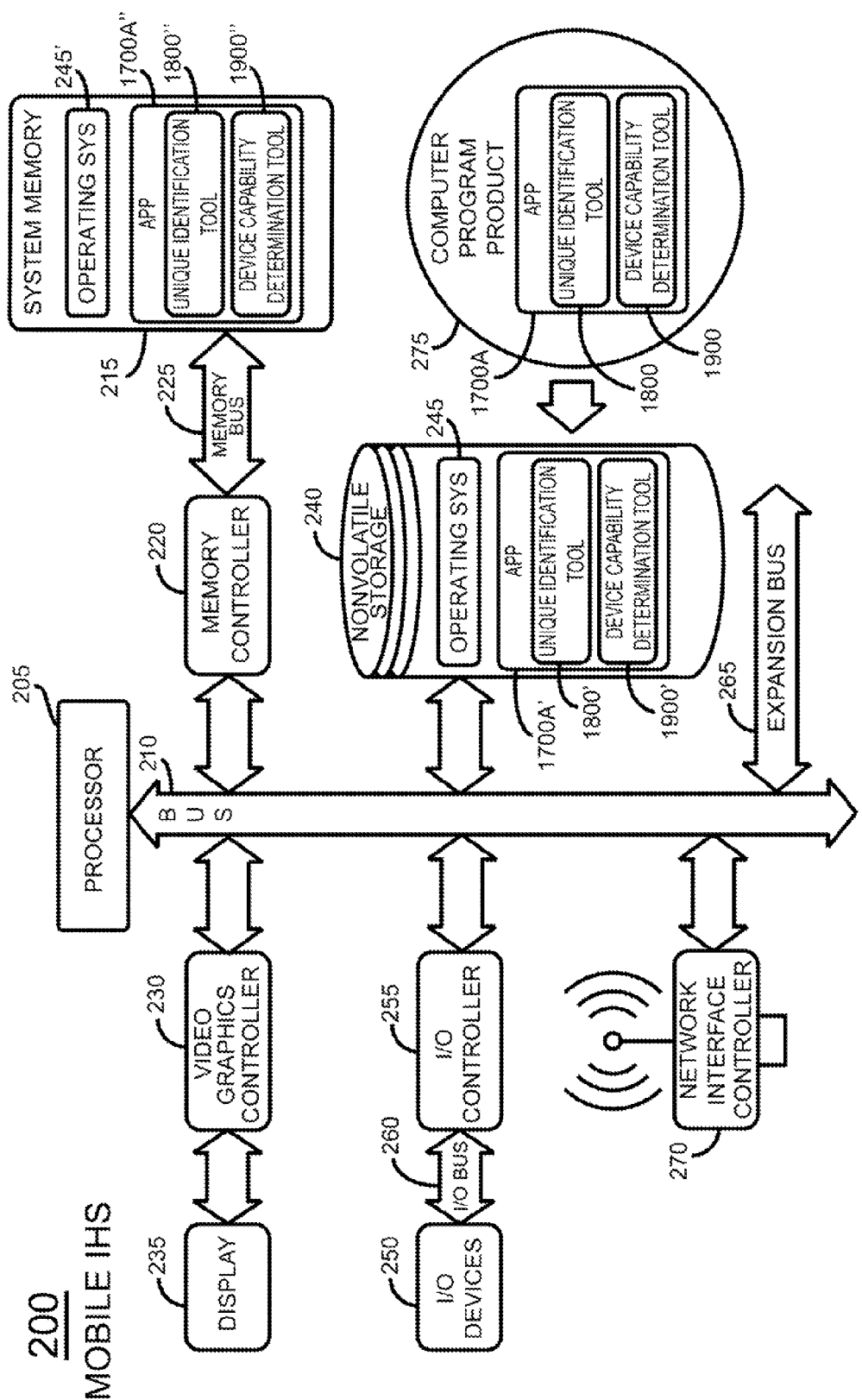
FIG. 2 is a block diagram of the disclosed mobile IHS including an application (app), a unique-identification tool and a device capability determination tool.

FIG. 2 is a block diagram of a mobile information handling system (IHS) 200 that employs an app 1700A, a unique-identification tool 1800 and a device capability determination tool 1900. Mobile IHS 200 includes a processor 205 that may include multiple cores. Mobile IHS 200 processes, transfers, communicates, modifies, stores or otherwise handles information in digital form, analog form or other form. Mobile IHS 200 includes a bus 210 that couples processor 205 to memory 215 via a memory controller 220 and memory bus 225. System memory 215 may also be referred to as main memory. System memory 215 may be a static random access memory (SRAM) array or a dynamic random access memory (DRAM) array. Processor 205 may also include local memory such as L1, L2 and L3 caches. A video graphics controller 230 couples display 235 to bus 210. Nonvolatile storage 240, such as a hard disk drive, CD drive, DVD drive, or other nonvolatile storage couples to bus 210 to provide mobile IHS 200 with permanent storage of information. System memory 215 and nonvolatile storage 240 are both forms of memory stores. Nonvolatile storage 240 stores an operating system 245 (OPERATING SYS) that governs operation of mobile IHS 200. I/O devices 250, such as speakers, a keyboard and a pointing device, may couple to bus 210 via I/O controller 255 and I/O bus 260.

One or more expansion busses 265, such as USB, IEEE 1394 bus, ATA, SATA, PCI, PCIE, DVI, HDMI and other busses, couple to bus 210 to facilitate the connection of peripherals and devices to mobile IHS 200. A network interface controller 270 couples to bus 210 to enable mobile IHS 200 to connect by wire or wirelessly to a network and other information handling systems. Network interface controller 270 may also be called a network communication adapter or a network adapter. While FIG. 2 shows one mobile IHS that employs processor 205, the mobile IHS may take many forms. For example, mobile IHS 200 may take the form of a desktop, server, portable, laptop, notebook, tablet or other form factor computer or data processing system. Mobile IHS 200 may take other form factors such as a gaming device, a personal digital assistant (PDA), a portable telephone device, a communication device or other devices that include a processor and memory.

Figure 3:
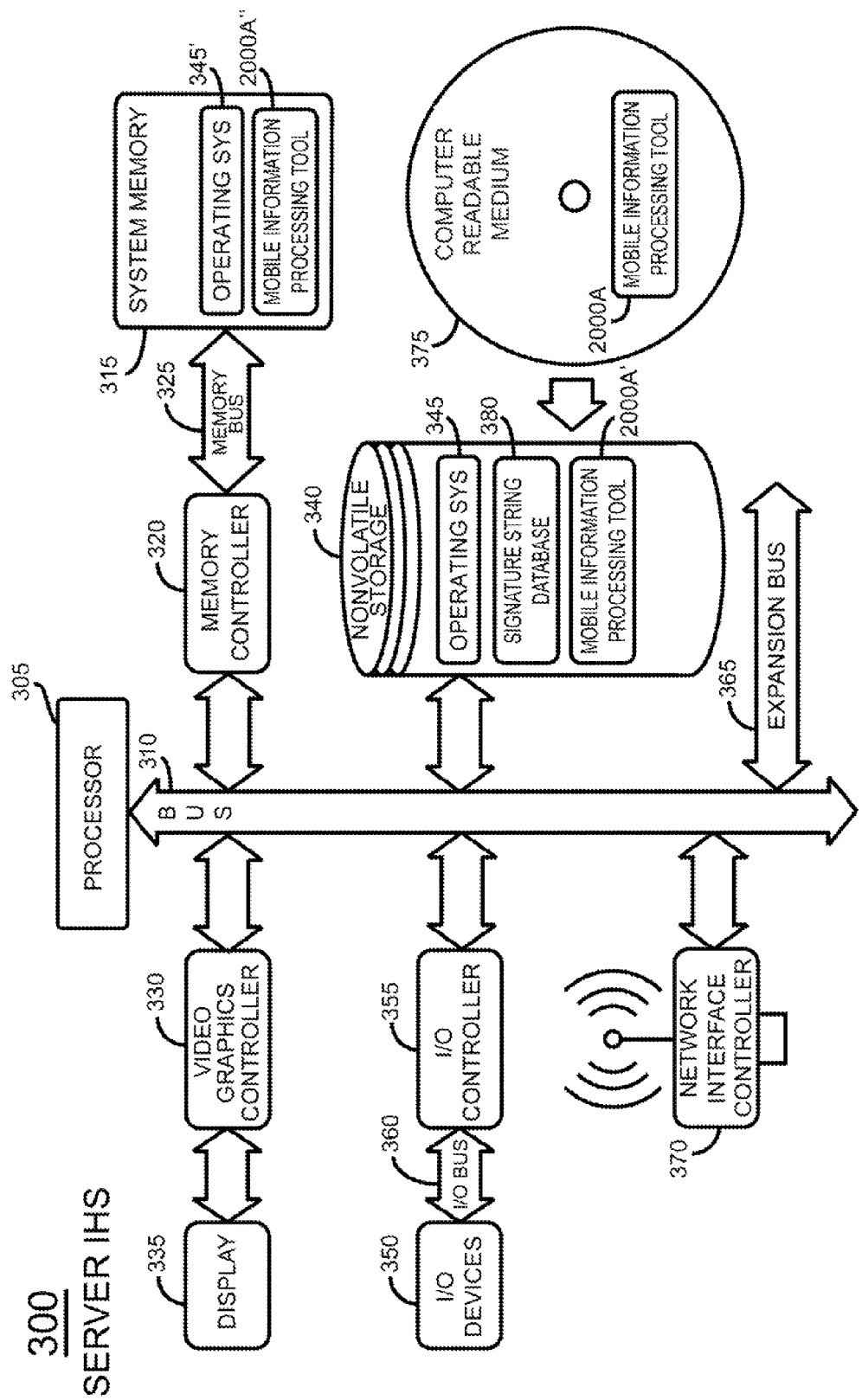
FIG. 3 is a block diagram of the disclosed server IHS including a mobile information processing tool and a signature string database.

Mobile IHS 200 includes an application (app) computer readable medium 1700A on digital medium 275 such as a CD, DVD or other media. Digital medium 275 is a computer readable medium. For simplicity, the term app will be used below to designate an application. In one embodiment, a unique-identification tool 1800 and a device capability determination tool 1900 are packaged within app 1700A as shown in FIG. 2. In actual practice, mobile IHS 200 may store app 1700A, unique-identification tool 1800 and device capability determination tool 1900 in nonvolatile storage 240 as app 1700A', unique-identification tool 1800' and device capability determination tool 1900', respectively. Mobile IHS 200 may also store operating system 245 (OPERATING SYS) in nonvolatile storage 240. When mobile IHS 200 initializes, the mobile IHS loads operating system 245 into system memory 215 for execution as operating system 245'. Mobile IHS 200 also loads app 1700A', unique-identification tool 1800' and device capability determination tool 1900' into system memory 215 for execution as app 1700A", unique-identification tool 1800" and device capability determination tool 1900", respectively FIG. 3 is a block diagram of a server information handling system (IHS) 300 that employs a mobile information processing tool 2000A" to receive information from mobile IHS 200 and transmit an appropriate response to mobile IHS 200. Server IHS 300 includes a processor 305 that may include multiple cores. Server IHS 300 processes, transfers, communicates, modifies, stores or otherwise handles information in digital form, analog form or other form. Server IHS 300 includes a bus 310 that couples processor 305 to memory 315 via a memory controller 320 and memory bus 325. System memory 315 may also be referred to as main memory. System memory 315 may be a static random access memory (SRAM) array or a dynamic random access memory (DRAM) array. Processor 305 may also include local memory such as L1, L2 and L3 caches. A video graphics controller 330 couples display 335 to bus 310. Nonvolatile storage 340, such as a hard disk drive, CD drive, DVD drive, or other nonvolatile storage couples to bus 310 to provide server IHS 300 with permanent storage of information. System memory 315 and nonvolatile storage 340 are both forms of memory stores. Nonvolatile storage 340 stores an operating system 345 (OPERATING SYS) that governs operation of server IHS 300. I/O devices 350, such as speakers, a keyboard and a pointing device, couple to bus 310 via I/O controller 355 and I/O bus 360.

One or more expansion busses 365, such as USB, IEEE 1394 bus, ATA, SATA, PCI, PCIE, DVI, HDMI and other busses, couple to bus 310 to facilitate the connection of peripherals and devices to server IHS 300. A network interface controller 370 couples to bus 310 to enable server IHS 300 to connect by wire or wirelessly to a network and other information handling systems. Network interface controller 370 may also be called a network communication adapter or a network adapter. While FIG. 3 shows one server IHS that employs processor 305, the server IHS may take many forms. For example, server IHS 300 may take the form of a desktop, portable, laptop, notebook, tablet or other form factor computer or data processing system. Server IHS 300 may take other form factors such as a gaming device, a personal digital assistant (PDA), a portable telephone device, a communication device or other devices that include a processor and memory.

Server IHS 300 includes a mobile information processing tool computer readable medium 2000A on digital medium 375 such as a CD, DVD or other media. Digital medium 375 is a computer readable medium. For simplicity, the term mobile information processing tool will be used below. Server IHS 300 may store mobile information processing tool 2000A in nonvolatile storage 340 as mobile information processing tool 2000A'. Server IHS 300 may also store operating system 345 (OPERATING SYS) and signature string database 380 in nonvolatile storage 340. Signature string database may also be called a device identifier database. When server IHS 300 initializes, the server IHS loads operating system 345 into system memory 315 for execution as operating system 345'. Server IHS 300 also loads mobile information processing tool 2000A' into system memory 315 for execution as mobile information processing tool 2000A".

Returning now to FIG. 1, this figure is a block diagram of one embodiment of a mobile IHS 200 that couples via a network 105 to a server IHS 300. A user of mobile IHS 200 may select an app 1700A" to interact with mobile IHS 200. App 1700A" may employ unique-identification tool 1800" to generate a device identification signature string 405, as explained in detail below with respect to FIG. 4. The device identification signature string 405 may uniquely identify the mobile IHS 200. App 1700A" may employ a device capability determination tool 1900" to generate a device determination 110. The device determination 110 indicates the capabilities of mobile IHS 200, as explained in more detail below. In one embodiment, app 1700A" further includes an app identification generator 1905 that generates an app identification string 407 that is unique to that app. An app identification string may also be referred to as an app identifier. Each app in mobile IHS 200 may include a respective app identification generator that generates a different random app identification string 407, as discussed in more detail below. App 1700A" may transmit the device identification signature string 405, the device determination 110 and app identification string 407 to server IHS 300 via network 105. In another embodiment, app 1700A" may transmit other data, such as user ID, password, challenge question answers and other information to server IHS 300 via network 105. In other words, application 1700A" may transmit a user ID, password along with the device identification signature string 405 that acts as an identifier of mobile IHS 200 to server IHS 300. Server 300 verifies the authenticity of the user ID by testing the user ID, password and device identification signature string against information in a database, as described in more detail below.

In one embodiment, a mobile information processing tool 2000A" of server IHS 300 may receive the transmitted device identification signature string 405, the device determination 110 and app identification string 407. The mobile information processing tool 2000A" may search a signature string database 380 in server IHS 300 for a matching device identification signature string entry. If mobile information processing tool 2000A" finds a matching device identification signature string entry in signature string database 380, then server IHS 300 effectively knows that the received data came from a particular mobile IHS 200, namely the mobile IHS that has device identification signature string as its device identifier. In other words, server IHS 300 effectively recognizes a particular received signature string 405 as being unique to a the particular mobile IHS 200 that generated that particular received signature string 405 that is already in its signature string database 380.

However, if mobile information processing tool 2000A" of server IHS 300 finds no matching device identification signature string entry in signature string database 380, then mobile information processing tool 2000A" may create a new entry for device identification signature string 405 in signature string database 380. In one embodiment, the mobile information processing tool 2000A" may receive and associate the device determination 110 with device identification signature string 405 in signature string database 380. Mobile information processing tool 2000A" may also receive and associate app identification string 407 with device identification signature string 405 and device determination 110 in signature string database 380. Providing the unique device identification signature string 405, device determination 110 and app identification string 407 to mobile information processing tool 2000A" in this manner, allows server IHS 300 to provide appropriate responsive information 115 to mobile IHS 200. It is noted that each app identification generator 1905 in app 1700A" and in apps 120-1, 120-2, 120-3, . . . 120-M generates a different pseudo-random app identification string for its respective app. However, each time an app and its respective app identification generator 1905 execute, app identification generator 1905 will generate the same app identification string for that particular app.

As discussed below in more detail, a change in event information may cause device identification signature string 405 for a particular mobile IHS 200 to change to a new device identification signature string 405, the previous device identification signature string 405 being called the old device identification signature string 405. In that event, the mobile information processing tool 2000A" in server IHS 380 will not initially include an entry in its signature string database 380 for the new device identification signature string 405. If mobile information processing tool 2000A" finds no entry in signature string database 380 corresponding to the new device identification signature string 405, then mobile information processing tool 2000A" performs a search in signature string database 380 to find an app identification string 407 that matches the currently received app identification string 407. If mobile information processing tool 2000A" finds such an app identification string match, then mobile information processing tool 2000A" accesses the old device identification string 405 associated with app identification string 407 and associates the new device identification string 405 with the old device identification string 405 and the device determination associated with the old device identification string 405. This enables communication system 100 to effectively extend the life of the old device identification signature string 405 by linking the new device identification signature string 405 to the old device identification signature string 405 via a common app identification string 407. As apps 1700A", 120-1, 120-2, 120-3, . . . 120-M execute over time, mobile IHS 200 sends corresponding app identification string 407 along with associated device identification signature string 405 and device determination 110, for storage by server IHS 300 in its signature string database 380.

Device identification signature string database 380, also referred to as identifier database 380, may associate many types of information with each device identification signature string entry in the signature string database 380. For example, if app 1700A" relates to mapping, app 1700A" may transmit a set of GPS coordinates from mobile IHS 200 to server IHS 300 via network 105. The mobile information processing tool 2000A" may receive the set of GPS coordinates and associate the set of GPS coordinates with device identification signature string 405 in signature string database 380. For example, if app 1700A" relates to outdoor recreation and includes advertising information, app 1700A" may transmit information indicating parks most often visited by the user, preferred hiking routes, and other information for determining user interests to enable serving responsive, relevant advertisements.

The mobile information processing tool 2000A" may access the information associated with device identification signature string 405 of signature string database 380 and the corresponding device determination 110 to determine specific data to transmit as a response 115 to mobile IHS 200. The mobile information processing tool 2000A" may transmit the specific data as response 115 back to mobile IHS 200 via network 105. App 1700A" of mobile IHS 200 may receive the response 115 and output the specific data contained therein. For example, app 1700A" may display the specific data on display 235, and/or output the information acoustically as appropriate for the response.

Mobile IHS 200 may include multiple apps, including app 1700A", app 120-1, app 120-2, app 120-3, . . . , app 120-M. In one embodiment, app 120-1 may include a unique-identification tool 1800" and a device capability determination tool 1900", as does app 1700A". If app 120-1 and app 1700A" execute at the same time, unique-identification tool 1800" in app 120-1 and unique-identification tool 1800" in app 1700A" will each generate a device identification signature string 405. Because app 1700A" generates device identification signature string 405 and app 120-1 generates device identification signature string 405 at the same time and on the same mobile IHS 200, these two device identification signature strings are identical in one embodiment. Device identification signature string 405 may change temporally, as described in detail below in FIG. 4. Each of apps 120-2, 120-3, . . . 120-M may also include tools such as unique-identification tool 1800" and device capability determination tool 1900'.

Figure 4:
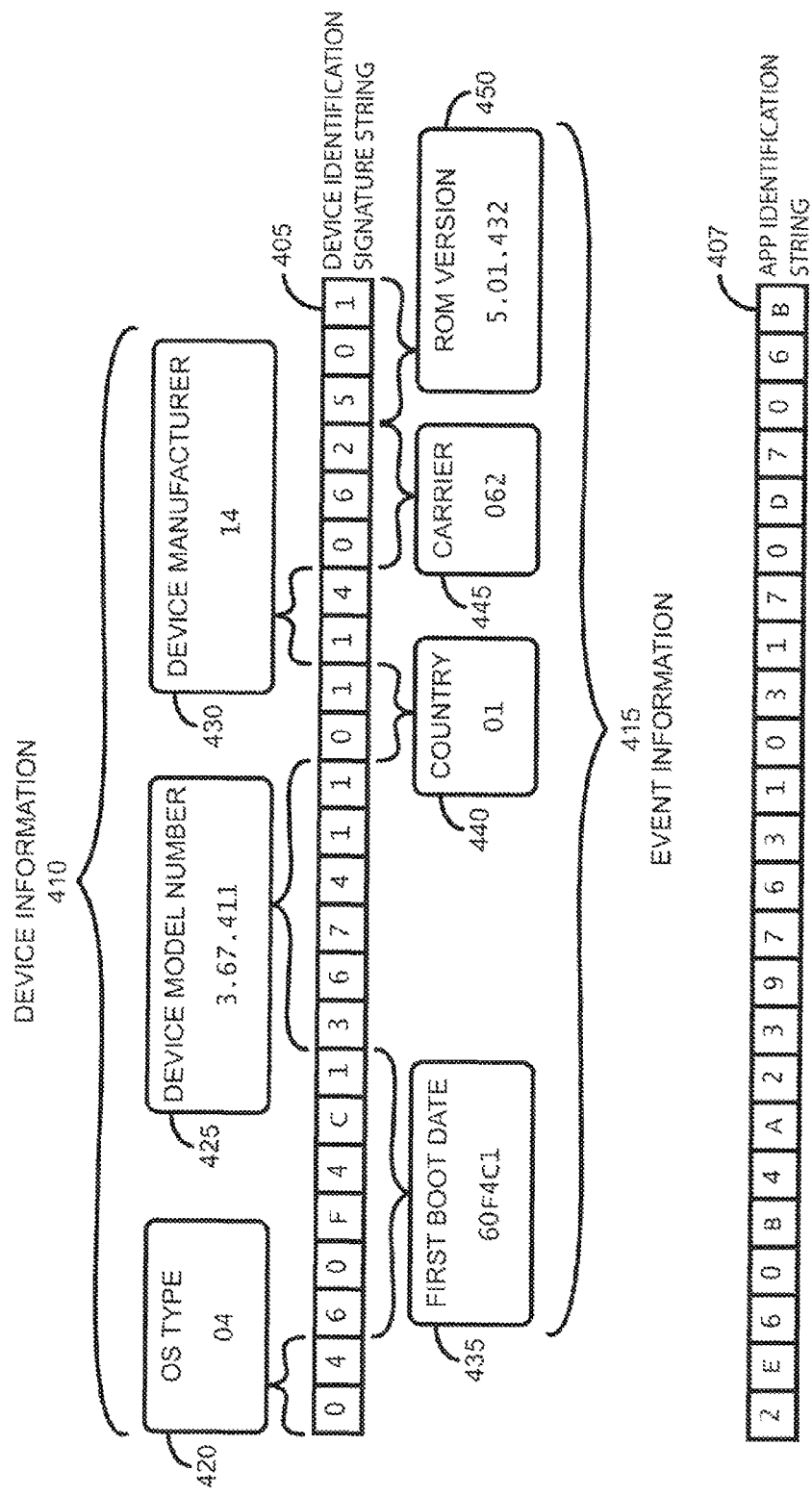
FIG. 4 shows a representative hash that the disclosed unique-identification tool may generate

FIG. 4 is a diagram of a representative device identification signature string 405 and a representative app identification string 407 that unique-identification tool 1800" may generate. Device identification signature string 405 may also be referred to as an identifier. Unique-identification tool 1800" may generate device identification signature string 405 from both device information 410 and event information 415. Device information 410 is fixed persistent information, i.e. information that may stay the same for the lifetime of mobile IHS 200. Device information 410 may exhibit many value types, including but not limited to, numerical values, character values, string values, and Boolean values. Common numerical values may be in any form, including binary, octal, decimal and hexadecimal. For example, device information 410 may include operating system (OS) type 420, device model number 425, device manufacturer 430 and device model name, as illustrated below in TABLE 1.

TABLE 1

| Device Information 410 | Value |
|---|---|
| OS type 420 | 04 |
| Device model number 425 | 3.67.411 |
| Device manufacturer 430 | 14 |
| Device model name | iPad |

(iPad is a trademark of Apple Inc.)

As illustrated in TABLE 1, OS type 420 may exhibit a value of "04". "04" may be the numerical designation for a particular operating system. Device model number 425 may exhibit a value of "3.67.411". "3.67.411" may be the numerical designation for a particular model of mobile IHS 200. Device manufacturer 430 may exhibit a value of "14". "14" may be the numerical designation for a particular device manufacturer. Device model name may exhibit a value of "iPad". "iPad" may be the string designation of a particular device model name (iPad is a trademark of Apple Inc.). Device information 410 may also include values that indicate if mobile IHS 200 includes hardware features such as a touch screen, a keypad, a front-facing camera, a rear-facing camera, CPU type, onboard memory and secondary flash memory storage capacity.

Event information 415 is changeable, persistent information, information that may stay the same for an appreciable amount of time, but may not stay the same for the lifetime of mobile IHS 200. Event information 415 may include many value types, including, but not limited to, numerical values, character values, string values, and Boolean values. Common numerical values may be in any form, including binary, octal, decimal and hexadecimal. For example, event information 415 may include, but is not limited to, first boot date 435, country 440, carrier 445 and ROM version (firmware version) 450, as shown below in TABLE 2. The time values shown in Table 2 are a matter of design choice and will vary according to the particular implementation.

TABLE 2

| Event Information 415 | Value | Exemplary Approximate Temporal Persistence (TIME) |
|---|---|---|
| First boot date 435 | 60F4C1 | Approximately 1 month up to approximately 2 years |
| Country 440 | 01 | Approximately 1 day up to approximately 2 years |
| Carrier 445 | 062 | Approximately 1 day up to approximately 2 years |
| ROM version 450 | 5.01.432 | Approximately 1 month up to approximately 2 years |

As illustrated in TABLE 2, first boot date 435 may exhibit a value of "60F4C1". "60F4C1" may be the numerical designation for time in seconds after a particular epoch, denoting when the mobile IHS 200 was first booted. For example, an epoch is utilized in portable operating system interface for Unix (POSIX) time determination. First boot date 435 may temporally persist without change for any period, such as a period of approximately 1 month to approximately 2 years. Country 440 may exhibit a value of "01". "01" may be the numerical designation for a particular country the mobile IHS 200 is currently located. Country 440 may temporally persist without change for any period, such as a period of approximately 1 day up to approximately 2 years. Carrier 445 may exhibit a value of "062". "062" may be the numerical designation for a mobile network service provider. Carrier 445 may temporally persist without change for any period, such as a period of approximately 1 day up to approximately 2 years. ROM version 450 may exhibit a value of "5.01.432". "5.01.432" may be the numerical designation for a particular version of the ROM. ROM version 450 may temporally persist without change for any period, such as a period of approximately 1 month up to approximately 2 years. Event information 415 may include changeable, persistent information such as values that indicate mobile IHS 200 time zone information, time at which the OS was built, time at which the app 1700A" was installed, time at which the mobile IHS 200 was last booted and derivatives thereof. Event information may also include timestamps of particular files and folders on mobile IHS 200 or a difference of two or more timestamps of certain files and folders on mobile IHS 200. For example, timestamps of particular files and folders on mobile IHS 200 may include, but are not limited to, events such as the time and date of: a first photo taken on mobile IHS 200, a newly created file on mobile IHS 200 and when a particular file is modified on mobile IHS 200.

Unique-identification tool 1800" in mobile IHS 200 may generate device identification signature string 405 from both device information 410 and event information 415. In one embodiment, unique-identification tool 1800" may intersperse the device information 410 and the event information 415 to generate the device identification signature string 405. Unique-identification tool 1800" may concatenate some or all of the device information 410 with event information 415 to generate device identification signature string 405. For example, in FIG. 4, the hexadecimal value of the first boot date 435 is "60F4C1". The entirety of value "60F4C1" is concatenated in the device identification signature string 405. The value of the ROM version 450 is "5.01.432". Unique-identification tool 1800" may concatenate the three first digits of value "5.01.432", "501" to other device information 410 and event information 415 to generate the device identification signature string 405. In one embodiment, generating the device identification signature string 405 is referred to as creating a hash or hashing. In another embodiment, the unique-identification tool 1800" may concatenate the device information 410 and event information 415, and utilize a hashing function, such as the MD5 message-digest algorithm or secure hash algorithm (SHA-1) to generate device identification signature string 405, Returning now to FIG. 2, device capability determination tool 1900" may generate a device determination 110. To generate the device determination 110, device capability determination tool 1900" may determine device capabilities of mobile IHS 200. Device capabilities of mobile IHS 200 may include the hardware capability of the mobile IHS 200, the network capability of mobile IHS 200 and the network capability between the mobile IHS 200 and the server IHS 300. The hardware capability of mobile IHS 200 may include any device capability parameter that relates to the hardware function, state or capability of the hardware of mobile IHS 200. For example, the hardware capability of mobile IHS 200 may include the resolution of display 235, battery life, video graphics controller 230, memory controller 220, maximum size of system memory 215, amount of system memory 215 in use, maximum size of nonvolatile storage 240, amount of nonvolatile storage 240 in use, processor 205, percentage of processor 205 in use and the I/O devices 250 coupled to mobile IHS 200.

The network capability of mobile IHS 200, also referred to as networking information, may include any device capability parameter that relates to the networking hardware, state or capability of the networking hardware of mobile IHS 200. For example, the network capability of mobile IHS 200 may include network interface controller 270, network connection type, available networks, network signal strengths, network uptimes and network latency. The network capability between the mobile IHS 200 and the server IHS 300 may include any device capability parameter that relates to the hardware, state or capability of the connection of mobile IHS 200 to server IHS 300 via network 105. For example, the network capability between the mobile IHS 200 and the server IHS 300 may include connection type, speed, bandwidth, latency, jitter and uptime.

Device capability determination tool 1900" may determine the performance capabilities of mobile IHS 200. Performance capabilities indicate the level of performance of the device parameters of mobile IHS 200. For example, in one embodiment, if each device capability parameter exhibits a value greater than a corresponding predetermined threshold, also referred to as a performance level, the performance capability of each device capability parameter may be considered high. Each device capability parameter may exhibit multiple thresholds. Device capability determination tool 1900" may consider multiple capability parameters with multiple thresholds, respectively. The device capability determination tool 1900" may generate different device determinations when different device capability parameters exceed corresponding predetermined thresholds, respectively. Simply put, because of the performance capabilities of mobile IHS 200, also referred to as performance levels of mobile IHS 200, the device capability determination tool 1900" may generate the device determination that indicates the size, type, format and content of information, as an indication of the complexity of content that may be processed by mobile IHS 200. For example, if the network bandwidth is low, below a predetermined threshold, the device capability determination tool 1900" may generate a device determination that indicates that server IHS 300 should transmit a low bandwidth response, such as text data, to mobile IHS 200. In another example, if the bandwidth is high, above the predetermined threshold, the device capability determination tool 1900" may generate a device determination that indicates that server IHS 300 should transmit video data to mobile IHS 200.

Figure 5A:
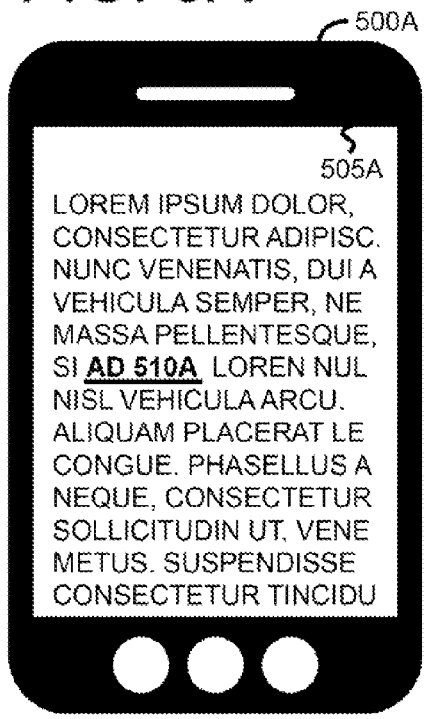
FIGS. 5A-5D show representative portrait-oriented smartphones that display representative output that the disclosed app may generate.

FIG. 5A shows a representative portrait-oriented smartphone 500A that may be employed as mobile IHS 200. Smartphone 500A includes a display area 505A that corresponds to display 235 of mobile IHS 200. This illustrates one example of information that app 1700A" may generate on display area 505A. App 1700A" may display textual information that includes an in-line text advertisement AD 510A. A user of mobile IHS 200 may select an app 1700A" to interact with mobile IHS 200. App 1700A" may employ unique-identification tool 1800" to generate device identification signature string 405. App 1700A" may employ a device capability determination tool 1900" to generate a device determination 110. Device determination 110 may indicate that display area 505A should display in-line text advertisement AD 510A because display resolution is 300 pixels by 600 pixels, available system memory 215 is low, connection bandwidth is low, and connection speed is low. In other words, device determination 110 may indicate that display area 505A should display an advertisement AD 510A that is within the technical capabilities of mobile IHS 200 and its network connection. This avoids overdriving mobile IHS 200 with more information that it can handle.

App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search signature string database 380 for a matching device identification signature string entry. If mobile information processing tool 2000A" does not find a matching device identification signature string entry in signature string database 380, then mobile information processing tool 2000A" may create a new entry for device identification signature string 405 in the device identification signature string database 380. Device identification signature string 405 provides a identifier for server IHS 300 to uniquely identify a particular mobile IHS 200 to server IHS 300. In one embodiment, the mobile information processing tool 2000A" of server IHS 300 may receive and associate the device determination 110 with device identification signature string 405 in signature string database 380. In this manner mobile processing tool 2000A" effectively knows the capabilities of the particular mobile HIS 200.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content as well as the form that content should take on mobile IHS 200. Signature string database 380 may associate the device identification signature string 405 with advertising content such as financial services content, literature content, home decorating content, vacation content and web hosting content, and other content. The content of the advertisement AD 510A may be based on advertising content categories associated with the device identification signature string 405 in signature string database 380. The non-volatile storage 340 or signature string database 380 may store in-line text advertisement AD 510A of FIG. 5A. The mobile information processing tool 2000A" may generate a response 115 that includes in-line text advertisement AD 510A. The mobile information processing tool 2000A" may transmit response 115 to mobile IHS 200 via network 105. App 1700A" may receive response 115 and output AD 510A contained therein to display area 505A.

Figure 5B:
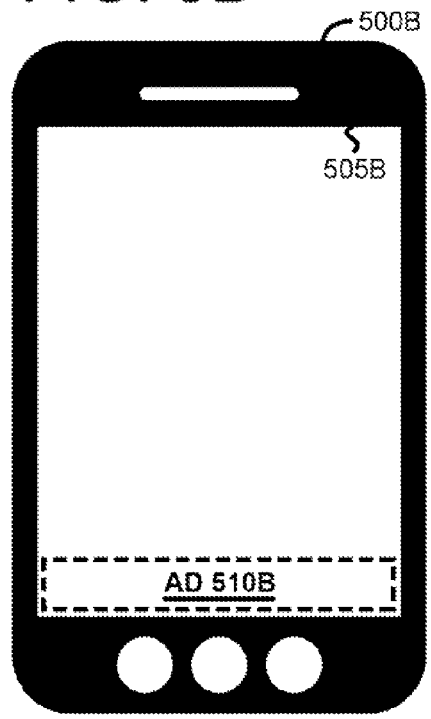

FIG. 5B shows a representative portrait-oriented smartphone 500B that may be employed as mobile IHS 200. Smartphone 500B includes a display area 505B that corresponds to display 235 of mobile IHS 200. This illustrates another example of information that app 1700A" may generate on display area 505B. App 1700A" may include a text advertisement AD 510B. A user of mobile IHS 200 may select an app 1700A" to interact with mobile IHS 200. App 1700A" may employ unique-identification tool 1800" to generate a device identification signature string 405. App 1700A" may employ device capability determination tool 1900" to generate a device determination 110. In one embodiment, device determination 110 may indicate that display area 505B should display text advertisement AD 510B with dimensions 300 pixels by 50 pixels because display resolution is 300 pixels by 600 pixels, available system memory 215 is medium, connection bandwidth is low, and connection speed is low. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. Device identification signature string 405 provides an identifier for server IHS 300 to uniquely identify a particular mobile IHS 200 to server IHS 300. In one embodiment, the mobile information processing tool 2000A" may receive and associate the device determination 110 with device identification signature string 405 in signature string database 380. In this manner mobile processing tool 2000A" effectively knows the capabilities of the particular mobile HIS 200.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content as well as the form that content should take on mobile IHS 200. Signature string database 380 may associate the device identification signature string 405 with advertising content such as financial services content, literature content, home decorating content, vacation content and web hosting content, and other content. The content of the advertisement AD 510B may be based on the advertising content categories associated with the device identification signature string 405 in signature string database 380. The non-volatile storage 340 or signature string database 380 may store text advertisement AD 510B with dimensions 300 pixels by 50 pixels. The mobile information processing tool 2000A" may generate a response 115 that includes text advertisement AD 510B with dimensions 300 pixels by 50 pixels. The mobile information processing tool 2000A" may transmit response 115 to mobile IHS 200 via network 105. App 1700A" may receive response 115 and output AD 510B contained therein to display area 505B.

Figure 5C:
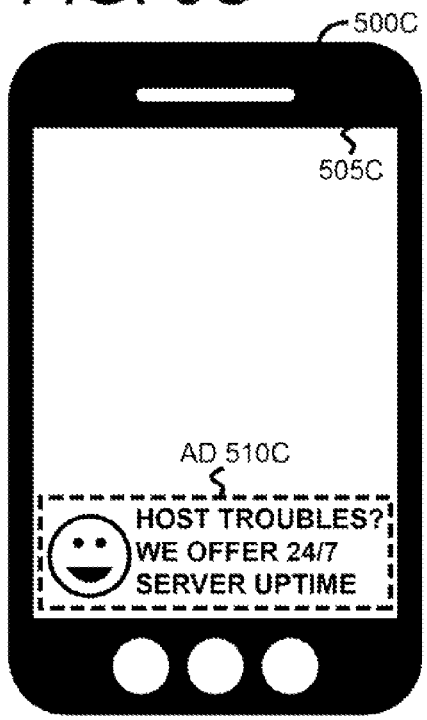

FIG. 5C shows a representative portrait-oriented smartphone 500C that may be employed as mobile IHS 200. Smartphone 500C includes a display area 505C that corresponds to display 235 of mobile IHS 200. This illustrates one example of information that app 1700A" may generate on display area 505C. App 1700A" may include a fixed graphic advertisement AD 510C. A user of mobile IHS 200 may select an app 1700A" to interact with mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 505C should display graphic advertisement AD 510C with dimensions 300 pixels by 100 pixels because display resolution is 300 pixels by 600 pixels, available system memory 215 is medium, connection bandwidth is medium, and connection speed is medium. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" of server IHS 300 may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content. Signature string database 380 may associate the device identification signature string 405 with advertising content such as financial services content, literature content, home decorating content, vacation content and web hosting content. The content of the advertisement AD 510C may be based on the advertising content categories associated with the device identification signature string 405 in signature string database 380. The non-volatile storage 340 or signature string database 380 may store graphic advertisement AD 510C with dimensions 300 pixels by 100 pixels. The mobile information processing tool 2000A" may generate a response 115 that includes graphic advertisement AD 510C with dimensions 300 pixels by 100 pixels. The mobile information processing tool 2000A" may transmit response 115 to mobile IHS 200 via network 105. App 1700A" may receive response 115 and output AD 510C contained therein to display area 505C.

Figure 5D:
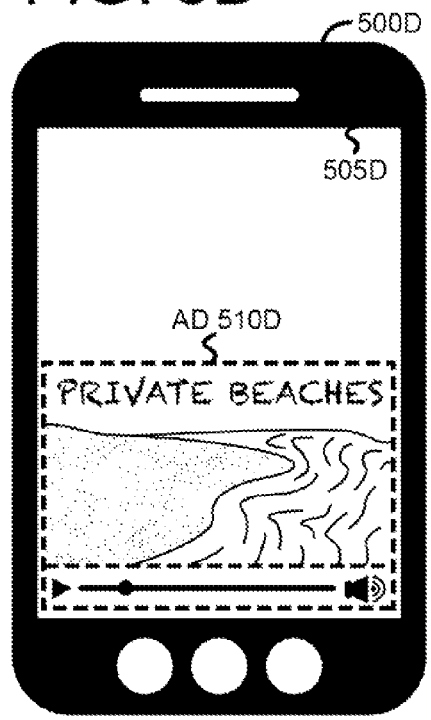

FIG. 5D shows a representative portrait-oriented smartphone 500D that may be employed as mobile IHS 200. Smartphone 500D includes a display area 505D that corresponds to display 235 of mobile IHS 200. This illustrates one example of information that app 1700A" may generate on display area 505D. App 1700A" may include a video advertisement AD 510D. A user of mobile IHS 200 may select an app 1700A" to interact with mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 505D should display video advertisement AD 510D with dimensions 300 pixels by 200 pixels because display resolution is 300 pixels by 600 pixels, available system memory 215 is high, connection bandwidth is medium, and connection speed is high. App 1700A" may transmit the device identification signature string 405 and the device determination 110 to server IHS 300 via network 105.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content. Signature string database 380 may associate the device identification signature string 405 with advertising content such as financial services content, literature content, home decorating content, vacation content and web hosting content. The content of the advertisement AD 510D may be based on the advertising content categories associated with the device identification signature string 405 in signature string database 380. The non-volatile storage 340 or signature string database 380 may store video advertisement AD 510D with dimensions 300 pixels by 300 pixels. The mobile information processing tool 2000A" may generate a response 115 that includes video advertisement AD 510D with dimensions 300 pixels by 300 pixels. The mobile information processing tool 2000A" may transmit response 115 to mobile IHS 200 via network 105. App 1700A" may receive response 115 and output AD 510D contained therein to display area 505D. App 1700A" may also output AD 610D acoustically on a speaker, one of I/O devices 250.

In the above embodiments of FIGS. 5A-5D, the respective device determinations 110 of these embodiments indicate device capabilities of mobile IHS 200 that increase from low to high. When mobile information processing tool 2000A" of server IHS 300 receives the device identification signature string 405 and device determination 110, server IHS 300 serves advertising content, or other content, that varies according to the capabilities of mobile IHS 200 to receive and output that content to the user. As the device capabilities of mobiles IHS 200 increase, the advertising content may change from text, to a fixed image and to full motion video. In other words, as the device capabilities of mobile IHS 200 become more robust, mobile information processing tool 2000A" may transmit a response 115 with more informationally intensive content to mobile IHS 200.

Figure 6B:
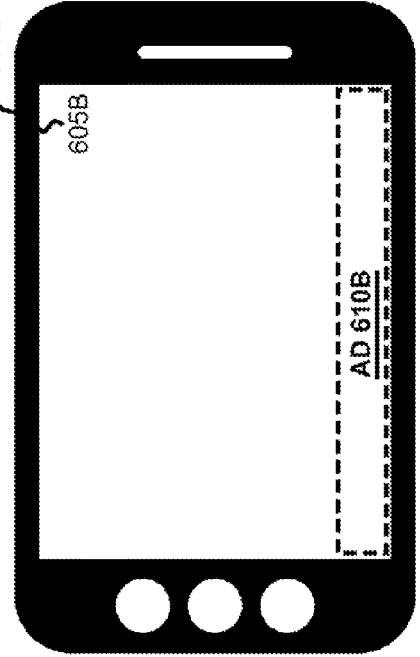
FIGS. 6A-6D show representative landscape-oriented smartphones that display representative output that the disclosed app may generate.
Figure 6D:
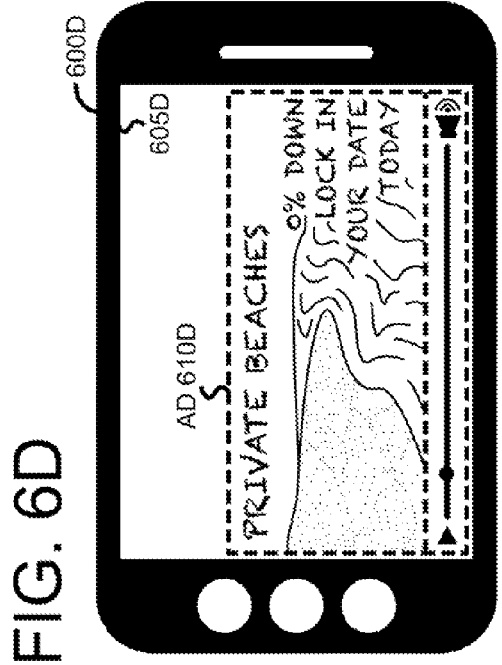
Figure 6A:
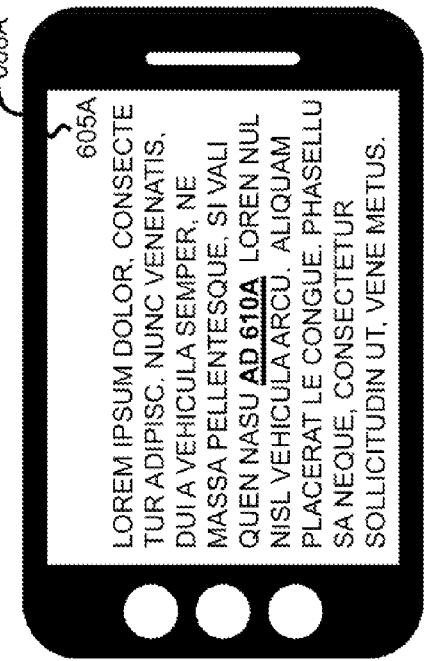

FIG. 6A shows a representative landscape-oriented smartphone 600A that may be employed as mobile IHS 200. Smartphone 600A includes a display area 605A that corresponds to display 235 of mobile IHS 200. This illustrates one example of information that app 1700A" may generate on display area 605A. App 1700A" may display textual information that includes an in-line text advertisement AD 610A. A user of mobile IHS 200 may select app 1700A" to interact with mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 605A should display in-line text advertisement AD 610A because display resolution is 600 pixels by 300 pixels, available system memory 215 is low, connection bandwidth is low, and connection speed is low. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. Signature string 380 provides an identifier for server IHS 300 to uniquely identify a particular mobile IHS 200 to server IHS 300. In one embodiment, the mobile information processing tool 2000A" may receive and associate the device determination 110 with device identification signature string 405 in signature string database 380. In this manner mobile processing tool 2000A" effectively knows the capabilities of the particular mobile HIS 200.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content as well as the form that content should take on mobile IHS 200. Signature string database 380 may associate the device identification signature string 405 with advertising content such as financial services content, literature content, home decorating content, vacation content and web hosting content, and other content. The content of the advertisement AD 610A may be based on the advertising content categories associated with the device identification signature string 405 in signature string database 380. The non-volatile storage 340 or signature string database 380 may store in-line text advertisement AD 610A of FIG. 6A. The mobile information processing tool 2000A" may generate a response 115 that includes in-line text advertisement AD 610A. The mobile information processing tool 2000A" may transmit response 115 to mobile IHS 200 via network 105. App 1700A" may receive response 115 and output AD 610A contained therein to display area 605A.

FIG. 6B shows a representative landscape-oriented smartphone 600B that may be employed as mobile IHS 200. Smartphone 600B includes a display area 605B that corresponds to display 235 of mobile IHS 200. This illustrates one example of information that app 1700A" may generate on display area 605B. App 1700A" may include a text advertisement AD 610B. A user of mobile IHS 200 may select an app 1700A" to interact with mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 605B should display text advertisement AD 610B with dimensions 600 pixels by 50 pixels because display resolution is 600 pixels by 300 pixels, available system memory 215 is medium, connection bandwidth is low, and connection speed is low. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content as well as the form that content should take on mobile IHS 200. Signature string database 380 may associate the device identification signature string 405 with advertising content such as financial services content, literature content, home decorating content, vacation content and web hosting content, and other content. The content of the advertisement AD 610B may be based on the advertising content categories associated with the device identification signature string 405 in signature string database 380. The non-volatile storage 340 or signature string database 380 may store text advertisement AD 610B with dimensions 600 pixels by 50 pixels. The mobile information processing tool 2000A" may generate a response 115 that includes text advertisement AD 610B with dimensions 600 pixels by 50 pixels. The mobile information processing tool 2000A" may transmit response 115 to mobile IHS 200 via network 105. App 1700A" may receive response 115 and output AD 610B contained therein to display area 605B.

Figure 6C:
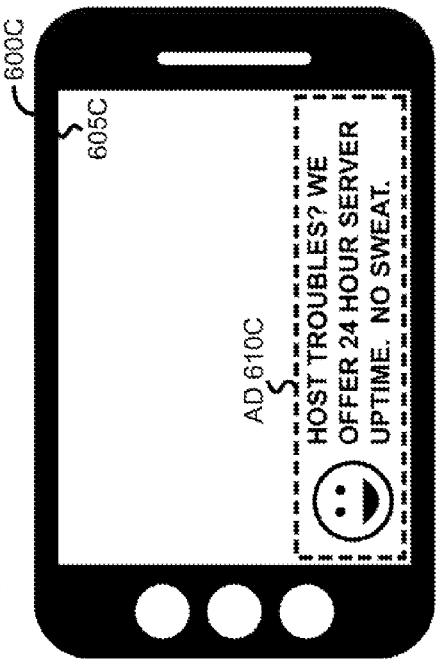

FIG. 6C shows a representative landscape-oriented smartphone 600C that may be employed as mobile IHS 200. Smartphone 600C includes a display area 605C that corresponds to display 235 of mobile IHS 200. This illustrates one example of information that app 1700A" may generate on display area 605C. App 1700A" may include a fixed graphic advertisement AD 610C. A user of mobile IHS 200 may select an app 1700A" to interact with mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 605C should display graphic advertisement AD 610C with dimensions 600 pixels by 100 pixels because display resolution is 600 pixels by 300 pixels, available system memory 215 is medium, connection bandwidth is medium, and connection speed is medium. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content as well as the form that content should take on mobile IHS 200. Signature string database 380 may associate the device identification signature string 405 with advertising content such as financial services content, literature content, home decorating content, vacation content and web hosting content, and other content. The content of the advertisement AD 610C may be based on the advertising content categories associated with the device identification signature string 405 in signature string database 380. The non-volatile storage 340 or signature string database 380 may store graphic advertisement AD 610C with dimensions 600 pixels by 100 pixels. The mobile information processing tool 2000A" may generate a response 115 that includes graphic advertisement AD 610C with dimensions 600 pixels by 100 pixels. The mobile information processing tool 2000A" may transmit response 115 to mobile IHS 200 via network 105. App 1700A" may receive response 115 and output AD 610C contained therein to display area 605C.

FIG. 6D shows a representative landscape-oriented smartphone 600D that may be employed as mobile IHS 200. Smartphone 600D includes a display area 605D that corresponds to display 235 of mobile IHS 200. This illustrates one example of information that app 1700A" may generate on display area 605D. App 1700A" may include a video advertisement AD 610D. A user of mobile IHS 200 may select an app 1700A" to interact with mobile IHS 200. App 1700A" may employ unique-identification tool 1800" to generate a device identification signature string 405. App 1700A" may employ device capability determination tool 1900" to generate a device determination 110. In one embodiment, device determination 110 may indicate that display area 605D should display video advertisement AD 610D with dimensions 600 pixels by 200 pixels because display resolution is 600 pixels by 300 pixels, available system memory 215 is high, connection bandwidth is medium, and connection speed is high. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content as well as the form that content should take on mobile IHS 200. Signature string database 380 may associate the device identification signature string 405 with advertising content such as financial services content, literature content, home decorating content, vacation content and web hosting content, and other content. The content of the advertisement AD 610D may be based on the advertising content categories associated with the device identification signature string 405 in signature string database 380. The non-volatile storage 340 or signature string database 380 may store video advertisement AD 610D with dimensions 600 pixels by 200 pixels. The mobile information processing tool 2000A" may generate a response 115 that includes video advertisement AD 610D with dimensions 600 pixels by 200 pixels. The mobile information processing tool 2000A" may transmit response 115 to mobile IHS 200 via network 105. App 1700A" may receive response 115 and output AD 610D contained therein to display area 605D. App 1700A" may also output AD 610D acoustically on a speaker, one of I/O device 250.

Figure 7B:
FIGS. 7A-7D show representative portrait-oriented tablets that display representative output that the disclosed app may generate.
Figure 7A:

FIG. 7A shows a representative portrait-oriented tablet 700A that may be employed as mobile IHS 200. Tablet 700A includes a display area 705A that corresponds to display 235 of mobile IHS 200. This illustrates one example of information that app 1700A" may display on display area 705A. App 1700A" may display textual information that includes an in-line text advertisement AD 710A. A user of mobile IHS 200 may select an app 1700A" to interact with mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 705A should display in-line text advertisement AD 710A because display resolution is 600 pixels by 1200 pixels, available system memory 215 is low, connection bandwidth is low, and connection speed is low. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. Device identification signature string 405 provides an identifier for server IHS 300 to uniquely identify a particular mobile IHS 200 to server IHS 300. In one embodiment, the mobile information processing tool 2000A" of server IHS 300 may receive and associate the device determination 110 with device identification signature string 405 in signature string database 380. In this manner mobile processing tool 2000A" effectively knows the capabilities of the particular mobile IHS 200.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content as well as the form that content should take on mobile IHS 200. Signature string database 380 may associate the device identification signature string 405 with advertising content such as financial services content, literature content, home decorating content, vacation content and web hosting content, and other content. The content of the advertisement AD 710A may be based on the advertising content categories associated with the device identification signature string 405 in signature string database 380. The non-volatile storage 340 or signature string database 380 may store in-line text advertisement AD 710A. The mobile information processing tool 2000A" may generate a response 115 that includes in-line text advertisement AD 710A. The mobile information processing tool 2000A" may transmit response 115 to mobile IHS 200 via network 105. App 1700A" may receive response 115 and output AD 710A contained therein to display area 705A.

FIG. 7B shows a representative portrait-oriented tablet 700B that may be employed as mobile IHS 200. Tablet 700B includes a display area 705B that corresponds to display 235 of mobile IHS 200. This illustrates one example of information that app 1700A" may generate on display area 705B. App 1700A" may include a text advertisement AD 710B. A user of mobile IHS 200 may select an app 1700A" to interact with mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 705B should display text advertisement AD 710B with dimensions 600 pixels by 50 pixels because display resolution is 600 pixels by 1200 pixels, available system memory 215 is medium, connection bandwidth is low, and connection speed is low. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content as well as the form that content should take on mobile IHS 200. Signature string database 380 may associate the device identification signature string 405 with advertising content such as financial services content, literature content, home decorating content, vacation content and web hosting content, and other content. The content of the advertisement AD 710B may be based on the advertising content categories associated with the device identification signature string 405 in signature string database 380. The non-volatile storage 340 or signature string database 380 may store text advertisement AD 710B with dimensions 600 pixels by 50 pixels. The mobile information processing tool 2000A" may generate a response 115 that includes text advertisement AD 710B with dimensions 600 pixels by 50 pixels. The mobile information processing tool 2000A" may transmit response 115 to mobile IHS 200 via network 105. App 1700A" may receive response 115 and output AD 710B contained therein to display area 705B.

Figure 7D:
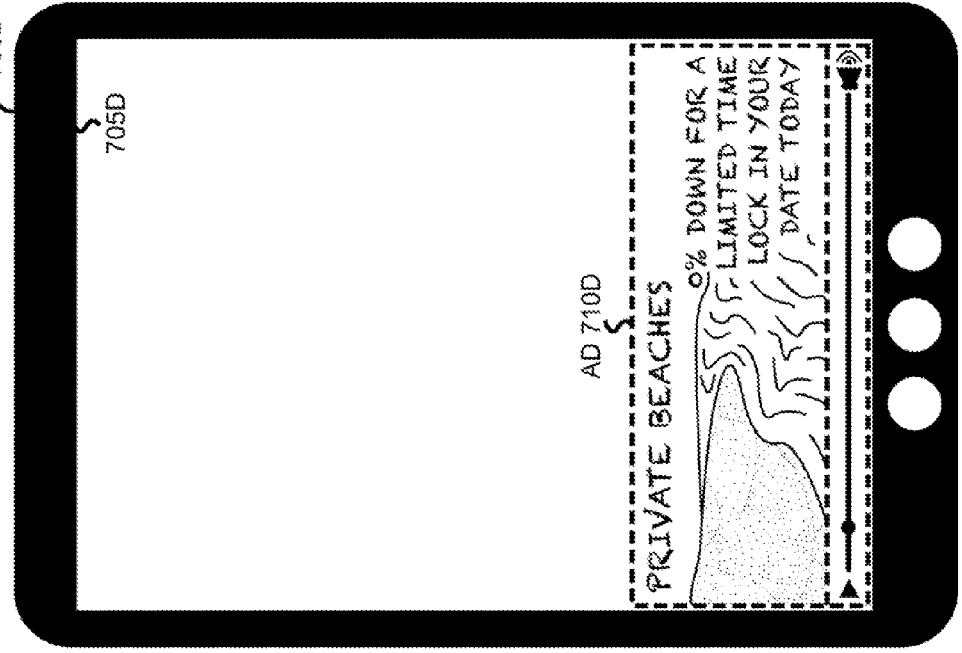
Figure 7C:
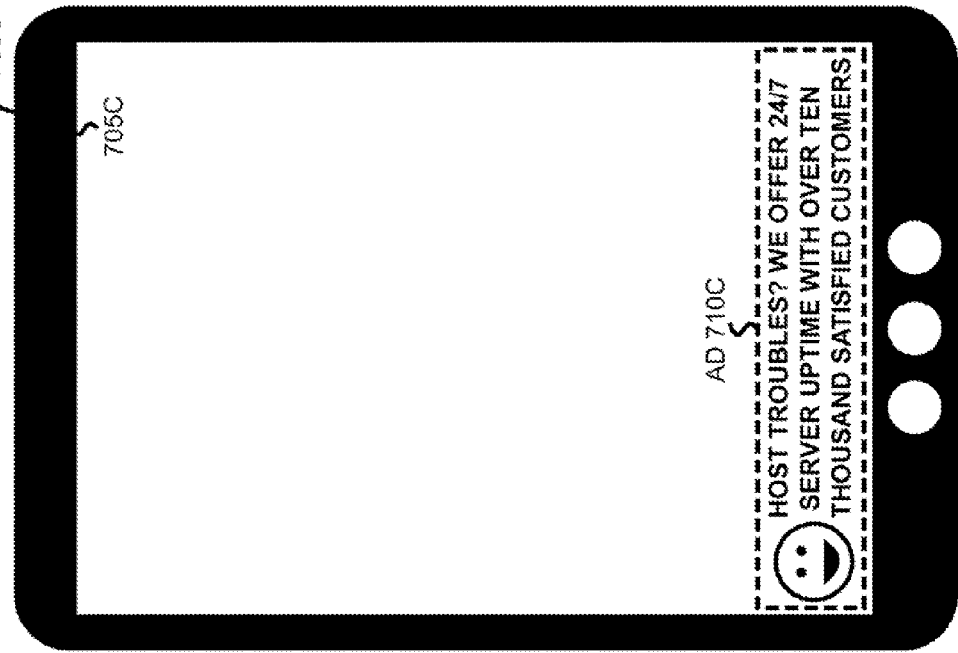

FIG. 7C shows a representative portrait-oriented tablet 700C that may be employed as mobile IHS 200. Tablet 700C includes a display area 705C that corresponds to display 235 of mobile IHS 200. This illustrates one example of information that app 1700A" may generate on display area 705C. App 1700A" may include a fixed graphic advertisement AD 710C. A user of mobile IHS 200 may select an app 1700A" to interact with mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 705C should display graphic advertisement AD 710C with dimensions 600 pixels by 100 pixels because display resolution is 600 pixels by 1200 pixels, available system memory 215 is medium, connection bandwidth is medium, and connection speed is medium. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200. Data associated with device identification signature string 405 in signature string database 380 may indicate the preferred advertisement content. Signature string database 380 may associate the device identification signature string 405 with advertising content such as financial services content, literature content, home decorating content, vacation content and web hosting content. The content of the advertisement AD 710C may be based on the advertising content categories associated with the device identification signature string 405 in signature string database 380. The non-volatile storage 340 or signature string database 380 may store graphic advertisement AD 710C with dimensions 600 pixels by 100 pixels. The mobile information processing tool 2000A" may generate a response 115 that includes graphic advertisement AD 710C with dimensions 600 pixels by 100 pixels. The mobile information processing tool 2000A" may transmit response 115 to mobile IHS 200 via network 105. App 1700A" may receive response 115 and output AD 710C contained therein to display area 705C.

FIG. 7D shows a representative portrait-oriented tablet 700D that may be employed as mobile IHS 200. Tablet 700D includes a display area 705D that corresponds to display 235 of mobile IHS 200. This illustrates one example of information that app 1700A" may generate on display area 705D. App 1700A" may include a video advertisement AD 710D. A user of mobile IHS 200 may select an app 1700A" to interact with mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 705D should display video advertisement AD 710D with dimensions 600 pixels by 200 pixels because display resolution is 1200 pixels by 600 pixels, available system memory 215 is high, connection bandwidth is medium, and connection speed is high. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content as well as the form that content should take on mobile IHS 200. Signature string database 380 may associate the device identification signature string 405 with advertising content such as financial services content, literature content, home decorating content, vacation content and web hosting content, and other content The content of the advertisement AD 710D may be based on the advertising content categories associated with the device identification signature string 405 in signature string database 380. The non-volatile storage 340 or signature string database 380 may store video advertisement AD 710D with dimensions 600 pixels by 200 pixels. The mobile information processing tool 2000A" may generate a response 115 that includes video advertisement AD 710D with dimensions 600 pixels by 200 pixels. The mobile information processing tool 2000A" may transmit response 115 to mobile IHS 200 via network 105. App 1700A" may receive response 115 and output AD 710D contained therein to display area 705D. App 1700A" may also output AD 710D acoustically on a speaker, one of I/O devices 250.

Figure 8A:
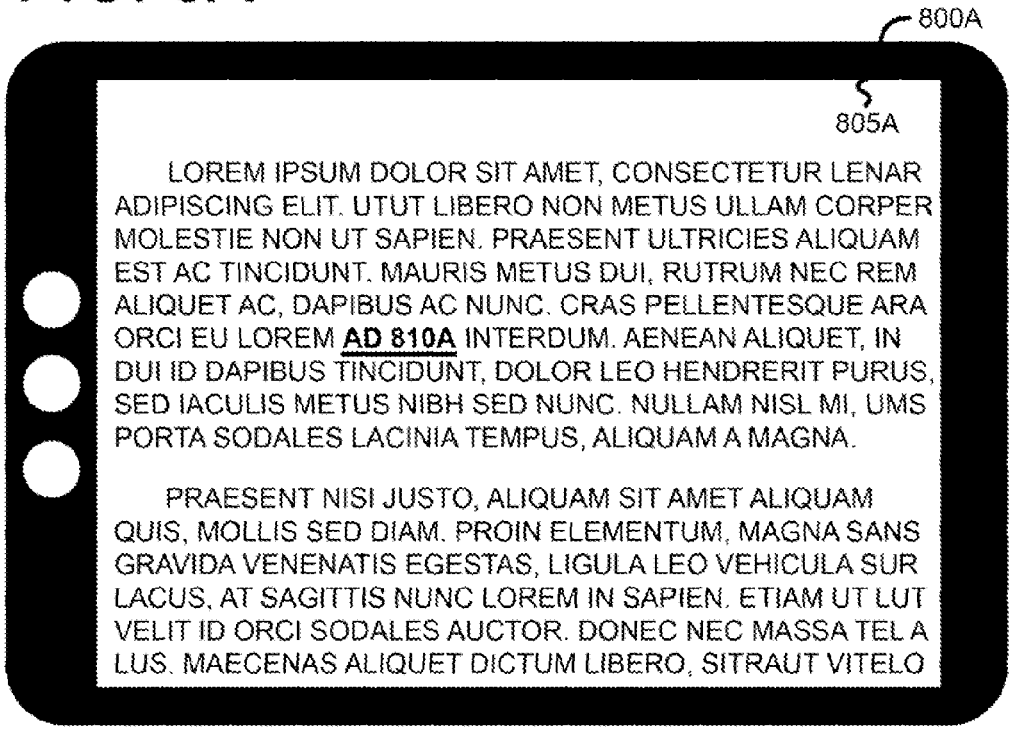
FIGS. 8A-8D show representative landscape-oriented tablets that display representative output that the disclosed app may generate.

FIG. 8A shows a representative landscape-oriented tablet 800A that may be employed as mobile IHS 200. Tablet 800A includes a display area 805A that corresponds to display 235 of mobile IHS 200. This illustrates one example of information that app 1700A" may generate on display area 805A. App 1700A" may display textual information that includes an in-line text advertisement AD 810A. A user of mobile IHS 200 may select an app 1700A" to interact with mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 805A should display in-line text advertisement AD 810A because display resolution is 1200 pixels by 600 pixels, available system memory 215 is low, connection bandwidth is low, and connection speed is low. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. Signature string 380 provides an identifier for server IHS 300 to uniquely identify a particular mobile IHS 200 to server IHS 300. In one embodiment, the mobile information processing tool 2000A" may receive and associate the device determination 110 with device identification signature string 405 in signature string database 380. In this manner mobile processing tool 2000A" effectively knows the capabilities of the particular mobile IHS 200.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content as well as the form that content should take on mobile IHS 200. Signature string database 380 may associate the device identification signature string 405 with advertising content such as financial services content, literature content, home decorating content, vacation content and web hosting content, and other content. The content of the advertisement AD 810A may be based on the advertising content categories associated with the device identification signature string 405 in signature string database 380. The non-volatile storage 340 or signature string database 380 may store in-line text advertisement AD 810A. The mobile information processing tool 2000A" may generate a response 115 that includes in-line text advertisement AD 810A. The mobile information processing tool 2000A" may transmit response 115 to mobile IHS 200 via network 105. App 1700A" may receive response 115 and output AD 810A contained therein to display area 805A.

Figure 8B:
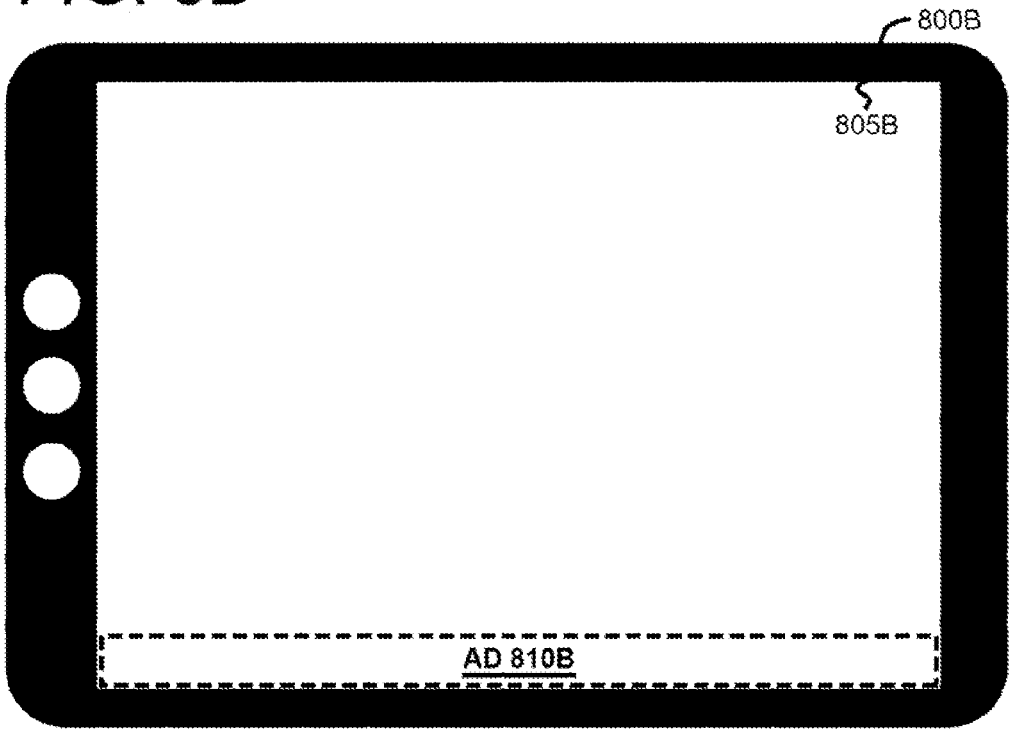

FIG. 8B shows a representative landscape-oriented tablet 800B that may be employed as mobile IHS 200. Tablet 800B includes a display area 805B that corresponds to display 235 of mobile IHS 200. This illustrates one example of information that app 1700A" may generate on display area 805B. App 1700A" may include a text advertisement AD 810B. A user of mobile IHS 200 may select an app 1700A" to interact with mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 805B should display text advertisement AD 810B with dimensions 1200 pixels by 50 pixels because display resolution is 1200 pixels by 600 pixels, available system memory 215 is medium, connection bandwidth is low, and connection speed is low. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content as well as the form that content should take on mobile IHS 200. Signature string database 380 may associate the device identification signature string 405 with advertising content such as financial services content, literature content, home decorating content, vacation content and web hosting content, and other content. The content of the advertisement AD 810B may be based on the advertising content categories associated with the device identification signature string 405 in signature string database 380. The non-volatile storage 340 or signature string database 380 may store text advertisement AD 810B with dimensions 1200 pixels by 50 pixels. The mobile information processing tool 2000A" may generate a response 115 that includes text advertisement AD 810B with dimensions 1200 pixels by 50 pixels. The mobile information processing tool 2000A" may transmit response 115 to mobile IHS 200 via network 105. App 1700A" may receive response 115 and output AD 810B contained therein to display area 805B.

Figure 8C:
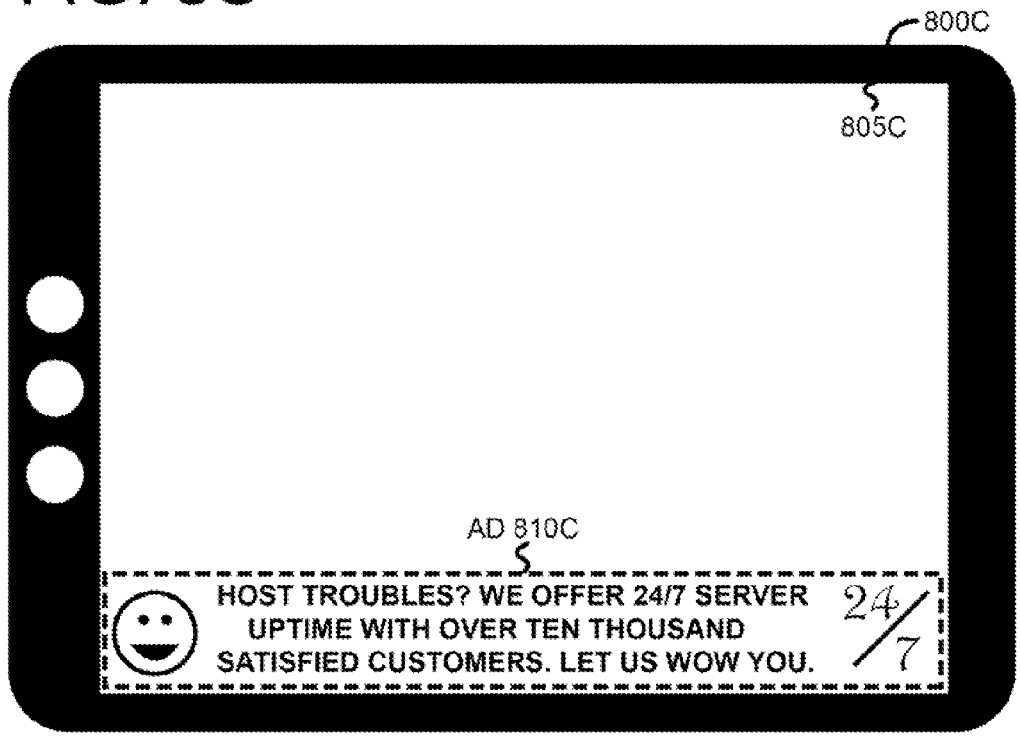

FIG. 8C shows a representative landscape-oriented tablet 800C that may be employed as mobile IHS 200. Tablet 800C includes a display area 805C that corresponds to display 235 of mobile IHS 200. This illustrates one example of information that app 1700A" may generate on display area 805C. App 1700A" may include a graphic advertisement AD 810C. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 805C should display a fixed graphic advertisement AD 810C with dimensions 1200 pixels by 100 pixels because display resolution is 1200 pixels by 600 pixels, available system memory 215 is medium, connection bandwidth is medium, and connection speed is medium. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" of server IHS 300 may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content as well as the form that content should take on mobile IHS 200. Signature string database 380 may associate the device identification signature string 405 with advertising content such as financial services content, literature content, home decorating content, vacation content and web hosting content, and other content. The content of the advertisement AD 810C may be based on the advertising content categories associated with the device identification signature string 405 in signature string database 380. The non-volatile storage 340 or signature string database 380 may store graphic advertisement AD 810C with dimensions 1200 pixels by 100 pixels. The mobile information processing tool 2000A" may generate a response 115 that includes graphic advertisement AD 810C with dimensions 1200 pixels by 100 pixels. The mobile information processing tool 2000A" may transmit response 115 to mobile IHS 200 via network 105. App 1700A" may receive response 115 and output AD 810C contained therein to display area 805C.

Figure 8D:
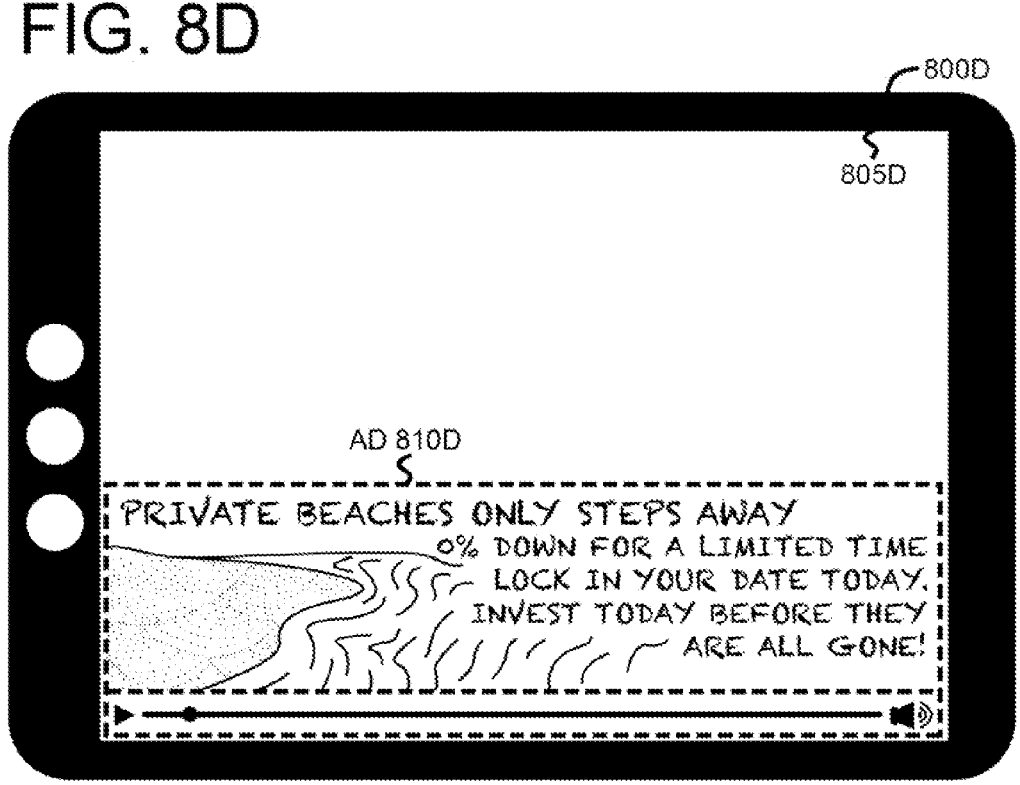

FIG. 8D shows a representative landscape-oriented tablet 800D that may be employed as mobile IHS 200. Tablet 800D includes a display area 805D that corresponds to display 235 of mobile IHS 200. This illustrates one example of information that app 1700A" may generate on display area 805D. App 1700A" may include a video advertisement AD 810D. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 805D should display video advertisement AD 810D with dimensions 1200 pixels by 200 pixels because display resolution is 1200 pixels by 600 pixels, available system memory 215 is high, connection bandwidth is medium, and connection speed is high. App 1700A" may transmit the device identification signature string 405 and the device determination 110 to server IHS 300 via network 105.

A mobile information processing tool 2000A" in server IHS 300 may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" in server IHS 300 may access the information associated with device identification signature string 405 of signature string database 380 and the device determination 110 to determine specific data to transmit to mobile IHS 200 as response 115. Data associated with device identification signature string 405 in signature string database 380 may indicate the preferred advertisement content as well as the form that content should take on mobile IHS 200. Signature string database 380 may associate the device identification signature string 405 with advertising content such as financial services content, literature content, home decorating content, vacation content and web hosting content, and other content. The content of the advertisement AD 810D may be based on the advertising content categories associated with the device identification signature string 405 in signature string database 380. The non-volatile storage 340 or signature string database 380 may store video advertisement AD 810D with dimensions 1200 pixels by 200 pixels. The mobile information processing tool 2000A" may generate a response 115 that includes video advertisement AD 810D with dimensions 1200 pixels by 200 pixels. The mobile information processing tool 2000A" may transmit response 115 to mobile IHS 200 via network 105. App 1700A" may receive response 115 and output AD 810D contained therein to display area 805D. App 1700A" may also output AD 810D acoustically on a speaker, one of I/O devices 250.

Figure 9B:
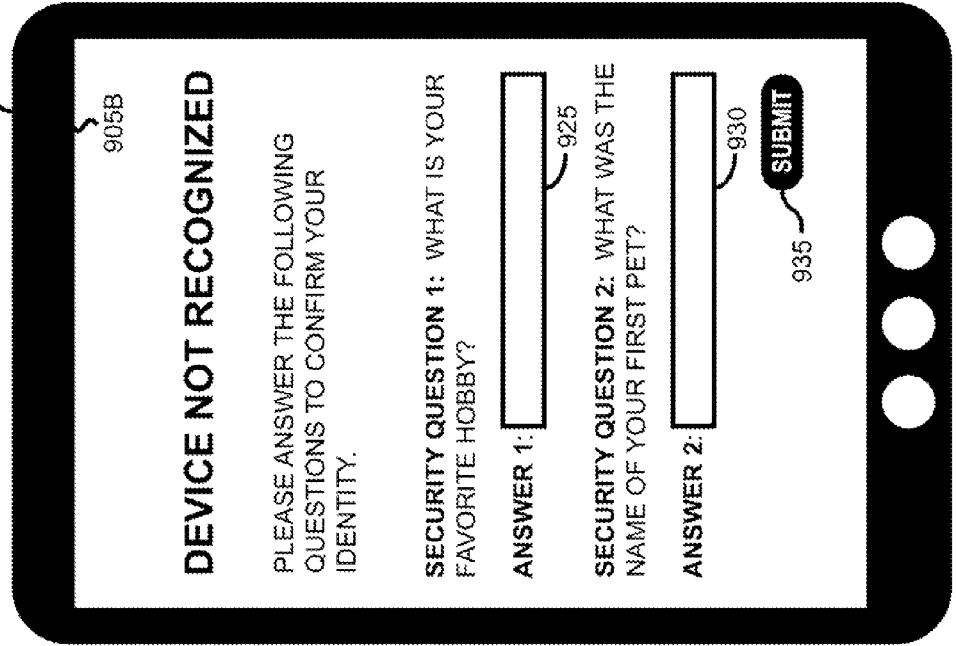
FIG. 9B shows a representative portrait-oriented tablet that displays a credential challenge that the disclosed app may generate.
Figure 9A:
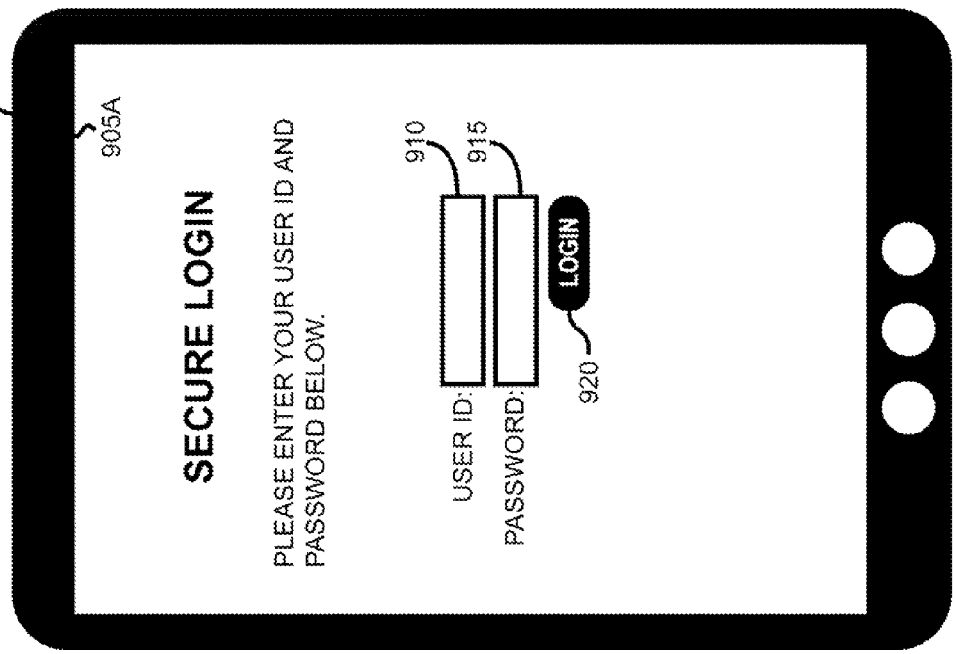
FIG. 9A shows a representative portrait-oriented tablet that displays a secure login that the disclosed app may generate.

FIG. 9A shows a representative portrait-oriented tablet 900A that may be employed as mobile IHS 200. Tablet 900A includes a display area 905A that corresponds to display 235 of mobile IHS 200. This illustrates one example of information that app 1700A" may display on display area 905A. App 1700A" may display textual information that includes a secure login to server IHS 300. A user of mobile IHS 200 may select app 1700A" to interact with mobile IHS 200. A user may input a user ID into USER ID field 910 and a password into PASSWORD field 915. The user may then select login button 920 to attempt to log into server IHS 300. App 1700A" may employ unique-identification tool 1800" to generate device identification signature string 405. App 1700A" may employ a device capability determination tool 1900" to generate a device determination 110. In one embodiment, device determination 110 may indicate that display area 905A should display content no wider than 600 pixels and only in text because display resolution is 600 pixels by 1200 pixels, available system memory 215 is low, connection bandwidth is low, and connection speed is low. App 1700A" may transmit the device identification signature string 405 and the device determination 110 to server IHS 300 via network 105.

The mobile information processing tool 2000A" in server IHS 300 may receive the transmitted device identification signature string 405 and the device determination 110. The mobile information processing tool 2000A" may search signature string database 380 for a device identification signature string entry that matches the received device identification signature string 405. If mobile information processing tool 2000A" finds a device identification signature string entry in signature string database 380 that matches received signature string 380, then mobile information processing tool 2000A" may compare the information input in user ID field 910 and password field 915 to a user ID entry and password entry associated with device identification signature string 405 in signature string database 380. If device identification signature string 405 matches device identification signature string entry, user ID field 910 matches user ID entry associated with device identification signature string 405 and password field 915 matches password entry associated with device identification signature string 405, mobile information processing tool 2000A" grants the user permission to log into server IHS 300. This login system may allow the user to access private content on server IHS 300 that is associated with device identification signature string 405, as illustrated in FIGS. 10A, 10B, 11A, 11C, 12A, 12B, 13A and 13B.

If mobile information processing tool 2000A" does not find a matching device identification signature string entry in signature string database 380, then mobile information processing tool 2000A" may search for a user ID entry that matches user ID field 910 in the signature string database 380. If mobile information processing tool 2000A" finds a user ID entry match, but no match between device identification signature string 405 and the device identification signature string entry associated with the user ID entry, then the mobile information processing tool 2000A" may tentatively associate device identification signature string 405 and a device not recognized flag with the user ID entry in signature string database 380. The mobile information processing tool 2000A" may also generate a response 115 that includes a device not recognized message that may be stored in non-volatile storage 340 or signature string database 380, as seen in FIG. 9B. The mobile information processing tool 2000A" may transmit a device not recognized response 115 to mobile IHS 200 via network 105. App 1700A" may receive response 115 and output the device not recognized message contained therein to display area 905B on portrait-oriented tablet 900B.

The user may input a first answer in ANSWER 1 field 925 and a second answer in ANSWER 2 field 930. The user may then select submit button 935 to attempt to log into server IHS 300. App 1700A" may employ unique-identification tool 1800" to generate a device identification signature string 405. App 1700A" may employ a device capability determination tool 1900" to generate a device determination 110. In one embodiment, device determination 110 may indicate that display area 905A should display content no wider than 600 pixels and only in text because display resolution is 600 pixels by 1200 pixels, available system memory 215 is low, connection bandwidth is low, and connection speed is low. App 1700A" may transmit the device identification signature string 405 and the device determination 110 to server IHS 300 via network 105.

The mobile information processing tool 2000A" in server IHS 3000 may receive the transmitted device identification signature string 405 and the device determination 110. The mobile information processing tool 2000A" may search signature string database 380 for a matching device identification signature string entry. If a matching tentative device identification signature string entry is found, mobile information processing tool 2000A" may compare the information input in user ID field 910 and password field 915 to a user ID entry and password entry associated with device identification signature string 405 in signature string database 380.

If device identification signature string 405 matches the tentative device identification signature string entry, user ID field 910 matches user ID entry associated with the tentative device identification signature string entry and password field 915 matches password entry associated with the tentative device identification signature string entry, then the mobile information processing tool 2000A" may compare the information input in ANSWER 1 field 925 and ANSWER 2 field 930 with the ANSWER 1 entry associated with the tentative device identification signature string entry and the ANSWER 2 entry associated with the tentative device identification signature string entry in device identification signature string database 380, respectively. If the aforementioned fields match, respectively, mobile information processing tool 2000A" associates the device identification signature string 405 with the USER ID entry, deletes the tentative device identification signature string entry and deletes the device not recognized flag in the device identification signature string database 380. The mobile information processing tool 2000" in server IHS 300 grants the user permission to log into server IHS 300 in response 115. The mobile information processing tool 2000A" may transmit response 115 to mobile IHS 200 via network 105. This login system may allow the user to access private content on server IHS 300 that is associated with device identification signature string 405, as illustrated in FIGS. 10-13.

FIGS. 10A-10D and FIGS. 11A-11D show representative smartphones that may be employed as mobile IHS 200 in alternative embodiments of the disclosed technology. In these particular embodiments, the smartphone may output banking information such as private banking information, or banking information combined with other information such as advertising information. In some of these embodiments, the smartphone may output news information combined with other news information, or news information combined with other information such as advertising information. Output may take the form of video output, audio output or video output combined with audio output at mobile IHS 200.

Server IHS 300 may store much information not specifically shown in FIGS. 10A-10D and FIGS. 11A-11D such as multiple graphics of different dimensions, multiple text descriptions of different lengths that become more descriptive with increased length, and videos of different dimensions. All of the above-mentioned content have different hardware and network implications that the disclosed methodology addresses.

Figure 10A:
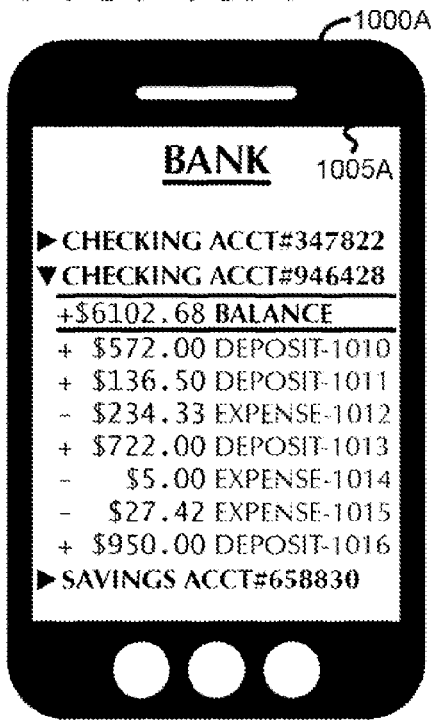
FIGS. 10A-10D show representative portrait-oriented smartphones that display representative output that the disclosed app may generate.

FIG. 10A shows a representative portrait-oriented smartphone 1000A that may be employed as mobile IHS 200. Smartphone 1000A includes a display area 1005A that corresponds to display 235 of mobile IHS 200. FIG. 10A illustrates one example of information that app 1700A" may display on display area 1005A. App 1700A" may display private textual banking information that includes multiple bank account transactions deposit 1010, deposit 1011, expense 1012, deposit 1013, expense 1014, expense 1015 and deposit 1016. A user of mobile IHS 200 may select an app 1700A" to interact with mobile IHS 200. App 1700A" may employ unique-identification tool 1800" to generate device identification signature string 405. App 1700A" may employ device capability determination tool 1900" to generate device determination 110. In one embodiment, device determination 110 may indicate that display area 1005A should 1) display textual banking information that is no wider than 300 pixels and 2) include multiple bank accounts because 1) display resolution is 300 pixels by 600 pixels, 2) available system memory 215 is low, 3) connection bandwidth is low, and 4) connection speed is low. App 1700A" may transmit the device identification signature string 405 and the device determination 110 to server IHS 300 via network 105. The device determination 110 if useful to assure that server IHS 300 sends a response 115 to mobile IHS 200 that corresponds to the ability of mobile IHS to output information in response 115.

A mobile information processing tool 2000A" may receive the transmitted device identification signature string 405 and the device determination 110. The mobile information processing tool 2000A" may search signature string database 380 for a matching device identification signature string entry. If mobile information processing tool 2000A" does not find a matching device identification signature string entry in signature string database 380, then mobile information processing tool 2000A" may handle a login failure as described above in FIGS. 9A and 9B. If device identification signature string 405 matches a device identification signature string entry in signature string database 380, and the user ID field 910 matches the user ID entry associated with device identification signature string 405, and password field 915 matches the password entry associated with device identification signature string 405, then the mobile information processing tool 2000A" may access the information associated with device identification signature string 405 of signature string database 380 and the device determination 110 to determine specific data to transmit in response 115 to mobile IHS 200. In one embodiment, the mobile information processing tool 2000A" may receive and associate the device determination 110 with device identification signature string 405 in signature string database 380.

Data associated with device identification signature string 405 in signature string database 380 may indicate private banking content. The non-volatile storage 340 or signature string database 380 may store private textual banking information such as multiple bank accounts, deposit 1010, deposit 1011, expense 1012, deposit 1013, expense 1014, expense 1015 and deposit 1016. The mobile information processing tool 2000A" may generate a response 115 that includes private textual banking information such as multiple bank accounts, deposit 1010, deposit 1011, expense 1012, deposit 1013, expense 1014, expense 1015 and deposit 1016. The mobile information processing tool 2000A" may transmit response 115 to mobile IHS 200 via network 105. App 1700A" may receive response 115 and output the private textual banking information contained therein to display area 1005A.

Figure 10B:
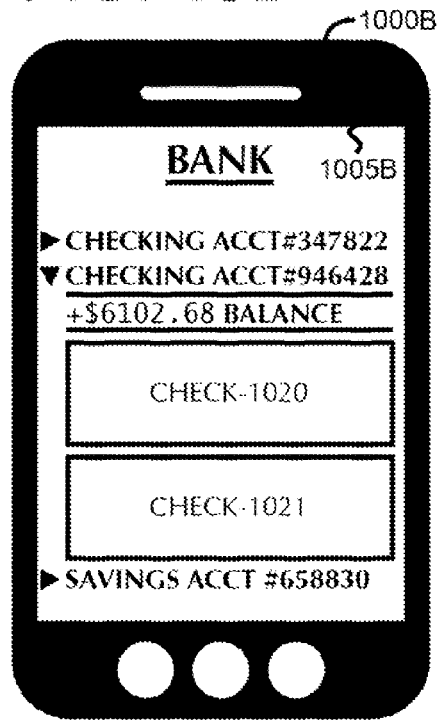

FIG. 10B shows a representative portrait-oriented smartphone 1000B that may be employed as mobile IHS 200. Smart phone 1000B includes a display area 1005B that corresponds to display 235 of mobile IHS 200. This illustrates one example of information that app 1700A" may generate on display area 1005B. App 1700A" may display private textual and graphical banking information that includes multiple bank accounts, check 1012 and check 1021. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1005B should 1) display textual and graphical banking information that is no wider than 300 pixels and 2) include multiple bank accounts because 1) display resolution is 300 pixels by 600 pixels, 2) available system memory 215 is medium, 3) connection bandwidth is medium, 4) and connection speed high. App 1700A" may transmit the device identification signature string 405 and the device determination 110 to server IHS 300 via network 105. Again, the device determination if useful to assure that server IHS 300 sends a response 115 to mobile IHS 200 that corresponds to the ability of mobile HIS to output information in response 115.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may handle a login failure as described above in FIGS. 9A and 9B. If device identification signature string 405 matches the device identification signature string entry in signature string database 380', and the user ID field 910 matches the user ID entry associated with device identification signature string 405, and password field 915 matches the password entry associated with device identification signature string 405, then the mobile information processing tool 2000A" may access the information associated with device identification signature string 405 of signature string database 380 and the device determination 110 to determine specific data to transmit in response 115 to mobile IHS 200. In one embodiment, the mobile information processing tool 2000A" may receive and associate the device determination 110 with device identification signature string 405 in signature string database 380.

Data associated with device identification signature string 405 in signature string database 380 may indicate private banking content. The non-volatile storage 340 or signature string database 380 may store private textual and graphical banking information such as multiple bank accounts, check 1020 and check 1021. The mobile information processing tool 2000A" may generate a response 115 that includes private textual and graphical banking information such as multiple bank accounts, check 1020 and check 1021. The mobile information processing tool 2000A" may transmit response 115 to mobile IHS 200 via network 105. App 1700A" may receive response 115 and output the private textual and graphical banking information contained therein to display area 1005B as shown in FIG. 10B.

Figure 10C:
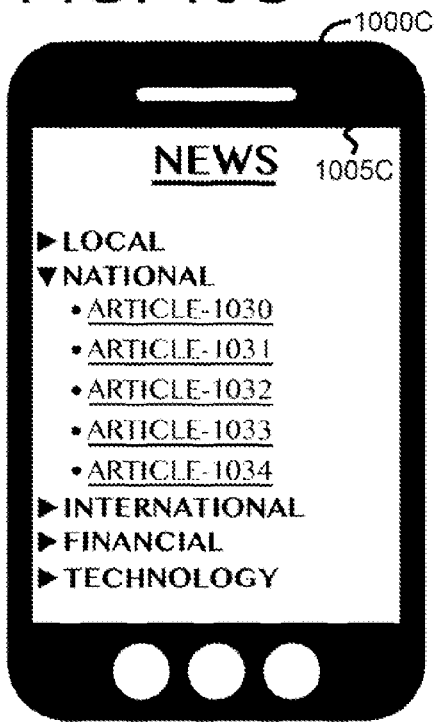

FIG. 10C shows a representative portrait-oriented smartphone 1000C that may be employed as mobile IHS 200. Smartphone 1000C includes a display area 1005C that corresponds to display 235 of mobile IHS 200. This illustrates one example of information that app 1700A" may generate on display area 1005C. App 1700A" may display textual news information that includes multiple news categories, article 1030, article 1031, article 1032, article 1033 and article 1034. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1005C should 1) display textual news information that is no wider than 300 pixels and 2) include news categories because 1) display resolution is 300 pixels by 600 pixels, 2) available system memory 215 is low, 3) connection bandwidth is low, and 4) connection speed is low. App 1700A" may transmit the device identification signature string 405 and the device determination 110 to server IHS 300 via network 105. One again, the device determination 110 if useful to assure that server IHS 300 sends a response 115 to mobile IHS 200 that corresponds to the ability of mobile HIS to output information in response 115.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200. Data associated with device identification signature string 405 in signature string database 380 may indicate news content. The non-volatile storage 340 or signature string database 380 may store textual news information such as multiple news categories, article 1030, article 1031, article 1032, article 1033 and article 1034. The mobile information processing tool 2000A" may generate a response 115 that includes textual news information such as multiple news categories, article 1030, article 1031, article 1032, article 1033 and article 1034. The mobile information processing tool 2000A" may transmit response 115 to mobile IHS 200 via network 105. App 1700A" may receive response 115 and output the textual news information contained therein to display area 1005C as shown in FIG. 10C.

Figure 10D:

FIG. 10D shows a representative portrait-oriented smartphone 1000D that may be employed as mobile IHS 200. Smartphone 1000D includes a display area 1005D that corresponds to display 235 of mobile IHS 200. This illustrates one example of information that app 1700A" may generate on display area 1005D. App 1700A" may display textual and video news information that includes multiple news categories and breaking news video 1040. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1005D should 1) display textual and video news information that is no wider than 300 pixels and 2) include news categories because 1) display resolution is 300 pixels by 600 pixels, 2) available system memory 215 is high, 3) connection bandwidth is high, and 4) connection speed is high. App 1700A" may transmit the device identification signature string 405 and the device determination 110 to server IHS 300 via network 105. Again, the device determination if useful to assure that server IHS 300 sends a response 115 to mobile IHS 200 that corresponds to the ability of mobile HIS to output information in response 115.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200. Data associated with device identification signature string 405 in signature string database 380 may indicate news content. The non-volatile storage 340 or signature string database 380 may store textual and video news information such as multiple news categories and breaking news video 1040. The mobile information processing tool 2000A" may generate a response 115 that includes textual and video news information such as multiple news categories and breaking news video 1040. The mobile information processing tool 2000A" may transmit response 115 to mobile IHS 200 via network 105. App 1700A" may receive response 115 and output the textual and video news information contained therein to display area 1005D as shown in FIG. 10D. App 1700A" may also output breaking news video 1040 acoustically on a speaker, one of I/O devices 250.

FIG. 11A shows a representative landscape-oriented smartphone 1100A that may be employed as mobile IHS 200. Smartphone 1100A includes a display area 1105A that corresponds to display 235 of mobile IHS 200. This illustrates one example of information that app 1700A" may generate on display area 1105A. App 1700A" may display private textual banking information that includes multiple bank accounts, business name 1110, business name 1111, person name 1112, person name 1113 and business name 1114. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1105A should 1) display textual banking information that is no wider than 600 pixels and 2) includes multiple bank accounts because 1) display resolution is 600 pixels by 300 pixels, 2) available system memory 215 is low, 3) connection bandwidth is low, and 4) connection speed is low. App 1700A" may transmit the device identification signature string 405 and the device determination 110 to server IHS 300 via network 105.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may handle a login failure as described above in FIGS. 9A and 9B. If device identification signature string 405 matches the device identification signature string entry, user ID field 910 matches the user ID entry associated with device identification signature string 405, and password field 915 matches the password entry associated with device identification signature string 405, then mobile information processing tool 2000A" may access the information associated with device identification signature string 405 of signature string database 380 and the device determination 110 to determine specific data to transmit to mobile IHS 200. In one embodiment, the mobile information processing tool 2000A" may receive and associate the device determination 110 with device identification signature string 405 in signature string database 380.

Data associated with device identification signature string 405 in signature string database 380 may indicate private banking content. The non-volatile storage 340 or signature string database 380 may store private textual banking information such as multiple bank accounts, business name 1110, business name 1111, person name 1112, person name 1113 and business name 1114. The mobile information processing tool 2000A" may generate a response 115 that includes private textual banking information such as multiple bank accounts, business name 1110, business name 1111, person name 1112, person name 1113 and business name. The mobile information processing tool 2000A" may transmit response 115 to mobile IHS 200 via network 105. App 1700A" may receive response 115 and output the private textual banking information contained therein to display area 1105A.

FIG. 11B shows a representative landscape-oriented smartphone 1100B that may be employed as mobile IHS 200. Smartphone 1100B includes a display area 1105B that corresponds to display 235 of mobile IHS 200. This illustrates one example of information that app 1700A" may generate on display area 1105B. App 1700A" may display private textual and graphical banking information that includes multiple bank accounts and check 1120. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1105B should 1) display textual and graphical banking information that is no wider than 600 pixels and 2) include multiple bank accounts because 1) display resolution is 600 pixels by 300 pixels, 2) available system memory 215 is medium, 3) connection bandwidth is medium, and 4) connection speed high. App 1700A" may transmit the device identification signature string 405 and the device determination 110 to server IHS 300 via network 105.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may handle a login failure as described above in FIGS. 9A and 9B. If device identification signature string 405 matches the device identification signature string entry, user ID field 910 matches the user ID entry associated with device identification signature string 405, and password field 915 matches the password entry associated with device identification signature string 405, the mobile information processing tool 2000A" may access the information associated with device identification signature string 405 of signature string database 380 and the device determination 110 to determine specific data to transmit to mobile IHS 200. In one embodiment, the mobile information processing tool 2000A" may receive and associate the device determination 110 with device identification signature string 405 in signature string database 380.

Data associated with device identification signature string 405 in signature string database 380 may indicate private banking content. The non-volatile storage 340 or signature string database 380 may store private textual and graphical banking information such as multiple bank accounts and check 1120. The mobile information processing tool 2000A" may generate a response 115 that includes private textual and graphical banking information such as multiple bank accounts and check 1120. The mobile information processing tool 2000A" may transmit response 115 to mobile IHS 200 via network 105. App 1700A" may receive response 115 and output the private textual and graphical banking information contained therein to display area 1105B.

FIG. 11C shows a representative landscape-oriented smartphone 1100C that may be employed as mobile IHS 200. Smartphone 1100C includes a display area 1105C that corresponds to display 235 of mobile IHS 200. This illustrates one example of information that app 1700A" may generate on display area 1105C. App 1700A" may display textual news information that includes multiple news categories, article by author 1130, article by author 1131, article by author 1132 and article by author 1133. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1105C should 1) display textual news information that is no wider than 600 pixels and 2) include news categories because 1) display resolution is 600 pixels by 300 pixels, 2) available system memory 215 is low, 3) connection bandwidth is low, and 4) connection speed is low. App 1700A" may transmit the device identification signature string 405 and the device determination 110 to server IHS 300 via network 105.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200. Data associated with device identification signature string 405 in signature string database 380 may indicate news content. The non-volatile storage 340 or signature string database 380 may store textual news information such as multiple news categories, article by author 1130, article by author 1131, article by author 1132 and article by author 1133. The mobile information processing tool 2000A" may generate a response 115 that includes textual news information such as multiple news categories, article by author 1130, article by author 1131, article by author 1132 and article by author 1133. The mobile information processing tool 2000A" may transmit response 115 to mobile IHS 200 via network 105. App 1700A" may receive response 115 and output the textual news information contained therein to display area 1105C.

FIG. 11D shows a representative landscape-oriented smartphone 1100D Smartphone 1100D includes a display area 1105D that corresponds to display 235 of mobile IHS 200. This illustrates one example of information that app 1700A" may generate on display area 1105D. App 1700A" may display textual and video news information that includes multiple news categories and breaking news video 1140. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1105D should 1) display textual and video news information that is no wider than 600 pixels and 2) include news categories because 1) display resolution is 600 pixels by 300 pixels, 2) available system memory 215 is high, 3) connection bandwidth is high, and 4) connection speed is high. App 1700A" may transmit the device identification signature string 405 and the device determination 110 to server IHS 300 via network 105.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200. Data associated with device identification signature string 405 in signature string database 380 may indicate news content. The non-volatile storage 340 or signature string database 380 may store textual and video news information such as multiple news categories and breaking news video 1140. The mobile information processing tool 2000A" may generate a response 115 that includes textual and video news information such as multiple news categories and breaking news video 1140. The mobile information processing tool 2000A" may transmit response 115 to mobile IHS 200 via network 105. App 1700A" may receive response 115 and output the textual and video news information contained therein to display area 1105D. App 1700A" may also output breaking news video 1140 acoustically on a speaker, one of I/O devices 250.

Figure 12B:
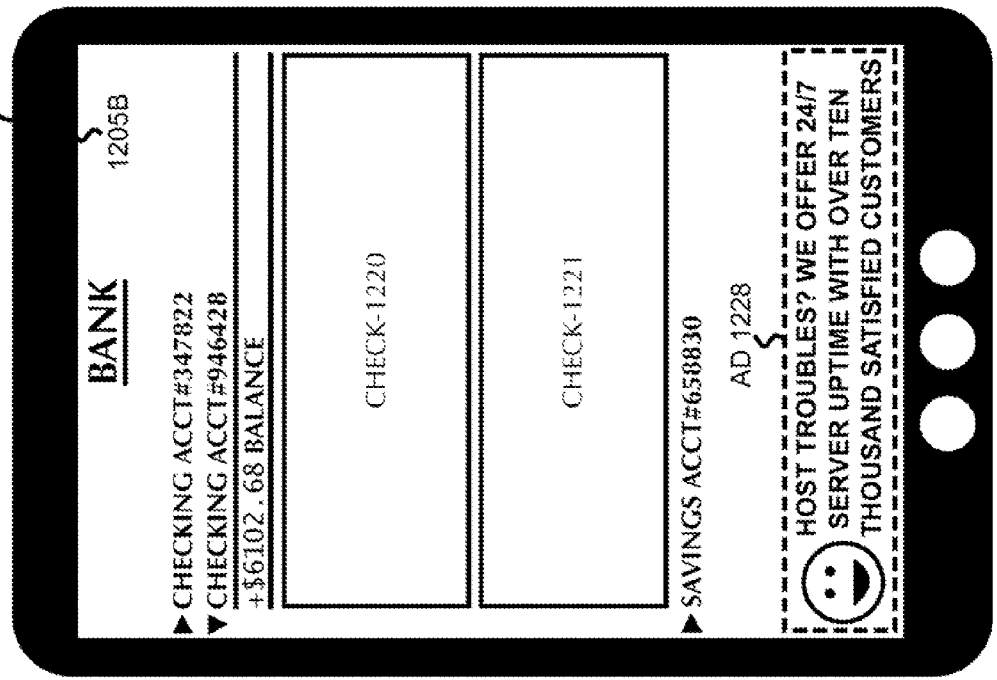
FIGS. 12A-12D show representative portrait-oriented tablets that display representative output that the disclosed app may generate.
Figure 12A:
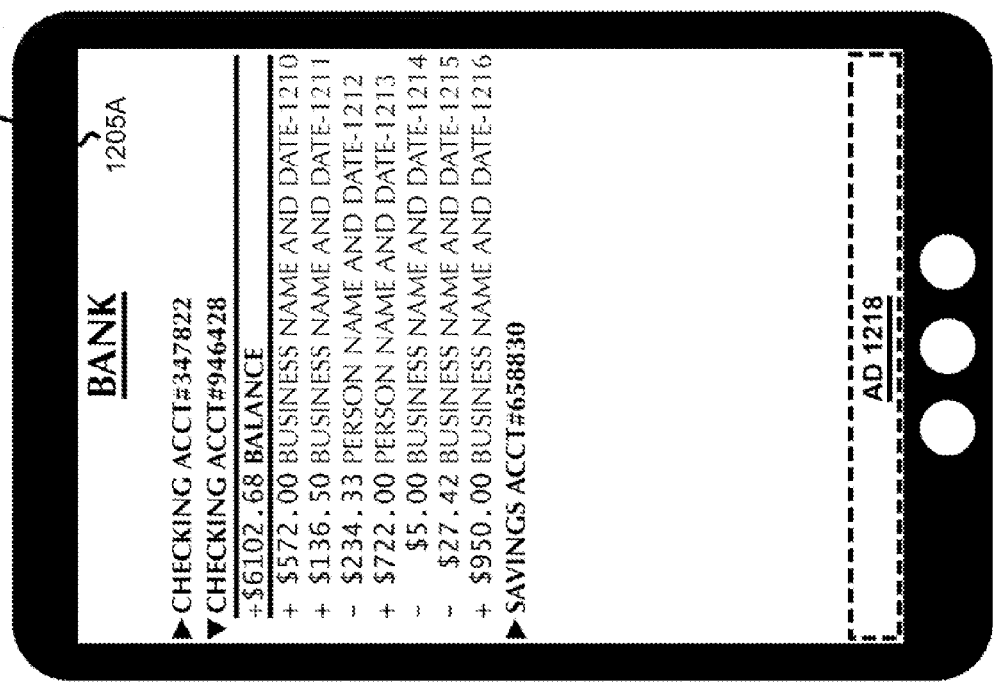

FIG. 12A shows a representative portrait-oriented tablet 1200A that may be employed as mobile IHS 200. Tablet 1200A includes a display area 1205A that corresponds to display 235 of mobile IHS 200. This illustrates one example of information that app 1700A" may generate on display area 1205A. App 1700A" may display private textual banking information that includes multiple bank accounts, business name and date 1210, business name and date 1211, person name and date 1212, person name and date 1213 business name and date 1214, business name and date 1215 and business name and date 1216. App 1700A" may include a text advertisement AD 1218. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1205A should 1) display textual banking information that is no wider than 600 pixels, 2) include multiple bank accounts, and 3) display text advertisement AD 1218 with dimensions 600 pixels by 50 pixels because 1) display resolution is 600 pixels by 1200 pixels, 2) available system memory 215 is low, 3) connection bandwidth is low, and 4) connection speed is low. App 1700A" may transmit the device identification signature string 405 and the device determination 110 to server IHS 300 via network 105.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may handle a login failure as described above in FIGS. 9A and 9B. If device identification signature string 405 matches the device identification signature string entry, user ID field 910 matches the user ID entry associated with device identification signature string 405, and password field 915 matches the password entry associated with device identification signature string 405, the mobile information processing tool 2000A" may access the information associated with device identification signature string 405 of signature string database 380 and the device determination 110 to determine specific data to transmit to mobile IHS 200. In one embodiment, the mobile information processing tool 2000A" may receive and associate the device determination 110 with device identification signature string 405 in signature string database 380.

Data associated with device identification signature string 405 in signature string database 380 may indicate private banking content and preferred advertisement content. Signature string database 380 may associate the device identification signature string 405 with advertising content such as financial services content, literature content, home decorating content, vacation content and web hosting content. The content of the advertisement AD 1218 may be based on the advertising content categories associated with the device identification signature string 405 in signature string database 380. The non-volatile storage 340 or signature string database 380 may store private textual banking information such as multiple bank accounts, business name and date 1210, business name and date 1211, person name and date 1212, person name and date 1213 business name and date 1214, business name and date 1215, business name and date 1216, and text advertisement AD 1218 with dimensions 600 pixels by 50 pixels. The mobile information processing tool 2000A" may generate a response 115 that includes private textual banking information such as multiple bank accounts, business name and date 1210, business name and date 1211, person name and date 1212, person name and date 1213 business name and date 1214, business name and date 1215, business name and date 1216, and text advertisement AD 1218 with dimensions 600 pixels by 50 pixels. The mobile information processing tool 2000A" may transmit response 115 to mobile IHS 200 via network 105. App 1700A" may receive response 115 and output the private textual banking information and textual advertisement AD 1218 contained therein to display area 1205A.

FIG. 12B shows a representative portrait-oriented tablet 1200B that may be employed as mobile IHS 200. Tablet 1200B includes a display area 1205B that corresponds to display 235 of mobile IHS 200. This illustrates one example of information that app 1700A" may generate on display area 1205B. App 1700A" may display private textual and graphical banking information that includes multiple bank accounts, check 1220 and check 1221. App 1700A" may include a graphical advertisement AD 1228. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1205B should 1) display textual and graphical banking information that is no wider than 600 pixels, 2) include multiple bank accounts and 3) display graphical advertisement AD 1228 with dimensions 600 pixels by 100 pixels because 1) display resolution is 600 pixels by 1200 pixels, 2) available system memory 215 is medium, 3) connection bandwidth is medium, and 4) connection speed high. App 1700A" may transmit the device identification signature string 405 and the device determination 110 to server IHS 300 via network 105.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may handle a login failure as described above in FIGS. 9A and 9B. If device identification signature string 405 matches the device identification signature string entry, user ID field 910 matches the user ID entry associated with device identification signature string 405, and password field 915 matches the password entry associated with device identification signature string 405, the mobile information processing tool 2000A" may access the information associated with device identification signature string 405 of signature string database 380 and the device determination 110 to determine specific data to transmit to mobile IHS 200. In one embodiment, the mobile information processing tool 2000A" may receive and associate the device determination 110 with device identification signature string 405 in signature string database 380.

Data associated with device identification signature string 405 in signature string database 380 may indicate private banking content and preferred advertisement content. Signature string database 380 may associate the device identification signature string 405 with advertising content such as financial services content, literature content, home decorating content, vacation content and web hosting content. The content of the advertisement AD 1228 may be based on the advertising content categories associated with the device identification signature string 405 in signature string database 380. The non-volatile storage 340 or signature string database 380 may store private textual and graphical banking information such as multiple bank accounts, check 1220, check 1221 and graphical advertisement AD 1228 with dimensions 600 pixels by 100 pixels. The mobile information processing tool 2000A" may generate a response 115 that includes private textual and graphical banking information such as multiple bank accounts, check 1220, check 1221 and graphical advertisement AD 1228 with dimensions 600 pixels by 100 pixels. The mobile information processing tool 2000A" may transmit response 115 to mobile IHS 200 via network 105. App 1700A" may receive response 115 and output the private textual and graphical banking information and graphical advertisement AD 1228 contained therein to display area 1205B.

Figure 12D:
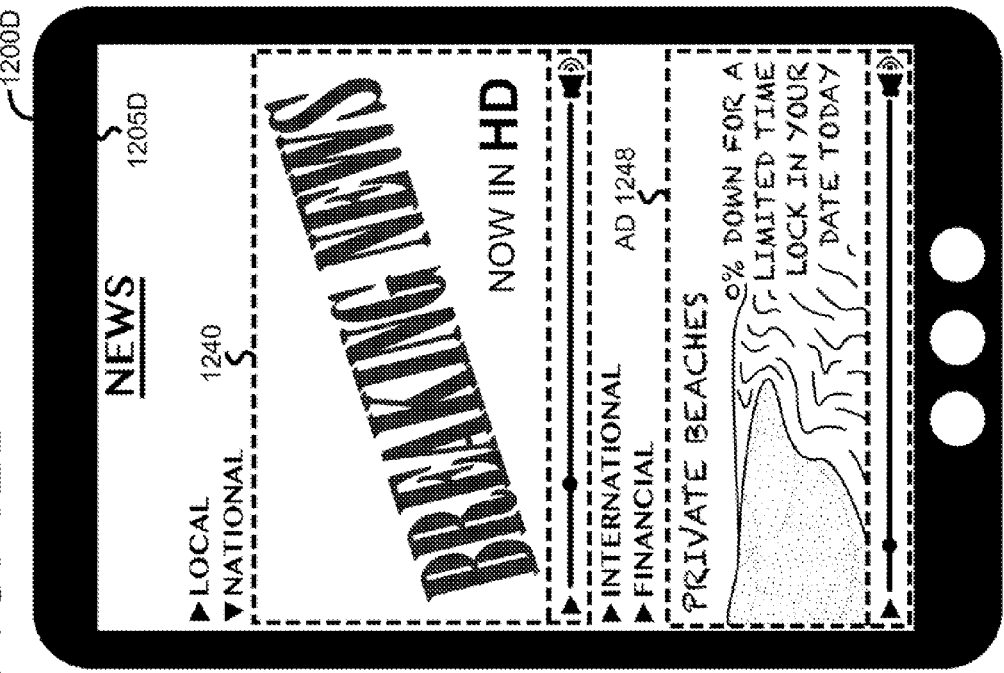
Figure 12C:
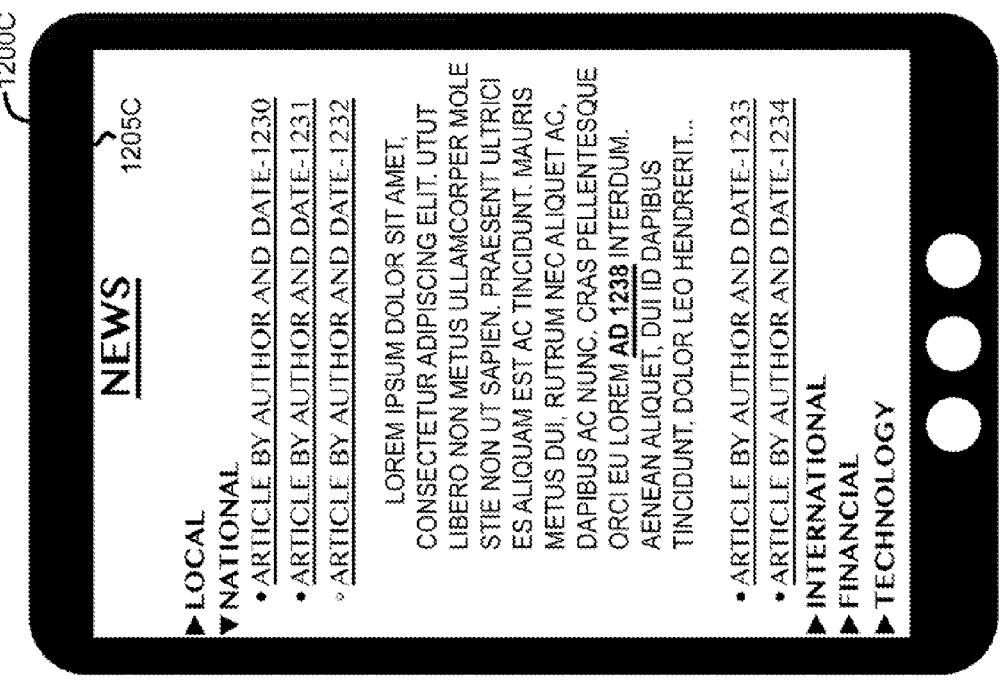

FIG. 12C shows a representative portrait-oriented tablet 1200C that may be employed as mobile IHS 200. Tablet 1200C includes a display area 1205C that corresponds to display 235 of mobile IHS 200. This illustrates one example of information that app 1700A" may generate on display area 1205C. App 1700A" may display textual news information that includes multiple news categories, article by author and date 1230, article by author and date 1231, article by author and date 1232, article by author and date 1233 and article by author and date 1234. App 1700A" may include an in-line text advertisement AD 1238. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1205C should 1) display textual news information that is no wider than 600 pixels, 2) include news categories and 3) display in-line text advertisement AD 1238 because 1) display resolution is 600 pixels by 1200 pixels, 2) available system memory 215 is low, 3) connection bandwidth is low, and 4) connection speed is low. App 1700A" may transmit the device identification signature string 405 and the device determination 110 to server IHS 300 via network 105.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200. Data associated with device identification signature string 405 in signature string database 380 may indicate news content and preferred advertisement content. Signature string database 380 may associate the device identification signature string 405 with advertising content such as financial services content, literature content, home decorating content, vacation content and web hosting content. The content of the in-line advertisement AD 1238 may be based on the advertising content categories associated with the device identification signature string 405 in signature string database 380. The non-volatile storage 340 or signature string database 380 may store textual news information such as multiple news categories, article by author and date 1230, article by author and date 1231, article by author and date 1232, article by author and date 1233, article by author and date 1234, and in-line text advertisement AD 1238. The mobile information processing tool 2000A" may generate a response 115 that includes textual news information such as multiple news categories, article by author and date 1230, article by author and date 1231, article by author and date 1232, article by author and date 1233, article by author and date 1234, and in-line text advertisement AD 1238. The mobile information processing tool 2000A" may transmit response 115 to mobile IHS 200 via network 105. App 1700A" may receive response 115 and output the textual news information and in-line advertisement AD 1238 contained therein to display area 1205C.

FIG. 12D shows a representative portrait-oriented tablet 1200D that may be employed as mobile IHS 200. Tablet 1200D includes a display area 1205D that corresponds to display 235 of mobile IHS 200. This illustrates one example of information that app 1700A" may generate on display area 1205D. App 1700A" may display textual and video news information that includes multiple news categories and breaking news video 1240. App 1700A" may include a video advertisement AD 1248. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1205D should 1) display textual and video news information that is no wider than 600 pixels, 2) include news categories, and 3) display video advertisement AD 1248 with dimensions 600 pixels by 200 pixels because 1) display resolution is 600 pixels by 1200 pixels, 2) available system memory 215 is high, 3) connection bandwidth is high, and 4) connection speed is high. App 1700A" may transmit the device identification signature string 405 and the device determination 110 to server IHS 300 via network 105.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200. Data associated with device identification signature string 405 in signature string database 380 may indicate news content and preferred advertisement content. Signature string database 380 may associate the device identification signature string 405 with advertising content such as financial services content, literature content, home decorating content, vacation content and web hosting content. The content of the advertisement AD 1248 may be based on the advertising content categories associated with the device identification signature string 405 in signature string database 380. The non-volatile storage 340 or signature string database 380 may store textual and video news information such as multiple news categories, breaking news video 1240, and video advertisement AD 1248 with dimensions 600 pixels by 200 pixels. The mobile information processing tool 2000A" may generate a response 115 that includes textual and video news information such as multiple news categories, breaking news video 1240, and video advertisement AD 1248 with dimensions 600 pixels by 200 pixels. The mobile information processing tool 2000A" may transmit response 115 to mobile IHS 200 via network 105. App 1700A" may receive response 115 and output the textual and video news information and video advertisement AD 1248 contained therein to display area 1205D. App 1700A" may also output breaking news video 1240 and video advertisement AD 1248 acoustically on a speaker, one of I/O devices 250.

Figure 13A:
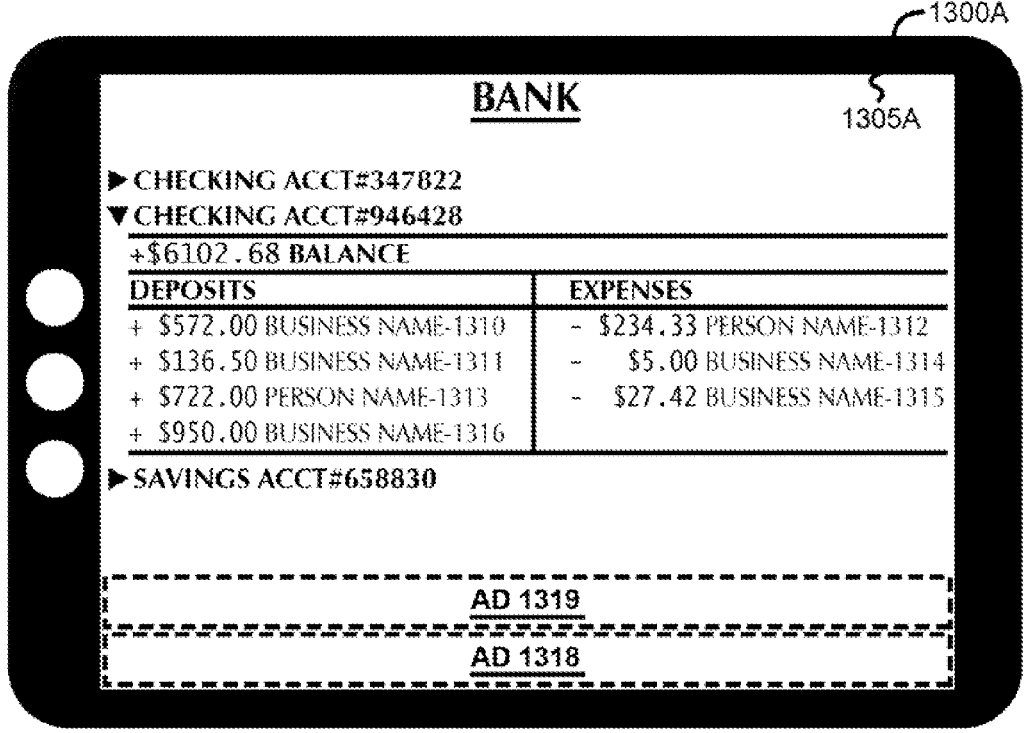
FIGS. 13A-13D show representative landscape-oriented tablets that display representative output that the disclosed app may generate.

FIG. 13A shows a representative landscape-oriented tablet 1300A that may be employed as mobile IHS 200. Tablet 1300A includes a display area 1305A that corresponds to display 235 of mobile IHS 200. This illustrates one example of information that app 1700A" may generate on display area 1305A. App 1700A" may display private textual banking information that includes multiple bank accounts, deposit columns, expense columns, business name 1310, business name 1311, person name 1312, person name 1313, business name 1314, business name 1315 and business name 1316. App 1700A" may include a text advertisement AD 1318 and a text advertisement AD 1319. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1305A should 1) display textual banking information that is no wider than 1200 pixels, 2) include multiple bank accounts, 3) display text advertisement AD 1318 with dimensions 1200 pixels by 50 pixels, and 4) display text advertisement AD 1319 with dimensions 1200 pixels by 50 pixels because 1) display resolution is 1200 pixels by 600 pixels, 2) available system memory 215 is low, 3) connection bandwidth is low, and 4) connection speed is low. App 1700A" may transmit the device identification signature string 405 and the device determination 110 to server IHS 300 via network 105.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may handle a login failure as described above in FIGS. 9A and 9B. If device identification signature string 405 matches the device identification signature string entry, user ID field 910 matches the user ID entry associated with device identification signature string 405, and password field 915 matches the password entry associated with device identification signature string 405, the mobile information processing tool 2000A" may access the information associated with device identification signature string 405 of signature string database 380 and the device determination 110 to determine specific data to transmit to mobile IHS 200. In one embodiment, the mobile information processing tool 2000A" may receive and associate the device determination 110 with device identification signature string 405 in signature string database 380.

Data associated with device identification signature string 405 in signature string database 380 may indicate private banking content and preferred advertisement content. Signature string database 380 may associate the device identification signature string 405 with advertising content such as financial services content, literature content, home decorating content, vacation content and web hosting content. The content of the advertisement AD 1318 and advertisement AD 1319 may be based on the advertising content categories associated with the device identification signature string 405 in signature string database 380. The non-volatile storage 340 or signature string database 380 may store private textual banking information such as multiple bank accounts, deposit columns, expense columns, business name 1310, business name 1311, person name 1312, person name 1313 business name 1314, business name 1315 and business name 1316, text advertisement AD 1318 with dimensions 1200 pixels by 50 pixels, and text advertisement AD 1319 with dimensions 1200 pixels by 50 pixels. The mobile information processing tool 2000A" may generate a response 115 that includes private textual banking information such as multiple bank accounts, deposit columns, expense columns, business name 1310, business name 1311, person name 1312, person name 1313 business name 1314, business name 1315 and business name 1316, text advertisement AD 1318 with dimensions 1200 pixels by 50 pixels, and text advertisement AD 1319 with dimensions 1200 pixels by 50 pixels that may be stored in non-volatile storage 340 or signature string database 380. The mobile information processing tool 2000A" may transmit response 115 to mobile IHS 200 via network 105. App 1700A" may receive response 115 and output the private textual banking information, textual advertisement AD 1318 and textual advertisement AD 1319 contained therein to display area 1305A.

Figure 13B:
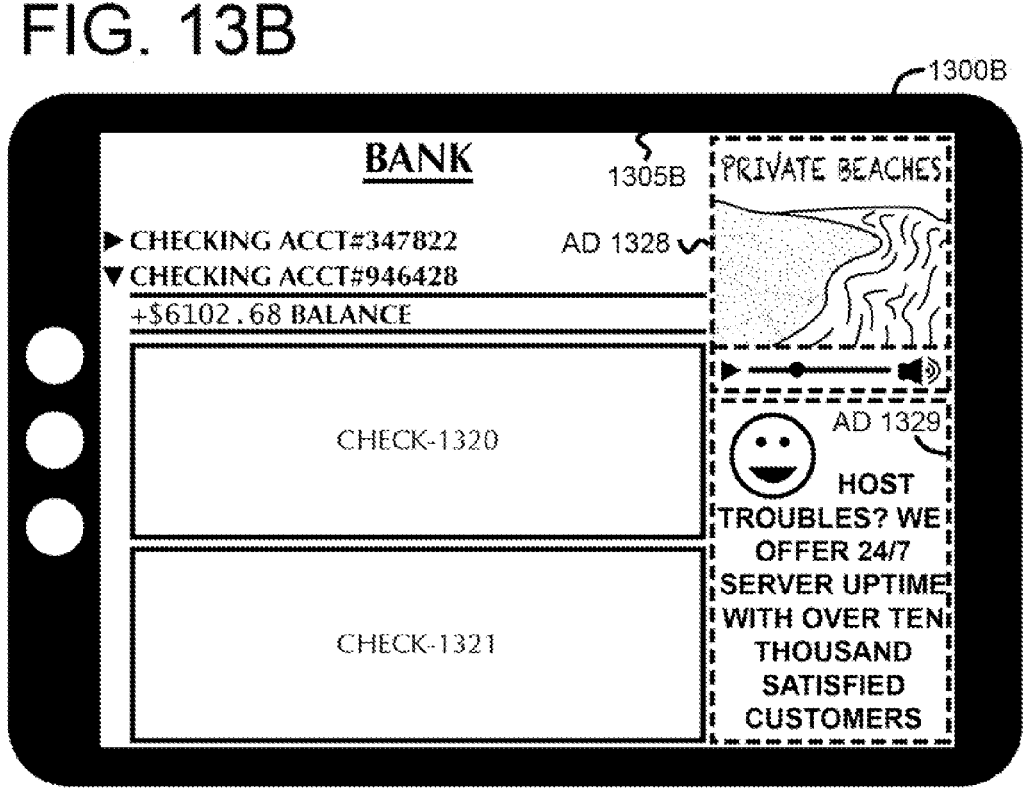

FIG. 13B shows a representative landscape-oriented tablet 1300B that may be employed as mobile IHS 200. Tablet 1300B includes a display area 1305B that corresponds to display 235 of mobile IHS 200. This illustrates one example of information that app 1700A" may generate on display area 1305B. App 1700A" may display private textual and graphical banking information that includes multiple bank accounts, check 1320 and check 1321. App 1700A" may include a video advertisement AD 1328 and a graphical advertisement AD 1328. A user of mobile IHS 200 may select an app 1700A" to interact with that user of mobile IHS

200. App 1700A" may employ unique-identification tool 1800" to generate a device identification signature string 405. App 1700A" may employ a device capability determination tool 1900" to generate a device determination 110. In one embodiment, device determination 110 may indicate that display area 1305B should display 1) textual and graphical banking information that is no wider than 1000 pixels, 2) include multiple bank accounts, 3) display video advertisement AD 1328 with dimensions 200 pixels by 200 pixels, and 4) display graphical advertisement AD 1329 with dimensions 200 pixels by 400 pixels because 1) display resolution is 1200 pixels by 600 pixels, 2) available system memory 215 is high, 3) connection bandwidth is high, and 4) connection speed is high. App 1700A" may transmit the device identification signature string 405 and the device determination 110 to server IHS 300 via network 105.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may handle a login failure as described above in FIGS. 9A and 9B. If device identification signature string 405 matches the device identification signature string entry, user ID field 910 matches the user ID entry associated with device identification signature string 405, and password field 915 matches the password entry associated with device identification signature string 405, the mobile information processing tool 2000A" may access the information associated with device identification signature string 405 of signature string database 380 and the device determination 110 to determine specific data to transmit to mobile IHS 200. In one embodiment, the mobile information processing tool 2000A" may receive and associate the device determination 110 with device identification signature string 405 in signature string database 380.

Data associated with device identification signature string 405 in signature string database 380 may indicate private banking content and preferred advertisement content. Signature string database 380 may associate the device identification signature string 405 with advertising content such as financial services content, literature content, home decorating content, vacation content and web hosting content. The content of the video advertisement AD 1328 and graphical advertisement AD 1329 may be based on the advertising content categories associated with the device identification signature string 405 in signature string database 380. The non-volatile storage 340 or signature string database 380 may store private textual and graphical banking information such as multiple bank accounts, check 1320, check 1321, video advertisement AD 1328 with dimensions 200 pixels by 200 pixels, and graphical advertisement AD 1329 with dimensions 200 pixels by 400 pixels. The mobile information processing tool 2000A" may generate a response 115 that includes private textual and graphical banking information such as multiple bank accounts, check 1320, check 1321, video advertisement AD 1328 with dimensions 200 pixels by 200 pixels, and graphical advertisement AD 1329 with dimensions 200 pixels by 400 pixels. The mobile information processing tool 2000A" may transmit response 115 to mobile IHS 200 via network 105. App 1700A" may receive response 115 and output the private textual and graphical banking information, video advertisement AD 1328 and graphical advertisement AD 1329 contained therein to display area 1305B. App 1700A" may also output video advertisement AD 1328 acoustically on a speaker, one of I/O devices 250.

Figure 13C:
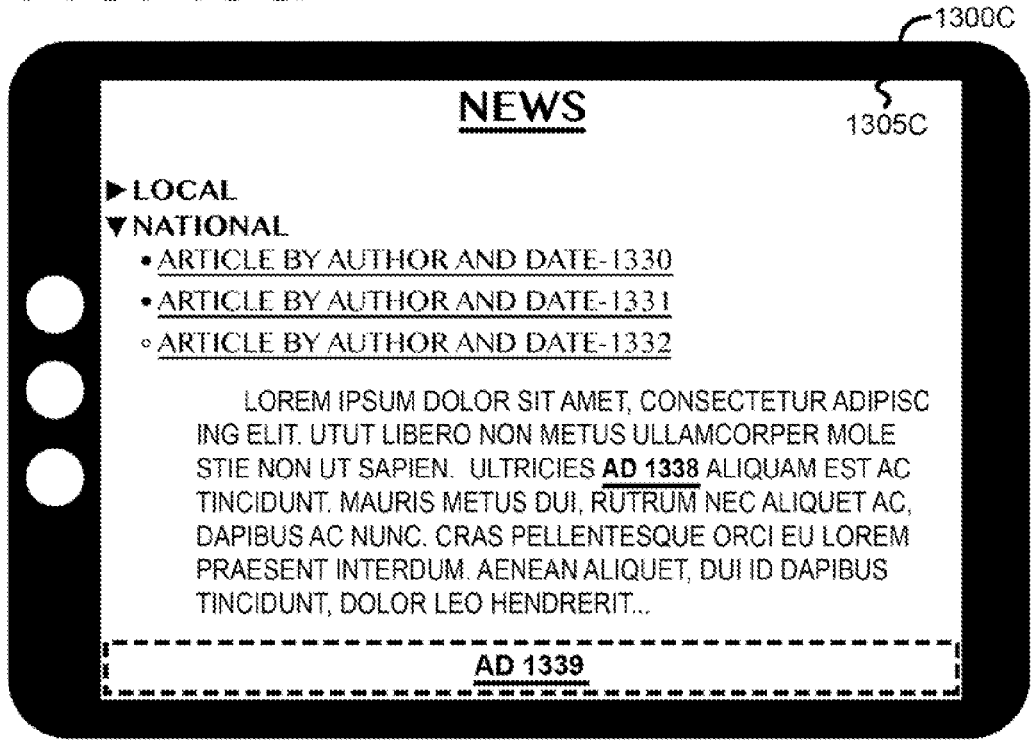

FIG. 13C shows a representative landscape-oriented tablet 1300C that may be employed as mobile IHS 200. Tablet 1300C includes a display area 1305C that corresponds to display 235 of mobile IHS 200. This illustrates one example of information that app 1700A" may generate on display area 1305C. App 1700A" may display textual news information that includes multiple news categories, article by author and date 1330, article by author and date 1331, and article by author and date 1332. App 1700A" may include an in-line text advertisement AD 1338 and a text advertisement AD 1339. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1305C should 1) display textual news information that is no wider than 1200 pixels, 2) include news categories, 3) display in-line text advertisement AD 1338, and 4) display text advertisement AD 1339 with dimensions 1200 pixels by 50 pixels because 1) display resolution is 1200 pixels by 600 pixels, 2) available system memory 215 is low, 3) connection bandwidth is low, and 4) connection speed is low. App 1700A" may transmit the device identification signature string 405 and the device determination 110 to server IHS 300 via network 105.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200. Data associated with device identification signature string 405 in signature string database 380 may indicate news content and preferred advertisement content. Signature string database 380 may associate the device identification signature string 405 with advertising content such as financial services content, literature content, home decorating content, vacation content and web hosting content. The content of the in-line advertisement AD 1338 and the text advertisement AD 1339 may be based on the advertising content categories associated with the device identification signature string 405 in signature string database 380. The non-volatile storage 340 or signature string database 380 may store textual news information such as multiple news categories, article by author and date 1330, article by author and date 1331, article by author and date 1332, in-line text advertisement AD 1238, and text advertisement AD 1339 with dimensions 1200 pixels by 50 pixels. The mobile information processing tool 2000A" may generate a response 115 that includes textual news information such as multiple news categories, article by author and date 1330, article by author and date 1331, article by author and date 1332, in-line text advertisement AD 1238, and text advertisement AD 1339 with dimensions 1200 pixels by 50 pixels. The mobile information processing tool 2000A" may transmit response 115 to mobile IHS 200 via network 105. App 1700A" may receive response 115 and output the textual news information, in-line advertisement AD 1338 and text advertisement AD 1339 contained therein to display area 1305C.

Figure 13D:

FIG. 13D shows a representative landscape-oriented tablet 1300D that may be employed as mobile IHS 200. Tablet 1300D includes a display area 1305D that corresponds to display 235 of mobile IHS 200. This illustrates one example of information that app 1700A" may generate on display area 1305D. App 1700A" may display textual and video news information that includes multiple news categories and breaking news video 1340. App 1700A" may include a video advertisement AD 1348 and a graphical advertisement AD 1349. A user of mobile IHS 200 may select an app 1700A" to interact with that user of mobile IHS 200. App 1700A" may employ unique-identification tool 1800" to generate a device identification signature string 405. App 1700A" may employ a device capability determination tool 1900" to generate a device determination 110. In one embodiment, device determination 110 may indicate that display area 1305D should 1) display textual and video news information that is no wider than 1000 pixels, 2) include news categories, 3) display video advertisement AD 1348 with dimensions 200 pixels by 200 pixels, and 4) display graphical advertisement AD 1349 with dimensions 200 pixels by 400 pixels because 1) display resolution is 1200 pixels by 600 pixels, 2) available system memory 215 is high, 3) connection bandwidth is high, and 4) connection speed is high. App 1700A" may transmit the device identification signature string 405 and the device determination 110 to server IHS 300 via network 105.

A mobile information processing tool 2000A" may receive the transmitted device identification signature string 405 and the device determination 110. The mobile information processing tool 2000A" may search a signature string database 380 for a matching device identification signature string entry. If mobile information processing tool 2000A" does not find a matching device identification signature string entry in signature string database 380, then mobile information processing tool 2000A" may create a new entry for device identification signature string 405 in the signature string database 380. In one embodiment, the mobile information processing tool 2000A" may receive and associate the device determination 110 with device identification signature string 405 in signature string database 380.

The mobile information processing tool 2000A" may access the information associated with device identification signature string 405 of signature string database 380 and the device determination 110 to determine specific data to transmit to mobile IHS 200. Data associated with device identification signature string 405 in signature string database 380 may indicate news content and preferred advertisement content. Signature string database 380 may associate the device identification signature string 405 with advertising content such as financial services content, literature content, home decorating content, vacation content and web hosting content. The content of the video advertisement AD 1348 and the graphical advertisement AD 1349 may be based on the advertising content categories associated with the device identification signature string 405 in signature string database 380. The non-volatile storage 340 or signature string database 380 may store textual and video news information such as multiple news categories, breaking news video 1340, video advertisement AD 1348 with dimensions 200 pixels by 200 pixels, and graphical advertisement AD 1349 with dimensions 200 pixels by 400 pixels. The mobile information processing tool 2000A" may generate a response 115 that includes textual and video news information such as multiple news categories, breaking news video 1340, video advertisement AD 1348 with dimensions 200 pixels by 200 pixels, and graphical advertisement AD 1349 with dimensions 200 pixels by 400 pixels. The mobile information processing tool 2000A" may transmit response 115 to mobile IHS 200 via network 105. App 1700A" may receive response 115 and output the textual and video news information, video advertisement AD 1348 and graphical advertisement AD 1349 contained therein to display area 1305D. App 1700A" may also output breaking news video 1340 and video advertisement AD 1348 acoustically on a speaker, one of I/O devices 250.

Referring to FIGS. 1-4, mobile IHS 200 may include multiple apps, including app 1700A", app 120-1, app 120-2, app 120-3, . . . , app 120-M. In one embodiment, app 120-1 may include a unique-identification tool 1800" and a device capability determination tool 1900", as does app 1700A". If app 120-1 and app 1700A" execute at the same time, unique-identification tool 1800" in app 120-1 and unique-identification tool 1800" in app 1700A" will each generate a device identification signature string 405. Because app 1700A" generates device identification signature string 405 and app 120-1 generates device identification signature string 405 at the same time and on the same mobile IHS 200, these two device identification signature strings are identical in one embodiment. Device identification signature string 405 may change temporally. In one embodiment, device identification signature string 405 remains static during execution of app 1700A", app 120-1, app 120-2, app 120-3, . . . , app 120-M. In another embodiment, device identification signature string 405 may be different for each app 1700A", app 120-1, app 120-2, app 120-3, . . . , app 120-M.

App 1700A", app 120-1, app 120-2, app 120-3, . . . , app 120-M may also store a respective unique app identification string 407 in memory 315 that is unique to app 1700A", app 120-1, app 120-2, app 120-3, . . . , app 120-M, respectively. The unique app identification 407 may be used to uniquely identify the app. For example, app 1700A" may be a personal finance app named "Bullet Proof Finances" that is widely distributed to multiple mobile IHSs. In one embodiment, all apps named "Bullet Proof Finances" may include the same unique app identification string 407. In another embodiment, all apps named "Bullet Proof Finances" may include a different unique app identification string 407. In other words, the unique app identification string 407 may be unique to app 1700A" on mobile IHS 200.

In one embodiment, mobile IHS 300 may transmit the unique app identification string 407 to server IHS 300 along with device identification signature string 405 and device determination 110. In server IHS 300, mobile information processing tool 2000A" receives the transmitted device identification signature string 405, unique app identification string and the device determination 110. The mobile information processing tool 2000A" may search signature string database 380 for a matching device identification signature string entry. If mobile information processing tool 2000A" does not find a matching device identification signature string entry in signature string database 380, then mobile information processing tool 2000A" may create a new entry for received device identification signature string 405 in the signature string database 380. In one embodiment, the mobile information processing tool 2000A" in server IHS 300 may receive and associate the device determination 110 and the unique app identification string with device identification signature string 405 in signature string database 380. An "old device identification signature string" refers to a device identification signature string already stored in database 380. An old device identification signature string may be associated with a device determination, an app identification string or other parameters that relate to a particular mobile IHS.

Mobile information processing tool 2000A" may use the unique app identification string to help identify mobile IHS 200 in signature string database 380 when device identification signature string 405 has changed. In the event that device identification signature string 405 has changed, the unique app identification may be used to associate the new device identification signature string with the old device identification signature string entry stored in signature string database 380. In other words, if mobile information processing tool 2000A" in server IHS 300 determines that the app identification string associated with a new received unrecognized device identification signature string matches an old app identification string already in signature string database 380, then server IHS 300 may assume that the new received device identification signature string refers to the same mobile IHS 200 as the old device identification signature string 405 that exhibits the same app identification string. Stated alternatively, if the new received device identification signature sting and an old device identification signature string in database 380 have a app identification string in common, then database 380 may link the new device identification signature string to the already stored old device identification signature string, by associating each with the other. Each of these two device identification signature string thus refers to the same particular mobile IHS 200. This feature effectively extends the life of a device identification signature string when the device identification signature string changes.

In the following discussion of FIGS. 14, 15 and 16, it will be appreciated that some functionality is moved from mobile IHS 200 to server 300. In the embodiments that these figures depict, server IHS 1500 includes a device capability determination tool 2200" as well as mobile information processing tool 2000B" and signature string database 1580.

FIG. 14 is a block diagram of mobile IHS 1400, namely an alternative embodiment of mobile IHS 200 that replaces app 1700A and device capability determination tool 1900 with app 1700B and device capability tool 2100, respectively. FIG. 14 is a block diagram of a mobile IHS 1400 that employs an app 1700B, a unique-identification tool 1800 and a device capability tool 2100. Although not shown in FIG. 14, app 1700B" may further include an app identification generator 1905 that generates an app identification string 407 that is unique to that app. Each app in mobile IHS 1400 may include a respective app identification generator that generates a different random app identification string 407. FIG. 16 shows such an app generator as app generator 1905.

Mobile IHS 1400 of FIG. 14 includes many components in common with mobile IHS 200 of FIG. 2. Like numbers indicate like components when comparing mobile IHS 1400 of FIG. 14 with mobile IHS 200 of FIG. 2. Mobile IHS 1400 includes an application (app) computer readable medium 1700B on digital medium 275 such as a CD, DVD or other media. Digital medium 275 is a computer readable medium. In one embodiment, a unique-identification tool 1800 and a device capability tool 2100 are packaged within app 1700B as shown in FIG. 14. In actual practice, mobile IHS 1400 may store app 1700B, unique-identification tool 1800 and device capability tool 2100 in nonvolatile storage 240 as app 1700B', unique-identification tool 1800' and device capability determination tool 2100', respectively. Mobile IHS 200 may also store operating system 245 (OPERATING SYS) in nonvolatile storage 240. When mobile IHS 200 initializes, the mobile IHS loads operating system 245 into system memory 215 for execution as operating system 245'. Mobile IHS 200 also loads app 1700B', unique-identification tool 1800' and device capability tool 2100' into system memory 215 for execution as app 1700B", unique-identification tool 1800" and device capability tool 2100", respectively.

Figure 15:
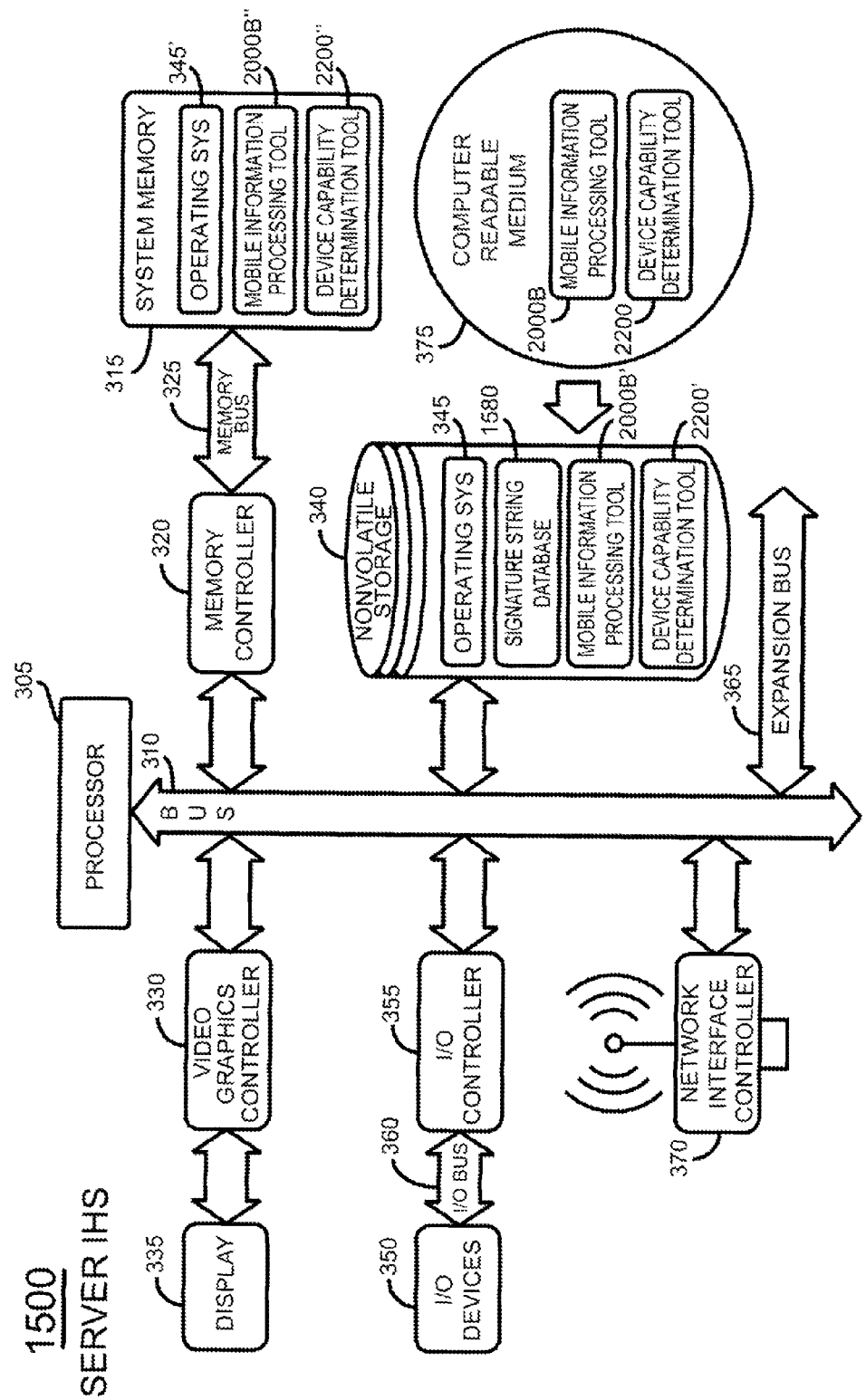
FIG. 15 is a block diagram of another embodiment of the disclosed server IHS that includes a mobile information processing tool, a signature string database and a device capability determination tool.

FIG. 15 is a block diagram of server IHS 1500, namely an alternative embodiment of server IHS 300 that replaces mobile information processing tool 2000A with mobile information processing tool 2000B and introducing device capability determination tool 2200. FIG. 15 is a block diagram of a server IHS 1500 that employs the disclosed mobile information processing tool 2000B" to receive information from mobile IHS 1400 and transmit an appropriate response to mobile IHS 1400. Server IHS 1500 includes many components in common with server IHS 300 of FIG. 3. Like numbers indicate like components when comparing server IHS 1500 of FIG. 15 with 1500 IHS 300 of FIG. 3. Server IHS 1500 includes a mobile information processing tool computer readable medium 2000B and a device capability determination tool 2200 computer readable medium on digital medium 375 such as a CD, DVD or other media. Digital medium 375 is a computer readable medium. For simplicity, the term mobile information processing tool and device capability determination tool are used below. Server IHS 1500 may store mobile information processing tool 2000B and device capability determination tool 2200 in nonvolatile storage 340 as mobile information processing tool 2000B' and device capability determination tool 2200', respectively. Server IHS 1500 may also store operating system 345 (OPERATING SYS) and signature string database 1580 in nonvolatile storage 340. When server IHS 1500 initializes, the server IHS loads operating system 345 into system memory 315 for execution as operating system 345'. Server IHS 300 also loads mobile information processing tool 2000B' and device capability determination tool 2200' into system memory 315 for execution as mobile information processing tool 2000B" and device capability determination tool 2200", respectively.

Figure 16:
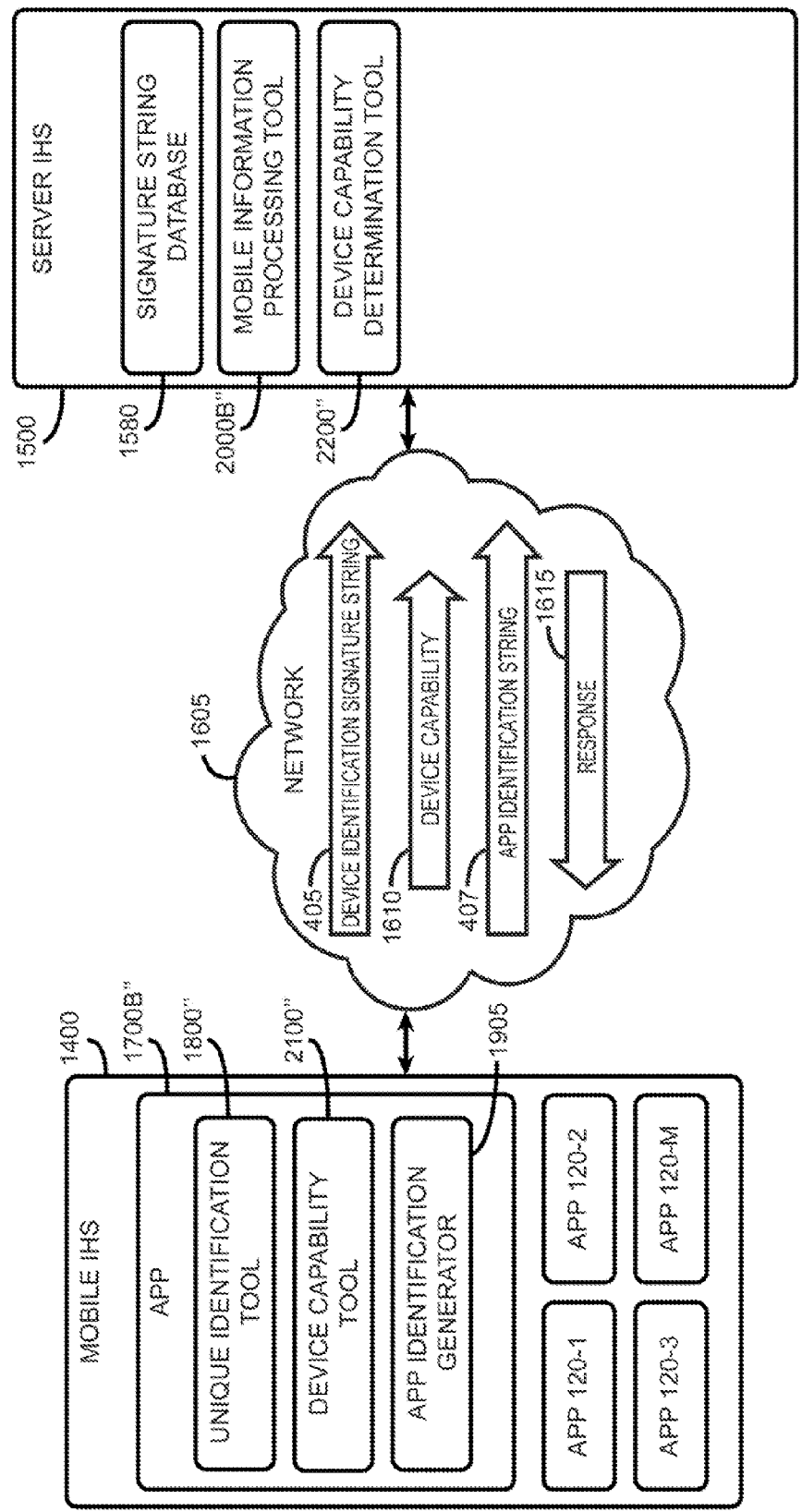
FIG. 16 is a block diagram of another embodiment of the disclosed communication system that includes a mobile IHS that couples via a network to a server IHS.

FIG. 16 is a block diagram of an alternative embodiment of the disclosed communication system that shows a communication system 1600 that employs mobile IHS 1400 of FIG. 14 and server IHS 1500 of FIG. 15. As seen in FIG. 16, mobile IHS 1400 couples via a network 1605 to a server IHS 1500. A user of mobile IHS 1400 may select an app 1700B" to interact with mobile IHS 1400. App 1700B" may employ unique-identification tool 1800" to generate a unique device identification signature string 405 that acts as an identifier for mobile IHS 1400. App 1700B" may employ a device capability tool 2100" to generate device capability information 1610, i.e. provide device capability information, as explained in more detail below. To generate the device capability information 1610, device capability tool 2100" may determine device capabilities of mobile IHS 1400. Device capabilities of mobile IHS 1400 may include the hardware capability of the mobile IHS 1400, the network capability of mobile IHS 1400 and the network capability between the mobile IHS 1400 and the server IHS 1500.

The hardware capability of mobile IHS 1400 may include any device capability parameter that relates to the hardware function, state or capability of the hardware of mobile IHS 1400. For example, the hardware capability of mobile IHS 1400 may include information that relates to the resolution of display 235, the size of display 235, battery life, video graphics controller 230, memory controller 220, maximum size of system memory 215, amount of system memory 215 in use, maximum size of nonvolatile storage 240, amount of nonvolatile storage 240 in use, processor 205, percentage of processor 205 in use and the I/O devices 250 coupled to mobile IHS 1400.

The network capability of mobile IHS 1400, also referred to as networking information, may include any device capability parameter such as information that relates to the networking hardware, state or capability of the networking hardware of mobile IHS 1400. For example, the network capability of mobile IHS 1400 may include information that relates to network interface controller 270, network connection type, available networks, network signal strengths, network uptimes and network latency. The network capability between the mobile IHS 1400 and the server IHS 1500 may include any device capability parameter such as information that relates to the hardware, state or capability of the connection of mobile IHS 1400 to server IHS 1500 via network 1605. For example, the network capability between the mobile IHS 1400 and the server IHS 1500 may include information that relates to connection type, speed, bandwidth, latency, jitter and uptime.

App 1700B" may transmit the device identification signature string 405 and the device capability information 1610 and the app identification string 407 to server IHS 1500 via network 1605. In another embodiment, app 1700B" may transmit other data, such as user ID, password, question answers and other information to server IHS 1500 via network 1605.

In one embodiment, a mobile information processing tool 2000B" may receive the transmitted device identification signature string 405, the device capability 1610 and the app identification string 407. The mobile information processing tool 2000B" may search a signature string database 1580 for a matching device identification signature string entry. In one embodiment, if mobile information processing tool 2000B" finds no matching device identification signature string entry in signature string database 1580, then mobile information processing tool 2000B" may create a new entry for device identification signature string 405 in the signature string database 1580. In one embodiment, the mobile information processing tool 2000B" may receive and associate the device capability 1610 with device identification signature string 405 in signature string database 1580. If mobile information processing tool 2000B" finds a matching device identification signature string entry in signature string database 1580, then server IHS 1500 effectively knows that the received data came from a particular mobile IHS 1400, namely the mobile IHS that has device identification signature string as its device identifier. In other words, server IHS 1500 effectively recognizes a particular received signature string 405 as being unique to a the particular mobile IHS 1400 that generated that particular received signature string 405 that is already in its signature string database 1580.

In another embodiment, if mobile information processing tool 2000B" of server IHS 1500 finds no matching device identification signature string entry in signature string database 1580, then mobile information processing tool 2000B" may create a new entry for device identification signature string 405 in signature string database 1580. In one embodiment, the mobile information processing tool 2000A" may receive and associate the device capability 1610 with device identification signature string 405 in signature string database 1580. Mobile information processing tool 2000B" may also receive and associate app identification string 407 with device identification signature string 405 and device capability 1610 in signature string database 1580. Providing the unique device identification signature string 405, device capability 1610 and app identification string 407 to mobile information processing tool 2000B" in this manner, allows server IHS 1500 to provide appropriate responsive information 1615 to mobile IHS 1400. It is noted that each app identification generator 1905 in app 1700B" and in apps 1620-1, 1620-2, 1620-3, . . . 1620-M generates a different pseudo-random app identification string for its respective app. However, each time an app and its respective app identification generator 1905 execute, app identification generator 1905 will generate the same app identification string for that particular app.

A change in event information may cause device identification signature string 405 for a particular mobile IHS 1400 to change to a new device identification signature string 405, the previous device identification signature string 405 being called the old device identification signature string 405. In that event, the mobile information processing tool 2000B" in server IHS 1580 will not initially include an entry in its signature string database 1580 for the new device identification signature string 405. If mobile information processing tool 2000B" finds no entry in signature string database 1580 corresponding to the new device identification signature string 405, then mobile information processing tool 2000B" performs a search in signature string database 1580 to find an app identification string 407 that matches the currently received app identification string 407. If mobile information processing tool 2000B" finds such an app identification string match, then mobile information processing tool 2000B" accesses the old device identification string 405 associated with app identification string 407 and associates the new device identification string 405 with the old device identification string 405 and the device determination associated with the old device identification string 405. This enables communication system 1600 to effectively extend the life of the old device identification signature string 405 by linking the new device identification signature string 405 to the old device identification signature string 405 via a common app identification string 407. As apps 1700B", 1620-1, 1620-2, 1620-3, . . . 1620-M execute over time, mobile IHS 1400 sends corresponding app identification string 407 along with associated device identification signature string 405 and device capability 1610, for storage by server IHS 1500 in its signature string database 1580.

Many types of Information may be associated with each device identification signature string entry in the signature string database 1580. For example, if app 1700B" relates to mapping, app 1700B" may transmit a set of GPS coordinates from mobile IHS 1400 to server IHS 1500 via network 1605. The mobile information processing tool 2000B" may receive the set of GPS coordinates and associate the set of GPS coordinates with device identification signature string 405 in signature string database 1580.

The device capability determination tool 2200" may receive the transmitted device capability information 1610. The device capability determination tool 2200" may determine the performance capabilities of mobile IHS 1400.

Performance capabilities indicate the level of performance of the device parameters of mobile IHS 1400. For example, in one embodiment, if each device capability parameter from device capability information 1610 exhibits a value greater than a corresponding predetermined threshold, also referred to as a performance level, the performance capability of each device capability parameter may be considered high. Device capability determination tool 2200" may consider multiple capability parameters with multiple thresholds, respectively. The device capability determination tool 2200" may generate different device determinations when different device capability parameters exceed corresponding predetermined thresholds, respectively. Simply put, because of the performance capabilities of mobile IHS 1400, also referred to as performance levels of mobile IHS 1400, the device capability determination tool 2200" may generate the device determination that indicates the size, type, format and content of information, as an indication of the complexity of content that may be processed by mobile IHS 1400. For example, if the bandwidth is low, below a predetermined threshold, the device capability determination tool 2200" may generate a device determination that indicates that server IHS 1500 should transmit text data to mobile IHS 1400. In another example, if the bandwidth is high, above the predetermined threshold, the device capability determination tool 2200" may generate a device determination that indicates that server IHS 1500 should transmit video data to mobile IHS 1400.

The device capability determination tool 2200" may generate a device determination. The device capability determination tool 2200" may associate the generated device determination with signature string 405 and store the generated device determination in signature string database 1580. The mobile information processing tool 2000B" may access the information associated with device identification signature string 405 of signature string database 1580 and the device determination to determine specific data to transmit to mobile IHS 1400. The mobile information processing tool 2000B" may transmit the specific data as a response 1615 to mobile IHS 1400 via network 1605. App 1700B" in mobile IHS 1400 may receive the response 1615 and output the specific data contained therein. For example, app 1700B" may display the specific data on display 235, and/or output the information acoustically.

Mobile IHS 1400 may include multiple apps, including app 1700B", app 1620-1, app 1620-2, app 1620-3, . . . , app 1620-M. In one embodiment, app 1620-1 may include a unique-identification tool 1800" and a device capability tool 2100", as does app 1700B". If app 1620-1 and app 1700B" execute at the same time, unique-identification tool 1800" in app 1620-1 and unique-identification tool 2100" in app 1700B" would each generate a device identification signature string 405. Because app 1700B" generates device identification signature string 405 and app 1620-1 generates device identification signature string 405 at the same time and on the same mobile IHS 1400, these two device identification signature strings are identical in one embodiment. Each of apps 1620-2, 1620-3, . . . 1620-M may also include tools such as unique-identification tool 1800" and device capability tool 2100". Device identification signature string 405 may change temporally. In one embodiment, device identification signature string 405 remains static during execution of app 1700B", app 1620-1, app 1620-2, app 1620-3, . . . , app 1620-M. In another embodiment, device identification signature string 405 may be different for each app 1700B", app 1620-1, app 1620-2, app 1620-3, . . . , app 1620-M.

App 1700B", app 1620-1, app 1620-2, app 1620-3, . . . , app 1620-M may also store a respective unique app identification string 407 in memory 315 that is unique to app 1700B", app 1620-1, app 1620-2, app 1620-3, . . . , app 1620-M, respectively. The unique app identification 407 may be used to uniquely identify the app. For example, app 1700B" may be a personal finance app named "Bullet Proof Finances" that is widely distributed to multiple mobile IHSs. In one embodiment, all apps named "Bullet Proof Finances" may include the same unique app identification string 407. In another embodiment, all apps named "Bullet Proof Finances" may include a different unique app identification string 407. In other words, the unique app identification string 407 may be unique to app 1700B" on mobile IHS 1400.

In one embodiment, mobile IHS 1400 may transmit the unique app identification string 407 to server IHS 1500 along with device identification signature string 405 and device determination 110. In server IHS 1500, mobile information processing tool 2000B" receives the transmitted device identification signature string 405, unique app identification string 407 and the device capability 1610. The mobile information processing tool 2000B" may search signature string database 1580 for a matching device identification signature string entry. If mobile information processing tool 2000B" does not find a matching device identification signature string entry in signature string database 1580, then mobile information processing tool 2000B" may create a new entry for received device identification signature string 405 in the signature string database 1580. In one embodiment, the mobile information processing tool 2000B" in server IHS 1500 may receive and associate the device capability 1610 and the unique app identification string 407 with device identification signature string 405 in signature string database 1580. Mobile information processing tool 2000B" may use the unique app identification string to help identify mobile IHS 1400 in signature string database 1580 when device identification signature string 405 has changed. In the event that device identification signature string 405 has changed, the unique app identification 407 may be used to associate the new device identification signature string with the old device identification signature string entry stored in signature string database 1580. In other words, if mobile information processing tool 2000B" in server IHS 1500 determines that the app identification string associated with a new received unrecognized device identification signature string matches an app identification signature string already in signature string database 1580, then server IHS 1500 may assume that the new received device identification signature string refers to the same mobile IHS 1400 as the old device identification signature string 405 that exhibits the same app identification string. Stated alternatively, if the new received device identification signature sting and a device identification signature string in database 1580 have an app identification string in common, then database 1580 may link the new device identification signature string with the already stored device identification signature string, by associating each with the other. Each of these two device identification signature strings thus refers to the same particular mobile IHS 1400. This feature effectively extends the life of a device identification signature string when the device identification signature string changes.

FIG. 17A is a flowchart that shows process flow of the disclosed app 1700A" as it executes on mobile IHS 200. The contents of the ovular block on the upper right corner of each rectangular process block indicate the particular structure within communication system 100 that performs the function of the rectangular process block. Process flow commences when a user of mobile IHS 200 selects app 1700A" and initializes app 1700A", as per block 1705. App 1700A" executes unique-identification tool 1800" which may generate a device identification signature string 405, as per block 1710. App 1700A" executes device capability determination tool 1900" which may generate a device determination 110, as per block 1715. App 1700A" may transmit the results of unique-identification tool 1800" and device capability determination tool 1900", namely device identification signature string 405 and device determination 110, respectively, to server IHS 300 via network 105, as per block 1720.

App 1700A" may receive a response 115 from server IHS 300 via network 105, as per block 1725. App 1700A" may decode the response 115 if response 115 is encoded, as per block 1730. App 1700A" may output the response 115, which may contain specific data. For example, if the response 115 contains specific data such as graphical or textual information, app 1700A" may display the graphical or textual information on display 235. If response 115 contains audio information, app 1700A" may output the information on a speaker, one of I/O devices 250, as per block 1735. At this point, the disclosed methodology may end as per block 1740, or, alternatively, process flow may continue back to block 1710 and process flow continues.

FIG. 17B is a flowchart that shows process flow of the disclosed app 1700B" as it executes on mobile IHS 1400. Process flow commences when a user of mobile IHS 1400 selects app 1700B" and initializes app 1700B", as per block 1755. App 1700B" executes unique-identification tool 1800" which may generate a device identification signature string 405, as per block 1760. App 1700B" executes device capability tool 2100" which may generate device capability information 1610, as per block 1765. App 1700B" may transmit the results of unique-identification tool 1800" and device capability tool 2100", namely device identification signature string 405 and device capability information 1610, respectively, to server IHS 1500 via network 1605, as per block 1770.

App 1700B" may receive a response 1615 from server IHS 1500 via network 1505, as per block 1775. App 1700B" may decode the response 1615 if response 1615 is encoded, as per block 1780. App 1700B" may output the response 1615, which may contain specific data. For example, if the response 1615 contains specific data such as graphical or textual information, app 1700B" may display the graphical or textual information on display 235. If response 1615 contains audio information, app 1700B" may output the information on a speaker, one of I/O devices 250, as per block 1785. At this point, the disclosed methodology may end as per block 1790, or, alternatively, process flow may continue back to block 1760 and process flow continues.

Figure 18:
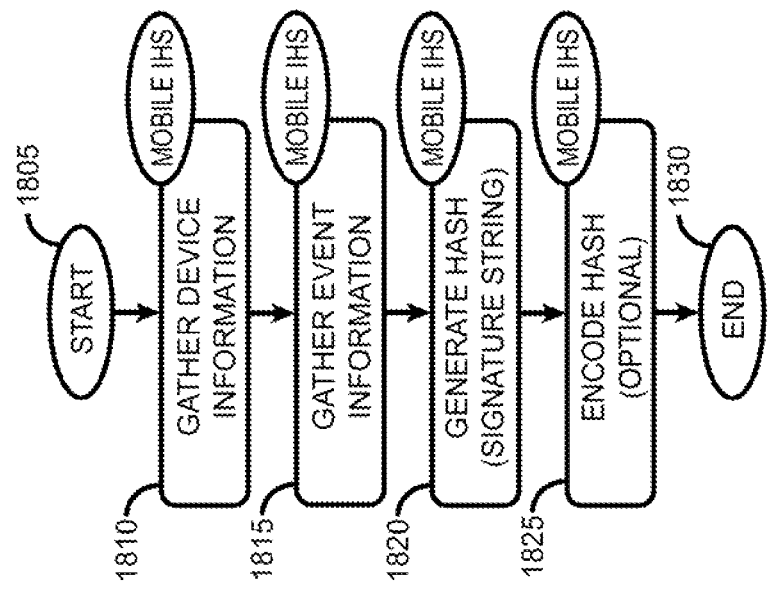
FIG. 18 is a flowchart that shows process flow in one embodiment of the disclosed unique-identification tool.

FIG. 18 is a flowchart that shows process flow of the disclosed unique-identification tool 1800". Process flow commences when app 1700A" or alternative embodiment app 1700B" executes and initializes unique-identification tool 1800", as per block 1805. Unique-identification tool 1800" may gather device information 410 from mobile IHS 200 or alternatively from mobile IHS 1400, as explained in detail above with reference to FIG. 4, as per block 1810. Unique-identification tool 1800" may also gather event information 415 from mobile IHS 200 or alternatively from mobile IHS 1400, as explained in detail above with reference to FIG. 4, as per block 1815. Unique-identification tool 1800" may generate a device identification signature string 405. Device identification signature string 405 may include both device information 410 and event information 415, as explained in detail in FIG. 4, as per block 1820. Unique-identification tool 1800" may encode the device identification signature string 405, as per block 1825. The disclosed unique-identification tool methodology may end, as per block 1830.

Figure 19:
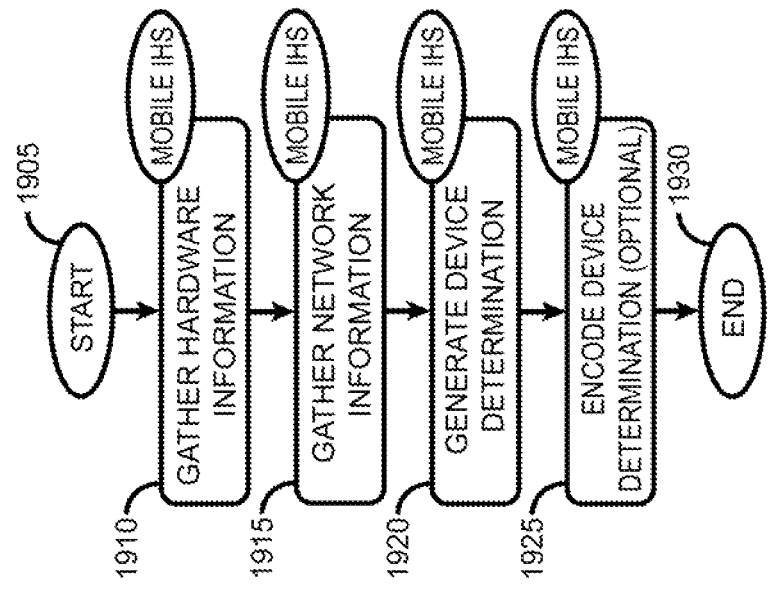
FIG. 19 is a flowchart that shows process flow in one embodiment of the disclosed device capability determination tool.

FIG. 19 is a flowchart that shows process flow of the disclosed device capability determination tool 1900". Process flow commences when app 1700B" executes and initializes device capability determination tool 1900", as per block 1905. Device capability determination tool 1900" may gather hardware information from mobile IHS 200 as explained in detail in paragraph 0047, as per block 1910. Device capability determination tool 1900" may gather network information from mobile IHS 200 as explained in detail in paragraph 0048, as per block 1915. Device capability determination tool 1900" may generate a device determination 110. Device determination 110 may include both hardware information and network information, as explained in detail in paragraph 0049, as per block 1920. Device capability determination tool 1900" may encode the device determination 110, as per block 1925. The disclosed methodology may end as per block 1930.

Figure 20A:
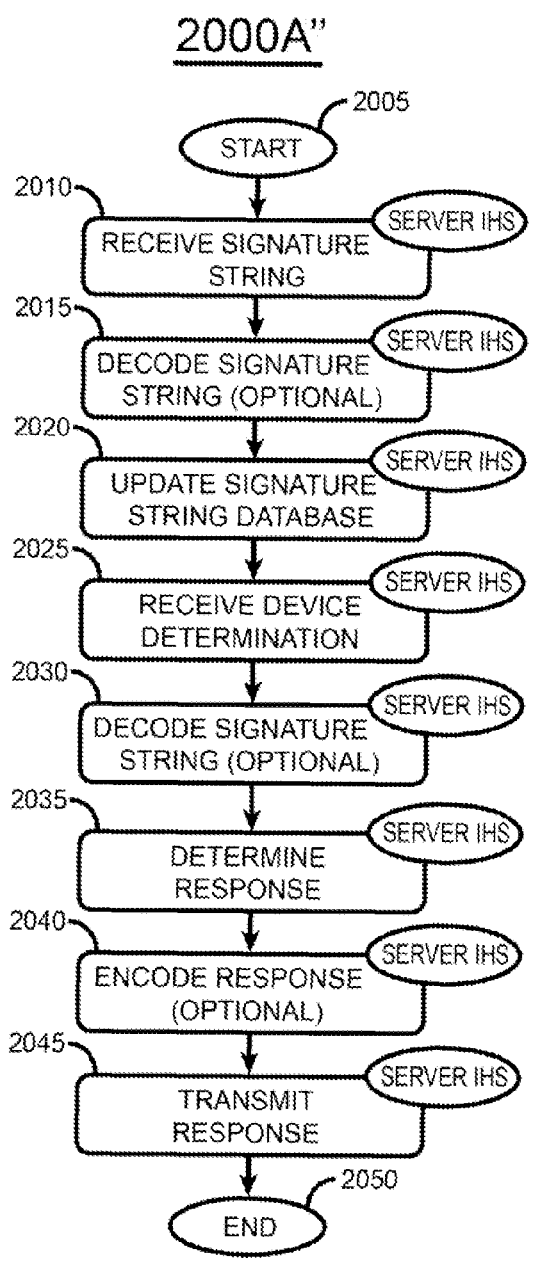
FIGS. 20A-20B are flowcharts that show process flow in different embodiments of the disclosed mobile information processing tool.

FIG. 20A is a flowchart that shows process flow of the disclosed mobile information processing tool 2000A" that server IHS 300 of FIGS. 1 and 3 may employ. Process flow may commence when server IHS 200 receives device identification signature string 405 and device determination 110 from mobile IHS 200 via network 105 and therefore initializes mobile information processing tool 2000A", as per block 2005. Mobile information processing tool 2000A" may receive device identification signature string 405, as per block 2010. Mobile information processing tool 2000A" may decode device identification signature string 405, as per block 2015, if device identification signature string 405 is an encoded device identification signature string. Mobile information processing tool 2000A" may update device identification signature string database 380, as described in detail with reference to FIG. 1, as per block 2020.

Mobile information processing tool 2000A" may receive device determination 110, as per block 2025. Mobile information processing tool 2000A" may decode device determination 110, as per block 2030, if the device information is encoded device information. In response to the device identification signature string 405 and the device determination 110, mobile information processing tool 2000A" may determine and generate response 115, as described in detail with reference to FIGS. 1 and 5-13, as per block 2035. Mobile information processing tool 2000A" may optionally encode response 115, as per block 2040. Mobile information processing tool 2000A" may transmit response 115 to mobile IHS 200 via network 105, as per block 2045. The disclosed methodology may end as per block 2050.

Figure 20B:
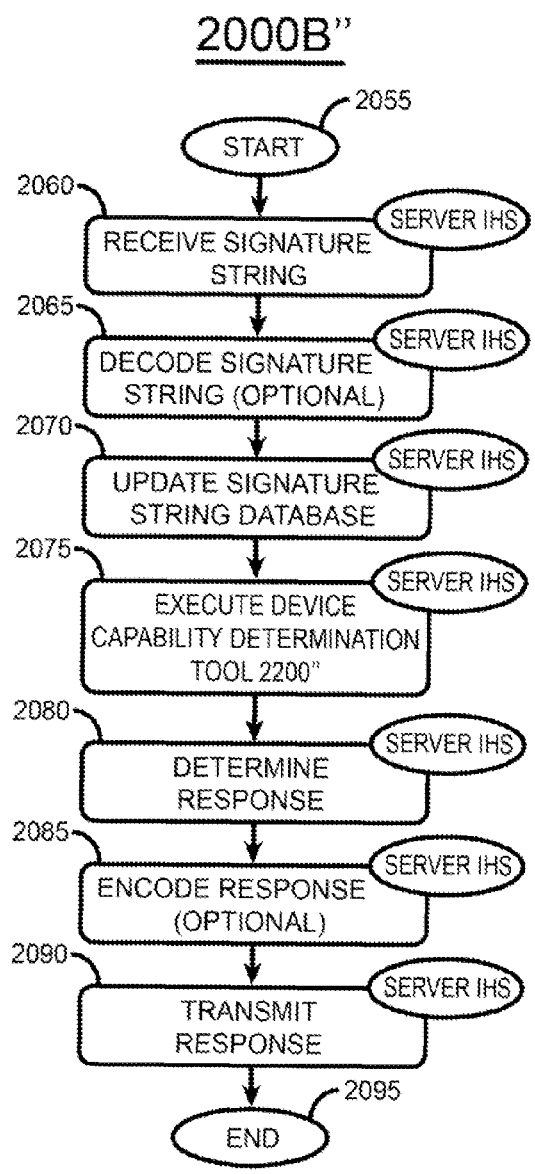

FIG. 20B is a flowchart that shows process flow of the disclosed mobile information processing tool 2000B" that server IHS 1500 of FIGS. 15 and 16 may employ. Process flow may commence when server IHS 1500 receives device identification signature string 405 and device capability 1610 from mobile IHS 1400 via network 1605 and therefor initializes mobile information processing tool 2000B", as per block 2060. Mobile information processing tool 2000B" may receive device identification signature string 405, as per block 2060. Mobile information processing tool 2000B" may decode device identification signature string 405, as per block 2065, if device identification signature string 405 is an encoded signature string. Mobile information processing tool 2000B" may update signature string database 1680, as described in detail with reference to FIG. 16, as per block 2070.

Mobile information processing tool 2000B" may execute device capability determination tool 2200" which generates a device determination, as explained in detail with reference to FIG. 16, as per block 2075. In response to the received device identification signature string 405 and the device determination, mobile information processing tool 2000B" may determine and generate response 1615, as described in detail with reference to FIG. 16, as per block 2080. Mobile information processing tool 2000B" may optionally encode response 1615, as per block 2085. Mobile information processing tool 2000B" may transmit response 1615 to mobile IHS 1400 via network 1605, as per block 2090. The disclosed methodology may end as per block 2095.

Figure 21:
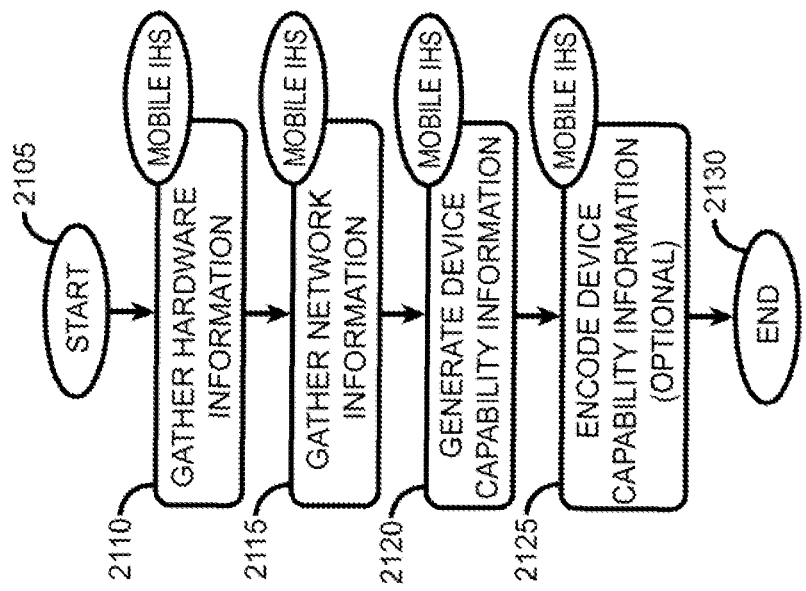
FIG. 21 is a flowchart that shows process flow in one embodiment of the disclosed device capability tool.

FIG. 21 is a flowchart that shows process flow of the disclosed device capability tool 2100" of mobile IHS 1400 of FIGS. 14 and 16. Process flow commences when app 1700B" of mobile IHS 1400 executes and initializes device capability tool 2100", as per block 2105. Device capability tool 2100" may gather hardware information from mobile IHS 1400 as explained in detail above with reference to FIG. 16, as per block 2110. Device capability tool 2100" may gather network information from mobile IHS 1400 as explained in detail in above with reference to FIG. 16, as per block 2115. Device capability tool 2100" may generate a device capability 1610. Device capability 1610 may include both hardware information and network information, as explained in detail in FIG. 16, as per block 2120. Device capability tool 2100" may encode the device capability 1610, as per block 2125. The disclosed methodology may end as per block 2130.

Figure 22:
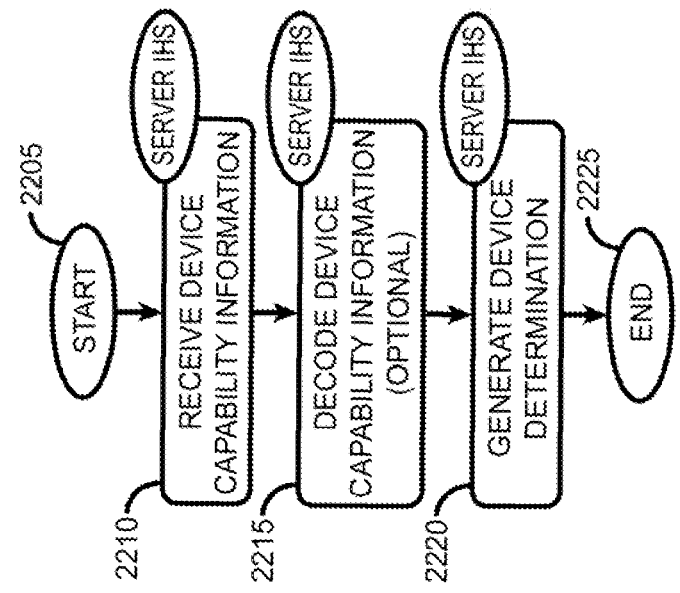
FIG. 22 is a flowchart that shows process flow in another embodiment of the disclosed device capability determination tool.

FIG. 22 is a flowchart that shows process flow of the disclosed device capability determination tool 2200" of server IHS 1500 of FIGS. 15 and 16. Process flow commences when mobile information processing tool 2000B" of server IHS 1500 executes and initializes device capability determination tool 2200", as per block 2205. Device capability determination tool 2200" may receive device capability 1610, as per block 2010. Device capability determination tool 2200" may decode device capability 1615, as per block 2215. Device capability determination tool 2200' of server IHS 1500' may generate a device determination. The device determination may include both hardware information and network information, as explained in detail in FIG. 16, as per block 2220. The disclosed methodology may end as per block 2225.

FIG. 23 is a flowchart that summarizes process flow in a representative embodiment of the disclosed communication system 100, wherein an app such as app 1700A" or other app of mobile IHS 200 generates an app identification string 407, as well as a device identification signature string 405 and a device determination 110. Process flow commences at start block 2305. Mobile IHS 200 executes app 1700A" and thus executes unique identification tool 1800", device capability tool 1900" and app identification generator 1905, as per block 2310. Unique identification tool 1800 generates device identification signature string 405, as discussed above in detail. Device capability determination tool 1900" generates device determination 110, also as discussed above. Identification generator 1905 generates app identification string 407, also as discussed above.

Mobile IHS 200 transmits device identification signature string 405, device determination 110 and app identification string 407 to server IHS 300 via network 105, as per block 2315. Mobile information processing tool 2000A" receives device identification signature string 405, device determination 110 and app identification string 407, as per block 2320. Mobile information processing tool 2000A" of server IHS 300 performs a test to determine if the received device identification signature string matches a device identification signature string already stored in signature string database 380, as per decision block 2325. If the received device identification signature string matches a device identification signature string already in signature string database 380, then server IHS 300 recognizes mobile IHS 200 as being a particular mobile IHS with which it has previously communicated. In response to identifying the particular mobile IHS 200 in this manner, mobile information processing tool 2000A" of server IHS 300 generates an appropriate response for this particular mobile IHS with its corresponding device determination 110, as already described above in detail. Server IHS 300 sends this response to the particular mobile IHS 200 via network 105, as per block 2330. Process flow continues in mobile IHS 200 which displays and/or annunciates the response to the user of mobile IHS 200. Mobile IHS 200 continues executing applications, as per block 2310.

However, if at decision block 2325 server IHS 300 determines that the received device identification signature string does not match a device identification signature string already stored in signature string database 380, then server IHS 200 performs a test to determine if the received app identification string matches an app identification string that signature string database 380 already stores. Server IHS 300 performs this test to determine if it is possible to correlate this new unrecognized received device identification signature string with a device identification signature string that signature string database 380 already stores. More particularly, if server IHS 300 finds that the currently received app identification string matches a previously received app identification string that signature string database 380 stores, then server IHS 300 may assume that the new unrecognized received device identification signature string corresponds to the old device signature string that signature string database 380 associates with the currently received app identification string. In this event, server IHS 300 links the new device identification signature string to the old device identification signature string in signature string database 380 via the common app identification string, as per block 2340. This feature effectively extends the life of the device identification signature string that associates with a particular mobile IHS 200. While the device identification signature string is persistent, the device identification signature string of a particular mobile IHS 200 may change over time when event information associated with the particular mobile IHS 200 changes. The disclosed life extension feature ameliorates the impact of such event information changes.

Process flow may optionally end at end block 2350 or continue to block 2345. At block 2345, server IHS 300 stores the received device identification signature string, device determination and app identification string in signature database 380. In the scenario where server IHS 2345 determines at decision block 2335 that the received app identification string matches an app identification string that signature string database 380 already stores, then block 2345 may update signature string database 380 to reflect the linkage between the old device identification signature sting and the new device identification signature string via the app identification string that is common to each. However, if decision block 2335 determines that the received app identification string does not match an app identification string that signature string database 380 already stores, and the received device identification signature string is also unrecognized, as per decision block 2325, then server IHS 300 treats the new unrecognized device identification signature string as a new entry at block 2330. As per block 2330, server IHS 300 stores the new device identification signature string, device determination and app identification string in signature string database 380 and associates each with the other therein. Process flow then continues to block 2330 at which server IHS 300 sends an appropriate response to mobile IHS 200.

As will be appreciated by one skilled in the art, aspects of the disclosed methodology may be embodied as a system, method or computer readable medium. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer readable medium embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer readable mediums according to embodiments of the invention. It will be understood that each block of the FIGS. 17A, 17B, 18, 19, 20A, 20B, 21 and 22 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIGS. 17A, 17B, 18, 19, 20A, 20B, 21 and 22 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts of FIGS. 17A, 17B, 18, 19, 20A, 20B, 21 and 22 described above.

The flowcharts of FIGS. 17A, 17B, 18, 19, 20A, 20B, 21 and 22 illustrate the architecture, functionality, and operation of possible implementations of systems, methods and computer readable mediums that perform network analysis in accordance with various embodiments of the present invention. In this regard, each block in the flowcharts of FIGS. 17A, 17B, 18, 19, 20A, 20B, 21 and 22 may represent a module, segment, or portion of code, which comprises one or more executable instructions for implementing the specified logical function(s). It should also be noted that, in some alternative implementations, the functions noted in the block may occur out of the order noted in FIGS. 17A, 17B, 18, 19, 20A, 20B, 21 and 22. For example, two blocks shown in succession may, in fact, be executed substantially concurrently, or the blocks may sometimes be executed in the reverse order, depending upon the functionality involved. It will also be noted that each block of FIGS. 17A, 17B, 18, 19, 20A, 20B, 21 and 22 and combinations of blocks in the block diagrams and/or flowchart illustration, can be implemented by special purpose hardware-based systems that perform the specified functions or acts, or combinations of special purpose hardware and computer instructions.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving, by a unique-identification tool, fixed persistent information related to a mobile information handling system (IHS), wherein the mobile IHS is a single, mobile device, and the fixed persistent information comprises information about the mobile IHS that remains the same over a lifetime of the mobile IHS;
   receiving, by the unique-identification tool, changeable, persistent information related to the mobile IHS, wherein the changeable, persistent information changes during the lifetime of the mobile IHS; and
   generating, by the unique-identification tool, a device identifier from the fixed persistent information and the changeable, persistent information to identify the mobile IHS.

2. The method of claim 1, wherein the fixed persistent information is device information and the changeable, persistent information is event information.

3. The method of claim 1, further comprising:
   receiving, by a device capability determination tool in the mobile IHS, hardware capability information related to mobile IHS hardware;
   generating, by the device capability determination tool, a device determination from the hardware capability information, the device determination indicating performance capabilities of the mobile IHS.

4. The method of claim 3, further comprising:
   transmitting, by the mobile IHS, the device identifier and the device determination via a network to a server IHS.

5. The method of claim 1, further comprising:
   generating, by an app identification generator in the mobile IHS, an app identifier to identify an app in the mobile IHS.

6. The method of claim 3, further comprising:
   generating, by an app identification generator in the mobile IHS, an app identifier to identify an app in the mobile IHS,
   transmitting, by the mobile IHS, the device identifier, the device determination, and the app identifier to a server IHS.

7. The method of claim 3, wherein the performance capabilities include an indication of complexity of content that the mobile IHS processes.

8. The method of claim 3, further comprising:
   receiving, by the device capability determination tool, networking information related to the mobile IHS hardware;
   generating, by the device capability determination tool, the device determination from the hardware capability information and the networking information.

9. The method of claim 3, wherein the unique-identification tool, the device capability determination tool and an app identification generator are packaged in each of a plurality of applications in the mobile IHS, wherein the unique-identification tool in each of the plurality of applications generates the same device identifier, wherein the app identification generator in each of the plurality of applications generates a different app identifier.

10. The method of claim 4, further comprising receiving, by the server IHS, the device identifier and the device determination.

11. The method of claim 10, further comprising generating, by the server IHS, a response that includes content compatible with the performance capabilities of the mobile IHS as indicated by the device determination, the content being related to the device identifier received from the mobile IHS.

12. The method of claim 10, further comprising generating, by the server IHS, a response that includes content exhibiting a performance level matching a performance level of the mobile IHS as indicated by the device information.

13. The method of claim 12, wherein the performance level of the content is one of a text, image, audio, video and audio/video content.

14. The method of claim 11, wherein the content includes advertising information.

15. The method of claim 11, further comprising transmitting, by the server IHS, the response via the network to the mobile IHS.

16. The method of claim 11, further comprising:
    receiving, by the mobile IHS, the response; and
    providing, by the mobile IHS, output to the response.

17. The method of claim 2, further comprising transmitting, by the mobile IHS, a user ID and a password to the server IHS along with the device identifier.

18. The method of claim 17, further comprising:
    receiving, by the server IHS, the device identifier, the user ID and the password, thus providing a received device identifier, a received user ID and a received password;
    testing, by the server IHS, the received device identifier, the received password and the received user ID to confirm the authenticity of the user ID.

19. The method of claim 18, wherein the testing by the server IHS the received device identifier, the received password and the received user ID to confirm the authenticity of the user ID further comprises:
    accessing, by the server IHS, a database that includes user IDs and respective passwords and respective device identifiers;
    comparing, by the server IHS, the received device identifier, the received user ID and the received password.

20. The method of claim 1, wherein the device identifier is a signature string.

21. The method of claim 1 further comprising:
    receiving, by a mobile information processing tool, a device determination from the mobile IHS, the device identifier uniquely identifying the mobile IHS, the device determination indicating performance capabilities of the mobile IHS;
    accessing, by the mobile information processing tool, an identifier database to determine information associated with the device identifier; and
    generating, by the mobile information processing tool, a response that includes the information associated with the device identifier, the response exhibiting content that is compatible with the performance capabilities of the mobile IHS as indicated by the device determination.

22. The method of claim 21, wherein the information associated with the device identifier includes advertising information.

23. The method of claim 21, wherein the identifier database stores device identifiers, each device identifier identifying a respective mobile IHS, the identifier database also storing app identifiers that associate with respective device identifiers, each app identifier designating a particular app that generated the device identifier in a respective mobile IHS.

24. The method of claim 21, wherein the device identifier is a signature string.

25. The method of claim 21, wherein the device determination includes an indication of complexity of content that the mobile IHS may process.

26. The method of claim 25, wherein the response exhibits a complexity of content that corresponds to one of text, image, audio, video and audio/video content.

27. The method of claim 21, further comprising:
receiving, by the mobile information processing tool in the server IHS, the device identifier and an app identifier that identifies an app in the mobile IHS, thus providing a received device identifier and a received app identifier;
testing, by the mobile information processing tool in the server IHS, the identifier database to determine if the identifier database includes the received device identifier, the received device identifier being designated as a new device identifier if the identifier database does not include the received device identifier;
testing in response to the new device identifier, by the mobile information processing tool in the server IHS, the received app identifier to determine if the received app identifier is included in the identifier database; and
associating the new device identifier with an old device identifier in the identifier database if the received app identifier is associated with the old device identifier in the identifier database.

28. The method of claim 1 further comprising:
receiving, by a mobile information processing tool in a server IHS, the device identifier from the mobile IHS, to provide a received device identifier that uniquely identifies the mobile IHS,
receiving, by a device capability determination tool in the server IHS, device capability information from the mobile IHS, the device capability determination tool generating a device determination that indicates performance capabilities of the mobile IHS;
accessing, by the mobile information processing tool, an identifier database to determine information associated with the received device identifier; and
generating, by the mobile information processing tool, a response that includes the information associated with the received device identifier, the response exhibiting content that is compatible with the performance capabilities of the mobile IHS as indicated by the device determination.

29. The method of claim 28, wherein the information associated with the device identifier includes advertising information.

30. The method of claim 28, wherein the received device identifier is a signature string.

31. The method of claim 28, wherein the device determination includes an indication of complexity of content that the mobile IHS may process.

32. The method of claim 28, wherein the response exhibits a complexity of content that corresponds to one of text, image, audio, video and audio/video content.

33. A server information handling system (IHS), comprising:
a processor;
a memory coupled to the processor, the memory including a unique-identification tool that is executable by the processor and configured to:
receive fixed persistent information related to a mobile information handling system (IHS), wherein the mobile IHS is a single, mobile device, and the fixed persistent information comprises information about the mobile IHS that remains the same over a lifetime of the mobile IHS;
receive changeable, persistent information related to the mobile IHS, wherein the changeable, persistent information changes during the lifetime of the mobile IHS; and
generate a device identifier from the fixed persistent information and the changeable, persistent information to identify the mobile IHS.

34. The server IHS of claim 33, wherein the fixed persistent information is device information and the changeable, persistent information is event information.

35. The server IHS of claim 33, wherein the memory further includes a device capability determination tool that is configured to:
receive hardware capability information related to mobile IHS hardware;
generate a device determination from the hardware capability information, the device determination indicating performance capabilities of the mobile IHS.

36. The server IHS of claim 35, wherein the memory is configured to:
transmit the device identifier and the device determination via a network to a server IHS.

37. The server IHS of claim 33, wherein the memory further includes an app identification generator that is configured to:
generate an app identifier to identify an app in the mobile IHS.

38. The server IHS of claim 35, wherein the memory further includes an app identification generator that is configured to:
generate an app identifier to identify an app in the mobile IHS, and wherein the memory is configured to:
transmit the device identifier, the device determination, and the app identifier to a server IHS.

39. The mobile IHS of claim 35, wherein the performance capabilities include an indication of complexity of content that the mobile IHS processes.

40. The server IHS of claim 35, wherein the device capability determination tool is further configured to:
receive networking information related to the mobile IHS hardware;
generate the device determination from the hardware capability information and the networking information.

41. The server IHS of claim 35, wherein the unique-identification tool, the device capability determination tool and an app identification generator are packaged in each of a plurality of applications in the mobile IHS, wherein the unique-identification tool in each of the plurality of applications generates the same device identifier, wherein the app identification generator in each of the plurality of applications generates a different app identifier.

42. The server IHS of claim 33 wherein the memory further includes a mobile information processing tool that is executable by the processor and configured to:

receive a device determination from the mobile IHS, the device identifier uniquely identifying the mobile IHS, the device determination indicating performance capabilities of the mobile IHS;

access an identifier database to determine information associated with the device identifier; and generate a response that includes the information associated with the device identifier, the response exhibiting content that is compatible with the performance capabilities of the mobile IHS as indicated by the device determination.

43. The server IHS of claim 42, wherein the mobile information processing tool is further configured to transmit the response to the mobile IHS.

44. The server IHS of claim 42, wherein the information associated with the device identifier includes advertising information.

45. The server IHS of claim 42, wherein the identifier database stores device identifiers, each device identifier identifying a respective mobile IHS, the identifier database also storing app identifiers that associate with respective device identifiers, each app identifier designating a particular app that generated the device identifier in a respective mobile IHS.

46. The server IHS of claim 42, wherein the device identifier is a signature string.

47. The server IHS of claim 42, wherein the device determination includes an indication of complexity of content that the mobile IHS may process.

48. The server IHS of claim 47, wherein the response exhibits a complexity of content that corresponds to one of text, image, audio, video and audio/video content.

49. The server IHS of claim 42, wherein the mobile information processing tool is further configured to:

receive the device identifier and an app identifier that identifies an app in the mobile IHS, thus providing a received device identifier and a received app identifier;

test the identifier database to determine if the identifier database includes the received device identifier, the received device identifier being designated as a new device identifier if the identifier database does not include the received device identifier;

test, in response to the new device identifier, the received app identifier to determine if the received app identifier is included in the identifier database; and associate the new device identifier with an old device identifier in the identifier database if the received app identifier is associated with the old device identifier in the identifier database.

50. The server IHS of claim 33 wherein the memory further includes:

a device capability determination tool that is executable by the processor and configured to receive device capability information from a mobile IHS, the device capability determination tool generating a device determination that indicates performance capabilities of the mobile IHS;

a mobile information processing tool that is executable by the processor and configured to:

access an identifier database to determine information associated with the received device identifier; and generate a response that includes the information associated with the received device identifier, the response exhibiting content that is compatible with the performance capabilities of the mobile IHS as indicated by the device determination.

51. The server IHS of claim 50, wherein the information associated with the device identifier includes advertising information.

52. The server IHS of claim 50, wherein the received device identifier is a signature string.

53. The server IHS of claim 50, wherein the device determination includes an indication of complexity of content that the mobile IHS may process.

54. The server IHS of claim 50, wherein the response exhibits a complexity of content that corresponds to one of text, image, audio, video and audio/video content.

55. A non-transitory, computer readable medium, comprising:

a computer readable storage medium for use in a server information handling system (IHS), wherein the medium includes instructions, which are executable by the server HIS and comprise:

first instructions that receive fixed persistent information related to a mobile IHS, wherein the mobile IHS is a single, mobile device, and the fixed persistent information comprises information about the mobile IHS that remains the same over a lifetime of the mobile IHS;

second instructions that receive changeable, persistent information related to the mobile IHS, wherein the changeable, persistent information changes during the lifetime of the mobile IHS; and third instructions that generate a device identifier from the fixed persistent information and the changeable, persistent information to identify the mobile information handling system (IHS).

56. The computer readable medium of claim 55, wherein the fixed persistent information is device information and the changeable, persistent information is event information.

57. The computer readable medium of claim 55, further comprising:

fourth instructions that receive hardware capability information related to mobile IHS hardware;

fifth instructions that generate a device determination from the hardware capability information, the device determination indicating performance capabilities of the mobile IHS.

58. The computer readable medium of claim 55, further comprising:

sixth instructions that transmit the device identifier and the device determination via a network to a server IHS.

59. The computer readable medium of claim 57, further comprising:

seventh instructions that generate an app identifier to identify an app in the mobile IHS;

eighth instructions that transmit the device identifier, the device determination and the app identifier to a server IHS.

60. The computer readable medium of claim 55 further comprising:

fourth instructions that receive a device identifier and a device determination from a mobile IHS, the device identifier uniquely identifying the mobile IHS, the device determination indicating performance capabilities of the mobile IHS;

fifth instructions that access an identifier database to determine information associated with the device identifier; and sixth instructions that generate a response that includes the information associated with the device identifier, the response exhibiting content that is compatible with the performance capabilities of the mobile IHS as indicated by the device determination.

61. The computer readable medium of claim 60, further comprising seventh instructions that transmit the response to the mobile IHS.

62. The computer readable medium of claim 60, wherein the information associated with the device identifier includes advertising information.

63. The computer readable medium of claim 60, wherein the identifier database stores device identifiers, each device identifier identifying a respective mobile IHS, the identifier database also storing app identifiers that associate with respective device identifiers, each app identifier designating a particular app that generated the device identifier in a respective mobile IHS.

64. The computer readable medium of claim 60, wherein the device identifier is a signature string.

65. The computer readable medium of claim 60, wherein the device determination includes an indication of complexity of content that the mobile IHS may process.

66. The computer readable medium of claim 65, wherein the response exhibits a complexity of content that corresponds to one of text, image, audio, video and audio/video content.

67. The computer readable medium of claim 60, further comprising:

seventh instructions that receive the device identifier and an app identifier that identifies an app in the mobile IHS, thus providing a received device identifier and a received app identifier;

eighth instructions that test the identifier database to determine if the identifier database includes the received device identifier, the received device identifier being designated as a new device identifier if the identifier database does not include the received device identifier;

ninth instruction that test, in response to the new device identifier, the received app identifier to determine if the received app identifier is included in the identifier database; and tenth instructions that associate the new device identifier with an old device identifier in the identifier database if the received app identifier is associated with the old device identifier in the identifier database.

\* \* \* \* \*